United States Patent
Choi et al.

(10) Patent No.: US 11,917,140 B2
(45) Date of Patent: *Feb. 27, 2024

(54) SELECTION OF AN EXTENDED INTRA PREDICTION MODE

(71) Applicant: SAMSUNG ELECTRONICS CO., LTD., Suwon-si (KR)

(72) Inventors: Narae Choi, Suwon-si (KR); Bora Jin, Suwon-si (KR); Yinji Piao, Suwon-si (KR); Minwoo Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/853,430

(22) Filed: Jun. 29, 2022

(65) Prior Publication Data

US 2022/0345696 A1  Oct. 27, 2022

Related U.S. Application Data

(63) Continuation of application No. 16/970,179, filed as application No. PCT/KR2019/002652 on Mar. 7, 2019, now Pat. No. 11,381,814.

(Continued)

(51) Int. Cl.
*H04N 19/11* (2014.01)
*H04N 19/119* (2014.01)
*H04N 19/176* (2014.01)

(52) U.S. Cl.
CPC ........... *H04N 19/11* (2014.11); *H04N 19/119* (2014.11); *H04N 19/176* (2014.11)

(58) Field of Classification Search
None
See application file for complete search history.

(56) References Cited

U.S. PATENT DOCUMENTS 9,154,796 B2  10/2015  Seregin et al.
9,432,675 B2  8/2016  Lee et al.
(Continued)

FOREIGN PATENT DOCUMENTS

CN  105338348 A  2/2016
CN  106031176 A  10/2016
(Continued)

OTHER PUBLICATIONS

Communication dated Jan. 12, 2023, issued by the India Intellectual Property Office in Indian Patent Application No. 202248068763.

(Continued)

*Primary Examiner* — Chikaodili E Anyikire
(74) *Attorney, Agent, or Firm* — Sughrue Mion, PLLC

(57) ABSTRACT

Provided are a video decoding method and a video decoding device, which, during video encoding and decoding processes, obtain most probable mode (MPM) information indicating whether to use MPMs of a current block determined based on at least two of a prediction mode of a left neighboring block adjacent to a left side of the current block, a prediction mode of an upper neighboring block adjacent to an upper side of the current block, and a right neighboring block adjacent to a right side of the current block, obtain extended intra mode set information indicating whether to use an extended intra mode set configured based on the MPMs, and determine an intra prediction mode of the current block based on the MPM information and the extended intra mode set information.

6 Claims, 53 Drawing Sheets

Related U.S. Application Data

(60) Provisional application No. 62/640,108, filed on Mar. 8, 2018, provisional application No. 62/640,164, filed on Mar. 8, 2018, provisional application No. 62/640,289, filed on Mar. 8, 2018.

(56) References Cited

U.S. PATENT DOCUMENTS

| | | |
|---|---|---|
| 10,123,008 B2 | 11/2018 | Chuang et al. |
| 2013/0243087 A1 | 9/2013 | Lee et al. |
| 2016/0295237 A1 | 10/2016 | Piao et al. |
| 2016/0353103 A1 | 12/2016 | Park |
| 2016/0373741 A1* | 12/2016 | Zhao .................... H04N 19/463 |
| 2016/0373742 A1* | 12/2016 | Zhao .................... H04N 19/593 |
| 2017/0353721 A1 | 12/2017 | Piao et al. |
| 2018/0184082 A1* | 6/2018 | Yoo ...................... H04N 19/176 |
| 2019/0289301 A1* | 9/2019 | Lim ...................... H04N 19/105 |
| 2019/0364278 A1* | 11/2019 | Lee ........................ H04N 19/96 |
| 2020/0021805 A1* | 1/2020 | Ko ........................ H04N 19/176 |
| 2020/0029092 A1* | 1/2020 | Rath ....................... H04N 19/13 |
| 2020/0228799 A1 | 7/2020 | Oh et al. |
| 2020/0252614 A1 | 8/2020 | Choi et al. |
| 2020/0275107 A1 | 8/2020 | Choi et al. |
| 2020/0275124 A1* | 8/2020 | Ko ........................ H04N 19/176 |
| 2021/0297684 A1* | 9/2021 | Park ..................... H04N 19/105 |

FOREIGN PATENT DOCUMENTS

| | | |
|---|---|---|
| KR | 10-2013-0031078 A | 3/2013 |
| KR | 10-2013-0049525 A | 5/2013 |
| KR | 10-2014-0098113 A | 8/2014 |
| KR | 10-2016-0009109 A | 1/2016 |
| KR | 10-2017-0095792 A | 8/2017 |
| KR | 10-2017-0136411 A | 12/2017 |
| WO | 2019/066472 A1 | 4/2019 |
| WO | 2019/078630 A1 | 4/2019 |
| WO | 2019/088700 A1 | 5/2019 |

OTHER PUBLICATIONS

Communication dated Jan. 12, 2023, issued by the India Intellectual Property Office in Indian Patent Application No. 202248068759.

International Search Report (PCT/ISA/210) and Written Opinion (PCT/ISA/237) dated Jul. 2, 2019 by the International Searching Authority in International Application No. PCT/KR2019/002652.

Communication dated Dec. 5, 2023 by the China National Intellectual Property Administration for Chinese Patent Application No. 201980017820.2.

* cited by examiner

FIG. 4
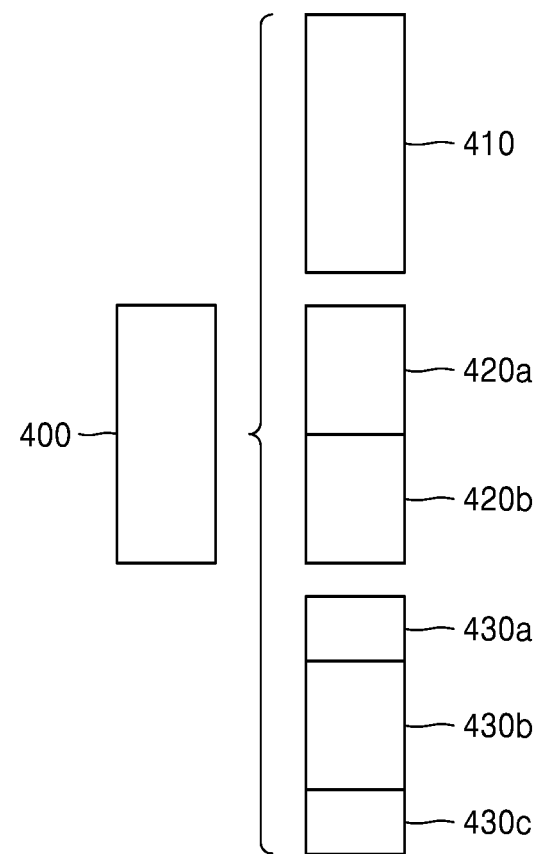
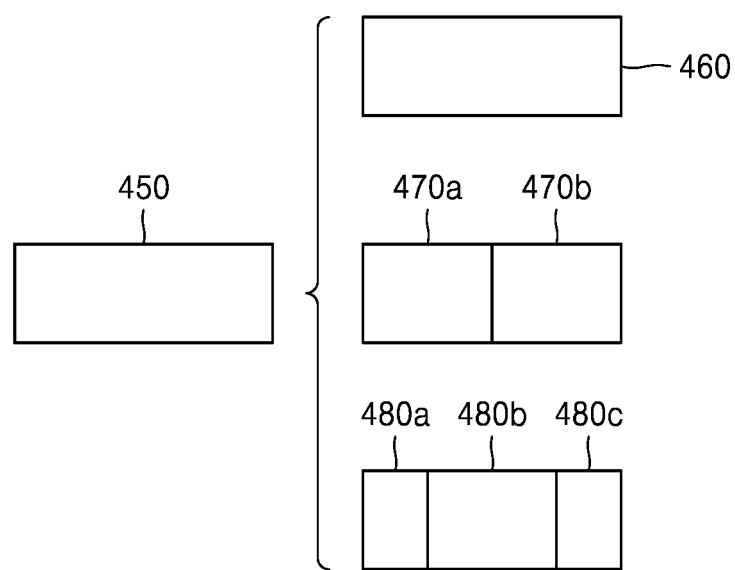

FIG. 13

| DEPTH / BLOCK SHAPE | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 22B

```
if(LR_11)
{
    extended algorithm
}
else if (LR_01)
{
    extended algorithm
}
else
{
    original algorithm
}
```

FIG. 29A

| 0 | 1 | 4 | 5 | 16 | 17 | 20 | 21 |
|---|---|---|---|----|----|----|----|
| 2 | 3 | 6 | 7 | 18 | 19 | 22 | 23 |
| 8 | 9 | 12 | 13 | 24 | 25 | 28 | 29 |
| 10 | 11 | 14 | 15 | 26 | 27 | 30 | 31 |
| (32) | 33 | 36 | 37 | 48 | 49 | 52 | 53 |
| 34 | 35 | 38 | 39 | 50 | 51 | 54 | 55 |
| 40 | 41 | 44 | 45 | 56 | 57 | 60 | 61 |
| 42 | 43 | 46 | 47 | 58 | 59 | 62 | 63 |

CURRENT BLOCK

FIG. 30A

BLOCK TO WHICH SUCO IS APPLIED

| 0 | 1 | 4 | 5 | 16 | 17 | 20 | 21 |
|---|---|---|---|----|----|----|----|
| 2 | 3 | 6 | 7 | 18 | 19 | 22 | 23 |
| 8 | 9 | 12 | 13 | 24 | 25 | 28 | 29 |
| 10 | 11 | 14 | 15 | 26 | 27 | 30 | 31 |
| (32) | 33 | 36 | 37 | 48 | 49 | 52 | 53 |
| 34 | 35 | 38 | 39 | 50 | 51 | 54 | 55 |
| 40 | 41 | 44 | 45 | 56 | 57 | 60 | 61 |
| 42 | 43 | 46 | 47 | 58 | 59 | 62 | 63 |

CURRENT BLOCK

FIG. 30B

ENCODED BLOCK MAP

FIG. 32A

```
decode MPM flag
if(MPM flag)
{
    decode MPM
}
else
{
    decode PIMS flag
    if(PIMS flag)
    {
        decode PIMS
    }
    else
    {
        decode intra mode
    }
}
```

FIG. 32B

```
PIMS coding
if(right block mode)
{
    if (mpm[0] < 3 && mpm[1] < 3 && right block mode < 3)
    {
        t0 = sbac_decode_bin_ep(bs, sbac); ipm += t0 << 1;
        t0 = sbac_decode_bin_ep(bs, sbac); ipm += t0;
        ipm = PIMS[ipm];
    }
    else if (mpm[0] < 3 && mpm[1])
    {
        ...
        ipm = PIMS[ipm];
    }

...
    else
    {
        ...
        ipm = PIMS[ipm];
    }
}
else
{
    PIMS module;
}
```

The right-brace bracket groups the inner `if(right block mode)` block as PIMS module.

$$P_{MPI}[i,j] = (\alpha P_{HEVC}[i,j] + \beta P_{MPI}[i-1,j] + \gamma P_{MPI}[i,j-1] + 4) >> 3$$

FIG. 34A

```
Intra mode signaling ( )
{
    mpm();
    pims();
    intra mode();

if(mpi_coded)
    {
        mpi_index();
    }

```
// src_up : filtered upper reference
// src_le : filtered left reference
// src_ri : filtered right reference if(mpi_index_on)
{
  if(avail_lr == LR_00)
  {
    dst_mpi[0] = (src_up[0] + dst_mpi[0] + 1) >> 1;
    for(i = 1; i < dsth; i++)
    {
      dst_mpi[i] = (src_up[i] + dst_mpi[i] + 1) >> 1;
      dst_mpi += dstw;
      for(j = 1; j < dstw; j++)
      {
        dst_mpi[j] = (dst_mpi[j - dstw] + dst_mpi[j] + 1) >> 1;
      }
    }
  }
  else if (avail_lr == LR_01 || avail_lr == LR_11)
  {
      dst_mpi[0] = (src_up[dstw - 1] + src_ri[0] + 2 * dst_mpi[0] + 2) >> 2;
              ...
  }
  else
  {
          ...
  }
}
```

FIG. 36A

```
Intra mode signaling ( )
{
    mpm();
    pims();
    intra mode();

if(mip_coded)
    {
        mip_index();
    }

```
// src_up : filtered upper reference
// src_le : filtered left reference
// src_ri : filtered right reference if(mip_index_on)
{
  if(avail_lr == LR_10)
  {
    dst_new[0] = (src_up[0] + src_le[0] + 2 * dst[0] + 2) >> 2;
    dst_new[1] = (5 * src_up[1] + 2 * src_le[0] + 9 * dst[1] + 8) >> 4;
    dst_new[w] = (2 * src_up[0] + 5 * src_le[1] + 9 * dst[w] + 8) >> 4;
    dst_new[w + 1] = (src_up[1] + src_le[1] + 6 * dst[w + 1] + 4) >> 3;
    ...
  }
  else if(avail_lr == LR_01)
  {
    dst_new[0] = (src_up[0] + src_ri[0] + 2 * dst[0] + 2) >> 2;
    dst_new[1] = (5 * src_up[1] + 2 * src_ri[0] + 9 * dst[1] + 8) >> 4;
    dst_new[w] = (2 * src_up[0] + 5 * src_ri[1] + 9 * dst[w] + 8) >> 4;
    dst_new[w + 1] = (src_up[1] + src_ri[1] + 6 * dst[w + 1] + 4) >> 3;
    ...
  }
  else
  {
     dst_new = a*src_up + b*src_ri + c*src_le;
     ...
  }
}
```

SELECTION OF AN EXTENDED INTRA PREDICTION MODE

CROSS REFERENCE TO RELATED APPLICATION

This is a Continuation of U.S. application Ser. No. 16/970,179 filed Aug. 14, 2020, which is a National stage entry of International Application No. PCT/KR2019/002652 filed Mar. 7, 2019, which claims the benefit of U.S. Provisional No. 62/640,108 filed Mar. 8, 2018, which claim the benefit of U.S. Provisional No. 62/640,164 filed Mar. 8, 2018, and which claims the benefit of U.S. 62/640,289 filed Mar. 8, 2018, in the United States Patent and Trademark Office. The disclosures of each of the applications are herein are incorporated by reference in their entireties.

TECHNICAL FIELD

The present disclosure relates to a video decoding method and a video decoding device, and more particularly, to an image encoding method and device and an image decoding method and device, in which intra prediction is performed by using most probable modes (MPMs) based on a neighboring block of a right side of a current block as well as neighboring blocks of a left side and an upper side of the current block and an extended intra mode set configured based on the MPMs.

BACKGROUND ART

Image data is encoded by a codec based on a certain data compression standard, for example, a Moving Picture Expert Group (MPEG) standard, and then stored in a recording medium or transmitted through a communication channel in a bitstream form.

In accordance with the development and distribution of hardware capable of reproducing and storing high-resolution or high-quality image content, there is an increasing need for a codec for effectively encoding or decoding the high-resolution or high-quality image content. The encoded image content may be reproduced by decoding. Recently, methods for effectively compressing high-resolution or high-quality image content have been implemented. For example, it has been proposed that an image compression technique may be effectively implemented through a process of splitting an image to be encoded by an arbitrary method or a process of manipulating data.

As one of the techniques for manipulating data, it is common that two or more most probable modes (MPMs) determined based on neighboring blocks of a left side and an upper side of a current block are used in intra prediction and the other modes are coded and signaled under the same conditions.

DESCRIPTION OF EMBODIMENTS

Technical Problem

Provided are a method and a device, which, during video encoding and decoding processes, obtain most probable mode (MPM) information indicating whether to use MPMs of a current block determined based on a prediction mode of a left neighboring block adjacent to a left side of the current block, a prediction mode of an upper neighboring block adjacent to an upper side of the current block, and a right neighboring block adjacent to a right side of the current block, obtain extended intra mode set information indicating whether to use an extended intra mode set configured based on the MPMs, and perform intra prediction by using an intra prediction mode of the current block determined based on the MPM information and the extended intra mode set information.

Solution to Problem

To solve the technical problem, a video decoding method according to the present disclosure includes: obtaining most probable mode (MPM) information indicating whether to use MPMs of a current block determined based on at least two of a prediction mode of a left neighboring block adjacent to a left side of the current block, a prediction mode of an upper neighboring block adjacent to an upper side of the current block, and a prediction mode of a right neighboring block adjacent to a right side of the current block; obtaining extended intra mode set information indicating whether to use an extended intra mode set configured based on the MPMs; and determining an intra prediction mode of the current block based on the MPM information and the extended intra mode set information.

To solve the technical problem, a video decoding device according to the present disclosure includes: a memory; and at least one processor connected to the memory and configured to: obtain MPM information indicating whether to use MPMs of a current block determined based on at least two of a prediction mode of a left neighboring block adjacent to a left side of the current block, a prediction mode of an upper neighboring block adjacent to an upper side of the current block, and a prediction mode of a right neighboring block adjacent to a right side of the current block; obtain extended intra mode set information indicating whether to use an extended intra mode set configured based on the MPMs; and determine an intra prediction mode of the current block based on the MPM information and the extended intra mode set information.

To solve the technical problem, a video encoding method according to the present disclosure includes: performing intra prediction on a current block to generate MPM information indicating whether to use MPMs of the current block determined based on at least two of a prediction mode of a left neighboring block adjacent to a left side of the current block, a prediction mode of an upper neighboring block adjacent to an upper side of the current block, and a prediction mode of a right neighboring block adjacent to a right side of the current block; generating extended intra mode set information indicating whether to use an extended intra mode set configured based on the MPMs; and encoding the MPM information and the extended intra mode set information.

To solve the technical problem, a video encoding device according to the present disclosure includes at least one processor connected to the memory and configured to: perform intra prediction on a current block to generate MPM information indicating whether to use MPMs of the current block determined based on at least two of a prediction mode of a left neighboring block adjacent to a left side of the current block, a prediction mode of an upper neighboring block adjacent to an upper side of the current block, and a prediction mode of a right neighboring block adjacent to a right side of the current block; generate extended intra mode set information indicating whether to use an extended intra mode set configured based on the MPMs; and encode the MPM information and the extended intra mode set information.

Advantageous Effects of Disclosure

During video encoding and decoding processes, most probable mode (MPM) information indicating whether to use MPMs of a current block determined based on at least two of a prediction mode of a left neighboring block adjacent to a left side of the current block, a prediction mode of an upper neighboring block adjacent to an upper side of the current block, and a right neighboring block adjacent to a right side of the current block is obtained, extended intra mode set information indicating whether to use an extended intra mode set configured based on the MPMs is obtained, and the current block is predicted by using an intra prediction mode of the current block determined based on the MPM information and the extended intra mode set information. Therefore, when the MPM is configured, the right neighboring block is also considered such that the efficiency of the MPM is improved. When intra prediction is performed, the accuracy of prediction may be improved by compensating for a case in which the MPM rather than a correct mode is selected. The efficiency of mode coding may be improved by allocating fewer bits to various intra modes than a conventional MPM and presenting the intra modes as candidates.

BRIEF DESCRIPTION OF DRAWINGS

FIG. 4 illustrates a process, performed by an image decoding device, of determining at least one coding unit by splitting a non-square coding unit, according to an embodiment.

FIG. 13 illustrates a process of determining a depth of a coding unit as a shape and size of the coding unit change, when the coding unit is recursively split such that a plurality of coding units are determined, according to an embodiment.

FIG. 22B illustrates a modified algorithm for a case in which a right neighboring block adjacent to a right side of a current block is available.

29D illustrates a block map indicating encoded blocks of blocks included in a coding unit.

Figure 30B:
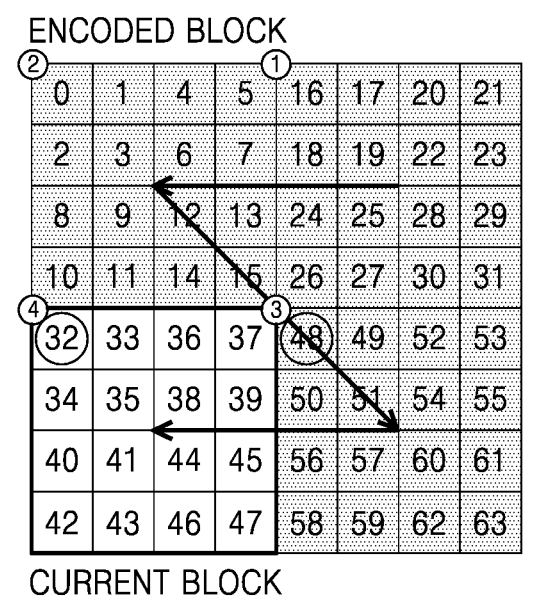
Figure 30C:
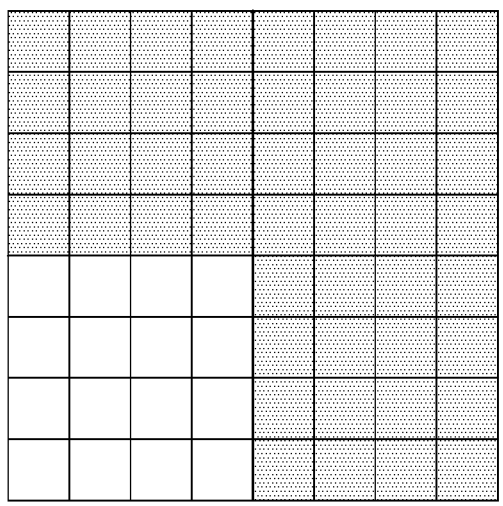
Figure 30D:
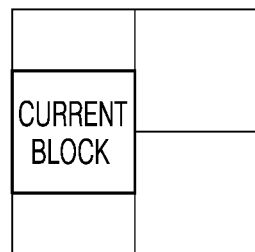
Figure 30E:
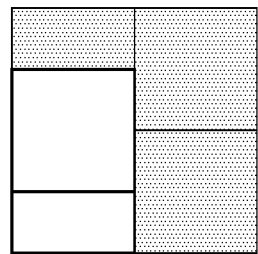

FIG. 30A illustrates a block to which a split unit coding order (SUCO) in which a coding order is changed from right to left is applied, FIG. 30B illustrates a scan order of coding units to which a SUCO is applied, FIG. 30C illustrates an example of an encoded block map, FIG. 30D illustrates an example of a coding unit including a current block, and FIG. 30E illustrates a block map of a coding unit including a current block to which a SUCO is applied.

Figure 31A:
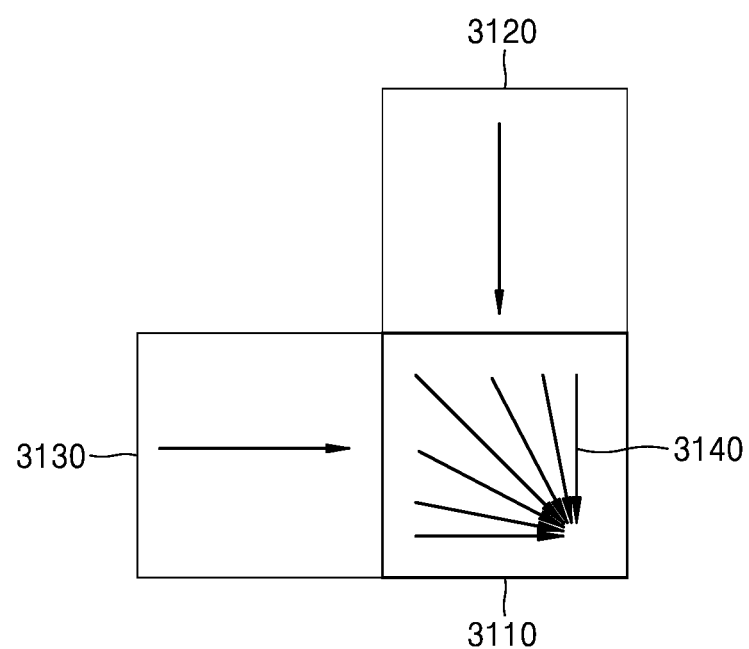
Figure 31B:
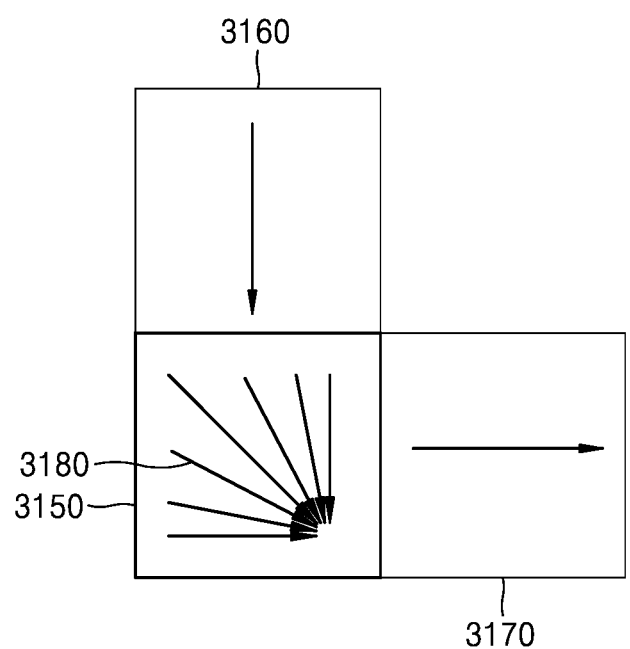
Figure 31C:
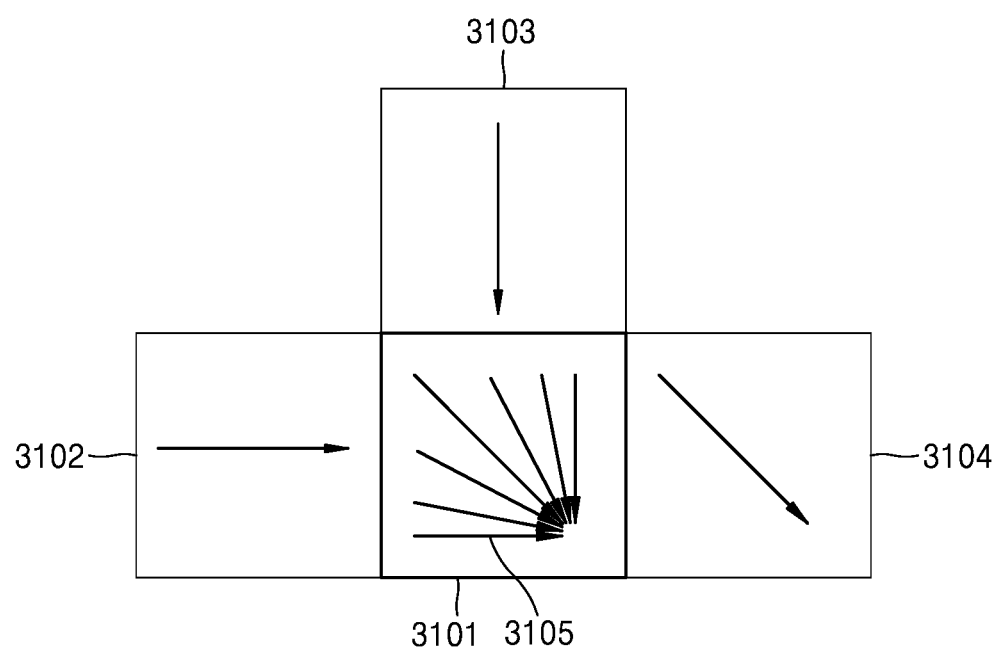

FIG. 31A illustrates a probable intra mode set (PIMS) when left and upper neighboring blocks of a current block are available, FIG. 31B illustrates a PIMS when right and upper neighboring blocks of a current block are available, and FIG. 31C illustrates a PIMS when left, upper, and right neighboring blocks of a current block are all available.

FIG. 32A illustrates a syntax of a flag indicating whether to use a most probable mode (MPM) and a PIMS, and FIG. 32B illustrates a syntax of a PIMS.

Figure 33:
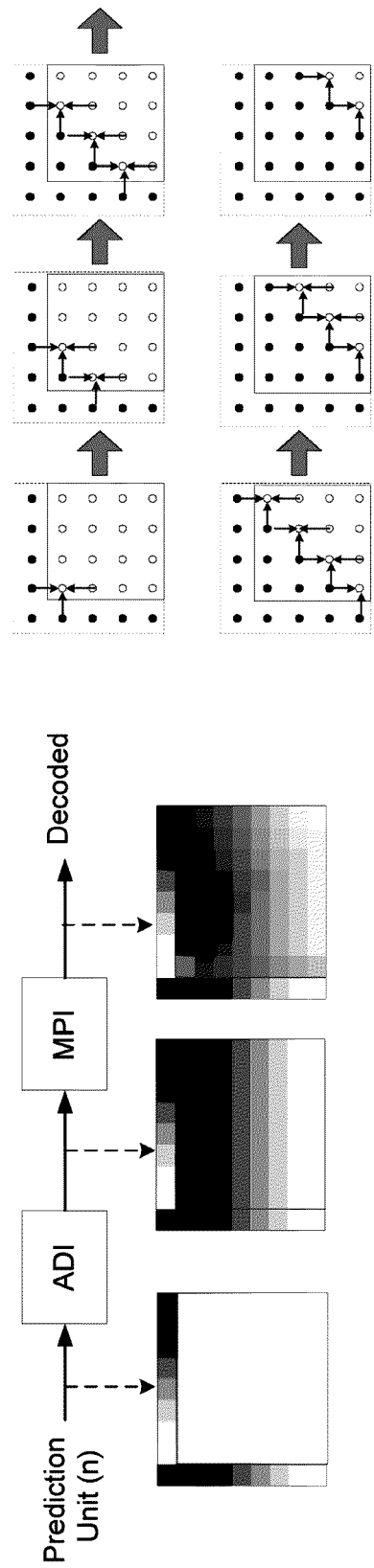

FIG. 33 illustrates an example of multi-parameter intra prediction.

FIG. 34A illustrates an example of a syntax of multi-parameter prediction used for intra prediction, and FIG. 34B illustrates an example of a syntax of multi-parameter prediction according to an availability check.

Figure 35A:
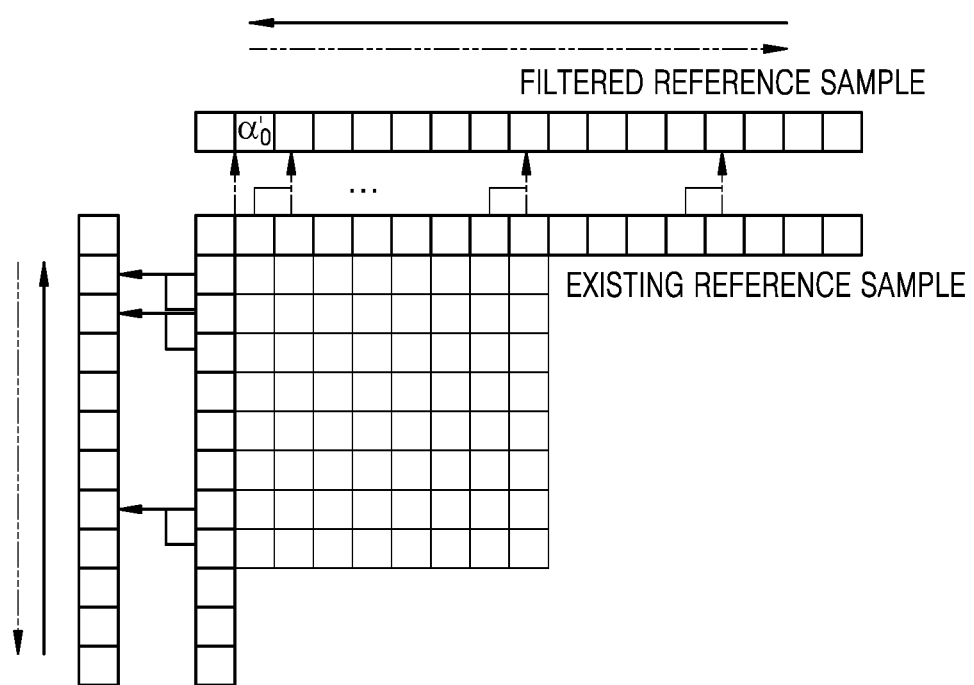
Figure 35B:
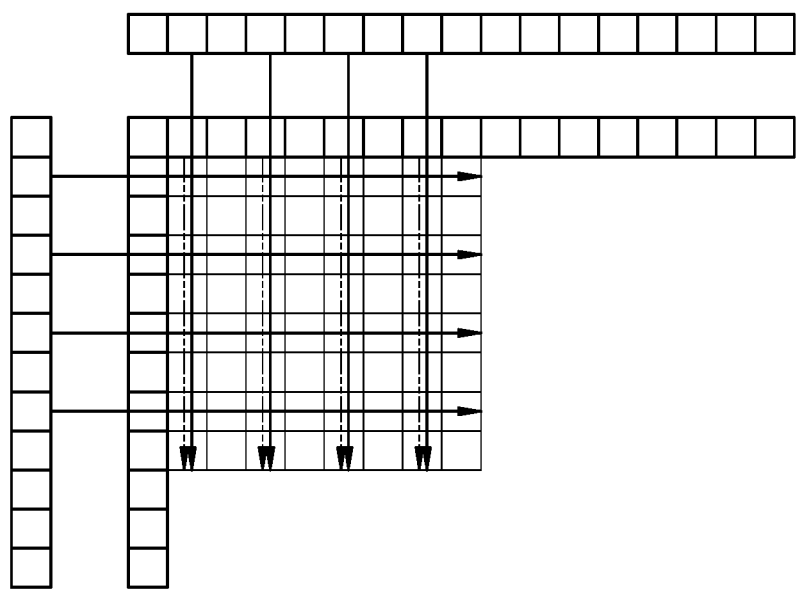

FIG. 35A illustrates an example of a filtered reference sample used for multi-combined intra prediction, and FIG. 35B illustrates an example in which multi-combined intra prediction is applied.

FIG. 36A illustrates an example of a syntax of multi-combined intra prediction used for intra prediction, and FIG. 36B illustrates an example of a syntax of multi-combined intra prediction according to an availability check.

BEST MODE

A video decoding method according to an embodiment of the present disclosure may include: obtaining most probable mode (MPM) information indicating whether to use MPMs of a current block determined based on at least two of a prediction mode of a left neighboring block adjacent to a left side of the current block, a prediction mode of an upper neighboring block adjacent to an upper side of the current block, and a prediction mode of a right neighboring block adjacent to a right side of the current block; obtaining extended intra mode set information indicating whether to use an extended intra mode set configured based on the MPMs; and determining an intra prediction mode of the current block based on the MPM information and the extended intra mode set information.

According to an embodiment, when the MPM information indicates that the MPMs are used, one mode of the MPMs may be determined as the intra prediction mode of the current block, when the MPM information indicates that the MPMs are not used and the extended intra mode set information indicates that the extended intra mode set is used, one mode of the extended intra mode set may be determined as the intra prediction mode of the current block, and when the MPM information indicates that the MPMs are not used and the extended intra mode set information indicates that the extended intra mode set is not used, one mode of the intra prediction modes not included in the MPM and the extended intra mode set may be determined as the intra prediction mode of the current block.

According to an embodiment, when the MPMs of the current block include intra prediction modes of the left neighboring block, the upper neighboring block, and the right neighboring block, the extended intra mode set may be configured by using the MPMs of the current block.

According to an embodiment, when the MPMs of the current block include the intra prediction modes of the left neighboring block and the upper neighboring block, the extended intra mode set may be configured by using the MPMs of the current block and the prediction mode of the right neighboring block.

According to an embodiment, when a preset number of the MPMs of the current block is two and the left neighboring block, the upper neighboring block, and the right neighboring block are all available, the MPMs of the current block may be determined by using the prediction modes of two blocks among the left neighboring block, the upper neighboring block, and the right neighboring block.

According to an embodiment, when a preset number of the MPMs of the current block is two, the right neighboring block is available, and only one of the left neighboring block and the upper neighboring block is available, the MPMs of the current block may be determined by using the prediction mode of the right neighboring block and the prediction mode of one block available among the upper neighboring block and the right neighboring block.

According to an embodiment, when the left neighboring block, the upper neighboring block, and the right neighboring block are all available and the prediction modes of the left neighboring block, the upper neighboring block, and the right neighboring block are different directional modes, the extended intra mode set may include an intra prediction mode of an index increased by N from an index of an intra prediction mode of the left neighboring block, an intra prediction mode of an index decreased by N from the index of the intra prediction mode of the left neighboring block, an intra prediction mode of an index increased by M from an index of an intra prediction mode of the upper neighboring block, an intra prediction mode of an index decreased by M from the index of the intra prediction mode of the upper neighboring block, an intra prediction mode of an index increased by L from an index of an intra prediction mode of the right neighboring block, and an intra prediction mode of an index decreased by L from the index of the intra prediction mode of the right neighboring block, and N, M, and L may be integers other than zero.

According to an embodiment, the extended intra mode set may be configured according to types of the MPMs.

According to an embodiment, when a preset number of the MPMs of the current block is two and the MPMs are a DC mode and a bilinear mode, the extended intra mode set may include a plane mode, a horizontal mode, a vertical mode, and a diagonal mode.

According to an embodiment, when a preset number of the MPMs of the current block is two and the MPMs are a DC mode and a directional mode, the extended intra mode set may include a bilinear mode, a plane mode, and an intra prediction mode of an index increased by 1 from an index of the directional mode, an intra prediction mode of an index increased by 2 from the index of the directional mode, an intra prediction mode of an index decreased by 1 from the index of the directional mode, an intra prediction mode of an index decreased by 2 from the index of the directional mode, a first default mode, and a second default mode, and the first default mode and the second default mode may be preset intra prediction modes.

According to an embodiment, the first default mode and the second default mode may be determined from a list in which intra prediction modes having a statistically high probability of being selected are sequentially listed.

According to an embodiment, when a preset number of the MPMs of the current block is two and the MPMs are a first directional mode and a second directional mode, the extended intra mode set may include an intra prediction mode of an index increased by 1 from an index of the first directional mode, an intra prediction mode of an index decreased by 1 from the index of the first directional mode, an intra prediction mode of an index increased by 1 from an index of the second directional mode, an intra prediction mode of an index decreased by 1 from the index of the second directional mode, a horizontal mode, a vertical mode, a DC mode, and a bilinear mode.

According to an embodiment, when the MPMs of the current block include intra prediction modes of the left neighboring block and the upper neighboring block, the MPMs are a DC mode and a first directional mode, and the prediction mode of the right neighboring block is a second directional mode, the extended intra mode set may include a bilinear mode, a plane mode, the second directional mode, an intra prediction mode of an index increased by 1 from an index of the first directional mode, an intra prediction mode of an index decreased by 1 from the index of the first directional mode, an intra prediction mode of an index increased by 1 from an index of the second directional mode, an intra prediction mode of an index decreased by 1 from the index of the second directional mode, and a default mode, and the default mode may be a preset intra prediction mode.

According to an embodiment, when the MPMs of the current block include intra prediction modes of the left neighboring block and the upper neighboring block, the MPMs are a first directional mode and a second directional mode, and the prediction mode of the right neighboring block is a third directional mode, the extended intra mode set may include the third directional mode, an intra prediction mode of an index increased by 1 from an index of the first directional mode, an intra prediction mode of an index decreased by 1 from the index of the first directional mode, an intra prediction mode of an index increased by 1 from an index of the second directional mode, an intra neighboring mode of an index decreased by 1 from the index of the second directional mode, an intra prediction mode of an index increased by 1 from an index of the third directional mode, and an intra prediction mode of an index decreased by 1 from index of third directional mode.

A video encoding method according to an embodiment of the present disclosure includes: performing intra prediction on a current block to generate most probable mode (MPM) information indicating whether to use MPMs of the current block determined based on at least two of a prediction mode of a left neighboring block adjacent to a left side of the current block, a prediction mode of an upper neighboring block adjacent to an upper side of the current block, and a prediction mode of a right neighboring block adjacent to a right side of the current block; generating extended intra mode set information indicating whether to use an extended intra mode set configured based on the MPMs; and encoding the MPM information and the extended intra mode set information.

A video decoding device according to an embodiment of the present disclosure includes: a memory; and at least one processor connected to the memory and configured to: obtain most probable mode (MPM) information indicating whether to use MPMs of a current block determined based on at least two of a prediction mode of a left neighboring block adjacent to a left side of the current block, a prediction mode of an upper neighboring block adjacent to an upper side of the current block, and a prediction mode of a right neighboring block adjacent to a right side of the current block; obtain extended intra mode set information indicating whether to use an extended intra mode set configured based on the MPMs; and determine an intra prediction mode of the current block based on the MPM information and the extended intra mode set information.

MODE OF DISCLOSURE

Advantages and features of embodiments and methods of accomplishing the same may be understood more readily by reference to the embodiments and the accompanying drawings. In this regard, the embodiments of the present disclosure may have different forms and should not be construed as being limited to the descriptions set forth herein. Rather, these embodiments are provided so that the present disclosure will be thorough and complete and will fully convey the concept of the embodiments of the present disclosure to those of ordinary skill in the art.

The terms used in the specification will be briefly defined, and the embodiments will be described in detail.

The terms used herein are general terms currently widely used in the art in consideration of functions described in the present disclosure. However, the terms may have different meanings according to the intention of those of ordinary skill in the art, precedent cases, or the appearance of new technologies. Also, some terms may be arbitrarily selected by the applicant, and in this case, the meaning of the selected terms will be described in detail in the detailed description of the present disclosure. Thus, the terms as used herein have to be defined not by their simple names but based on the meaning of the terms together with the description throughout the specification.

In the following specification, the singular forms include plural forms unless the context clearly indicates otherwise.

When a part "includes" or "comprises" an element, unless there is a particular description contrary thereto, the part may further include other elements, not excluding the other elements.

In the following description, terms such as "unit" indicate a software or hardware component and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

According to an embodiment of the present disclosure, the "unit" may include a processor and a memory. The term "processor" should be interpreted broadly to include a general purpose processor, a central processing unit (CPU), a microprocessor, a digital signal processor (DSP), a controller, a microcontroller, a state machine, and the like. In some circumstances, the "processor" may refer to an application specific semiconductor (ASIC), a programmable logic device (PLD), a field programmable gate array (FPGA), or the like. The term "processor" may refer to a combination of processing devices such as, for example, a combination of a DSP and a microprocessor, a combination of a plurality of microprocessors, a combination of one or more microprocessors in conjunction with a DSP core, or a combination of any other such configuration.

The term "memory" should be interpreted broadly to include any electronic component capable of storing electronic information. The term "memory" may refer to various types of processor-readable media, such as a random access memory (RAM), a read-only memory (ROM), a non-volatile random access memory (NVRAM), a programmable read-only memory (PROM), an erase-programmable read-only memory (EPROM), an electrically erasable PROM (EEPROM), a flash memory, a magnetic or optical data storage device, a register, and the like. When the processor is able to read information from a memory and/or write information to the memory, the memory is said to be in an electronic communication state with the processor. The memory integrated in the processor is in an electronic communication state with the processor.

Hereinafter, an "image" may be a static image such as a still image of a video or may be a dynamic image such as a moving image, that is, the video itself.

Hereinafter, a "sample" denotes data assigned to a sampling position of an image, i.e., data to be processed. For example, pixel values of an image in a spatial domain and transform coefficients on a transform region may be samples. A unit including at least one such sample may be defined as a block.

In the specification, a "current block" may refer to a block of a largest coding unit, a coding unit, a prediction unit, or a transform unit of a current image to be encoded or decoded.

Hereinafter, embodiments will be described in detail with reference to the accompanying drawings such that one of ordinary skill in the art may easily implement the embodiments. In the drawings, parts irrelevant to the description are omitted to clearly describe the present disclosure.

Hereinafter, an image encoding device and an image decoding device, and an image encoding method and an image decoding method according to embodiments will be described with reference to FIGS. 1 through 16. A method of determining a data unit of an image, according to an embodiment, will be described with reference to FIGS. 3 to 16. A video decoding method of determining an intra prediction mode of a current block using a most probable mode (MPM) determined based on an intra prediction mode of left, upper, and right neighboring blocks of a current block and an extended intra mode set configured based on the MPM, according to an embodiment, will be described with reference to FIGS. 17 to 20, 23, 24, and 31A and 32B. An intra prediction method according to a coding order and whether neighboring blocks are reconstructed will be described with reference to FIGS. 21 and 22. A filtering method used for intra prediction will be described with reference to FIGS. 25 to 28. A block map used for intra prediction will be described with reference to FIGS. 29 and 30. Other methods of intra prediction will be described with reference to FIGS. 33 to 36B.

Hereinafter, a method and device for adaptively selecting a context model, based on various shapes of coding units, according to an embodiment of the disclosure, will be described with reference to FIGS. 1 and 2.

Figure 1:
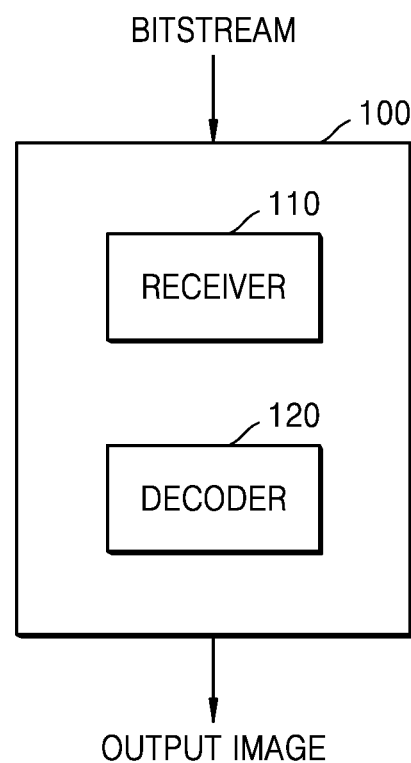
FIG. 1 is a schematic block diagram of an image decoding device according to an embodiment.

FIG. 1 is a schematic block diagram of an image decoding device according to an embodiment.

The image decoding device 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding device 1700 described later. Also, the bitstream may be transmitted from the image encoding device 1700. The image encoding device 1700 and the image decoding device 100 may be connected via wires or wirelessly, and the receiver 110 may receive the bitstream via wires or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding device 100 will be described in detail with reference to FIG. 2.

Figure 2:
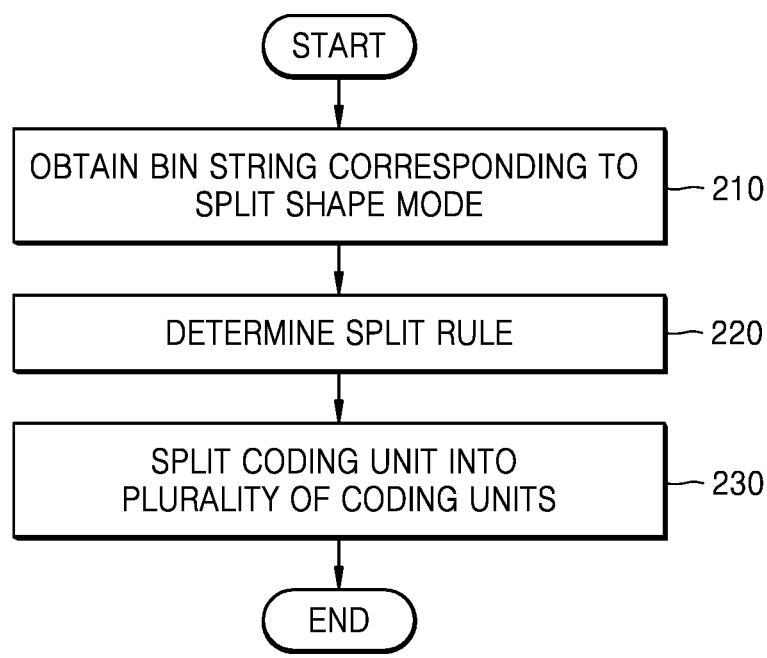
FIG. 2 is a flowchart of an image decoding method according to an embodiment.

FIG. 2 is a flowchart of an image decoding method according to an embodiment.

According to an embodiment of the disclosure, the receiver 110 receives a bitstream.

The image decoding device 100 obtains, from a bitstream, a bin string corresponding to a split shape mode of a coding unit (operation 210). The image decoding device 100 determines a split rule of the coding unit (operation 220). Also, the image decoding device 100 splits the coding unit into a plurality of coding units, based on at least one of the bin string corresponding to the split shape mode and the split rule (operation 230). The image decoding device 100 may determine an allowable first range of a size of the coding unit, according to a ratio of the width and the height of the coding unit, so as to determine the split rule. The image decoding device 100 may determine an allowable second range of the size of the coding unit, according to the split shape mode of the coding unit, so as to determine the split rule.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding unit (CTB) denotes an N×N block including N×N samples (N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a certain size including a certain number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, an embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode SPLIT_TT_VER.

The image decoding device 100 may obtain, from the bitstream, the split shape mode information from one bin string. A form of the bitstream received by the image decoding device 100 may include fixed length binary code, unary code, truncated unary code, pre-determined binary code, or the like. The bin string is information in a binary number. The bin string may include at least one bit. The image decoding device 100 may obtain the split shape mode information corresponding to the bin string, based on the split rule. The image decoding device 100 may determine whether to quad-split a coding unit, whether not to split a coding unit, a split direction, and a split type, based on one bin string.

The coding unit may be smaller than or same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape code information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 through 16.

Also, one or more prediction blocks for prediction may be determined from a coding unit. The prediction block may be the same as or smaller than the coding unit. Also, one or more transform blocks for transform may be determined from a coding unit. The transform block may be the same as or smaller than the coding unit.

The shapes and sizes of the transform block and prediction block may not be related to each other.

In another embodiment, prediction may be performed by using a coding unit as a prediction unit. Also, transform may be performed by using a coding unit as a transform block.

The splitting of the coding unit will be described in detail with reference to FIGS. 3 through 16. A current block and a neighboring block of the disclosure may indicate one of the largest coding unit, the coding unit, the prediction block, and the transform block. Also, the current block of the current coding unit is a block that is currently being decoded or encoded or a block that is currently being split. The neighboring block may be a block reconstructed before the current block. The neighboring block may be adjacent to the current block spatially or temporally. The neighboring block may be located at one of the lower left, left, upper left, top, upper right, right, lower right of the current block.

Figure 3:
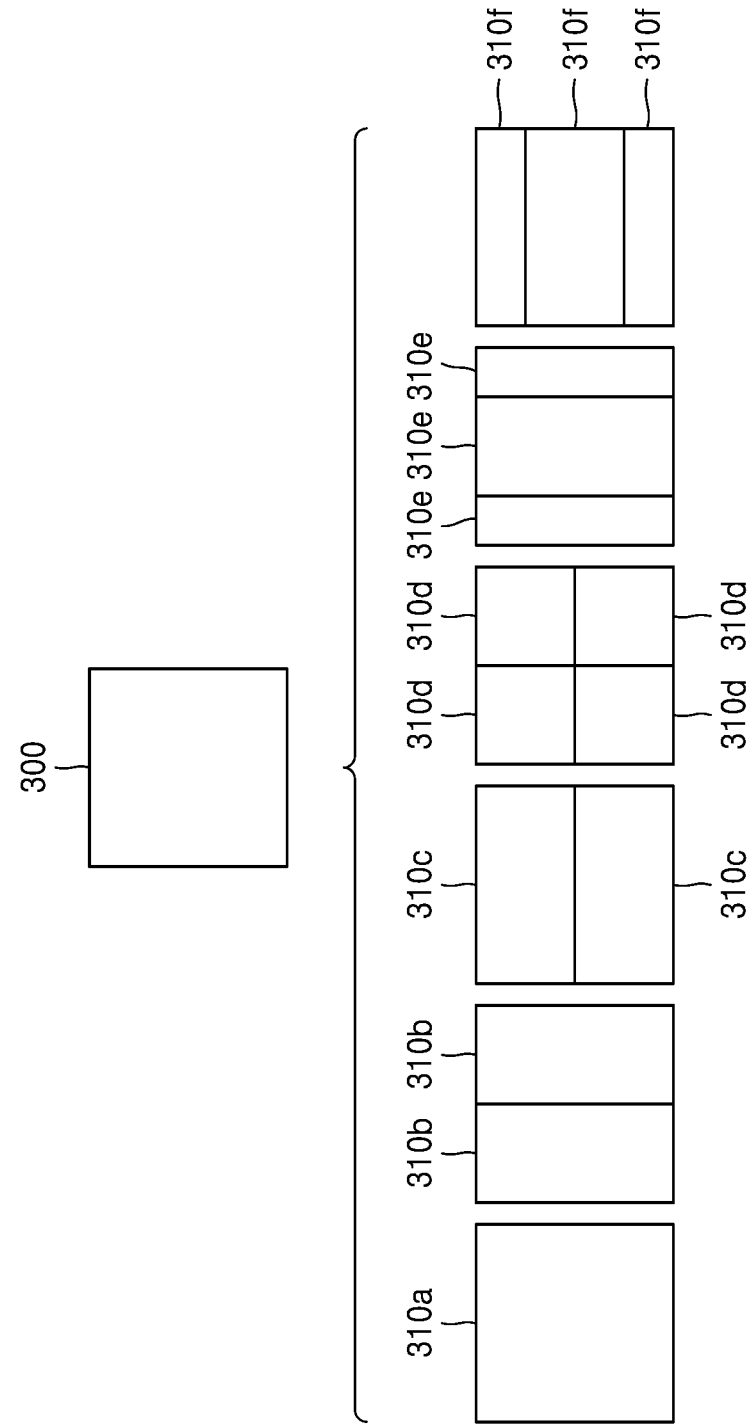
FIG. 3 illustrates a process, performed by an image decoding device, of determining at least one coding unit by splitting a current coding unit, according to an embodiment.

FIG. 3 illustrates a process, performed by an image decoding device, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, direction, a ratio of width and height, or size of a coding unit.

The shape of the coding unit may include a square and a non-square. When the lengths of the width and height of the coding unit are the same (i.e., when the block shape of the coding unit is 4N×4N), the image decoding device 100 may determine the block shape information of the coding unit as a square. The image decoding device 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding device 100 may determine the block shape information of the coding unit as a non-square shape. When the shape of the coding unit is non-square, the image decoding device 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding device 100 may determine whether the coding unit is in a horizontal direction or a vertical direction, based on the length of the width and the length of the height of the coding unit. Also, the image decoding device 100 may determine the size of the coding unit, based on at least one of the length of the width, the length of the height, or the area of the coding unit.

According to an embodiment, the image decoding device 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding device 100.

The image decoding device 100 may obtain the split shape mode information from a bitstream. However, an embodiment is not limited thereto, and the image decoding device 100 and the image encoding device 1700 may determine pre-agreed split shape mode information, based on the block shape information. The image decoding device 100 may determine the pre-agreed split shape mode information with respect to a largest coding unit or a smallest coding unit. For example, the image decoding device 100 may determine split shape mode information with respect to the largest coding unit to be a quad split. Also, the image decoding device 100 may determine split shape mode information regarding the smallest coding unit to be "not to perform splitting". In particular, the image decoding device 100 may determine the size of the largest coding unit to be 256×256. The image decoding device 100 may determine the pre-agreed split shape mode information to be a quad split. The quad split is a split shape mode in which the width and the height of the coding unit are both bisected. The image decoding device 100 may obtain a coding unit of a 128×128 size from the largest coding unit of a 256×256 size, based on the split shape mode information. Also, the image decoding device 100 may determine the size of the smallest coding unit to be 4×4. The image decoding device 100 may obtain split shape mode information indicating "not to perform splitting" with respect to the smallest coding unit.

According to an embodiment, the image decoding device 100 may use the block shape information indicating that the current coding unit has a square shape. For example, the image decoding device 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310*a* having the same size as the current coding unit 300 is not split, based on the split shape mode information indicating not to perform splitting, or may determine coding units 310*b*, 310*c*, 310*d*, 310*e*, or 310*f* split based on the split shape mode information indicating a certain splitting method.

Referring to FIG. 3, according to an embodiment, the image decoding device 100 may determine two coding units 310*b* obtained by splitting the current coding unit 300 in a vertical direction, based on the split shape mode information indicating to perform splitting in a vertical direction. The image decoding device 100 may determine two coding units 310*c* obtained by splitting the current coding unit 300 in a horizontal direction, based on the split shape mode information indicating to perform splitting in a horizontal direction. The image decoding device 100 may determine four coding units 310*d* obtained by splitting the current coding unit 300 in vertical and horizontal directions, based on the split shape mode information indicating to perform splitting in vertical and horizontal directions. According to an embodiment, the image decoding device 100 may determine three coding units 310*e* obtained by splitting the current coding unit 300 in a vertical direction, based on the split shape mode information indicating to perform ternary-splitting in a vertical direction. The image decoding device 100 may determine three coding units 310*f* obtained by splitting the current coding unit 300 in a horizontal direction, based on the split shape mode information indicating to perform ternary-splitting in a horizontal direction. However, splitting methods of the square coding unit are not limited to the above-described methods, and the split shape mode information may indicate various methods. Certain splitting methods of splitting the square coding unit will be described in detail below in relation to various embodiments.

FIG. 4 illustrates a process, performed by an image decoding device, of determining at least one coding unit by splitting a non-square coding unit, according to an embodiment.

According to an embodiment, the image decoding device 100 may use block shape information indicating that a current coding unit has a non-square shape. The image decoding device 100 may determine whether not to split the non-square current coding unit or whether to split the non-square current coding unit by using a certain splitting method, based on split shape mode information. Referring to FIG. 4, when the block shape information of a current coding unit 400 or 450 indicates a non-square shape, the image decoding device 100 may determine that a coding unit 410 or 460 having the same size as the current coding unit 400 or 450 is not split, based on the split shape mode information indicating not to perform splitting, or determine coding units 420a and 420b, 430a to 430c, 470a and 470b, or 480a to 480c split based on the split shape mode information indicating a certain splitting method. Certain splitting methods of splitting a non-square coding unit will be described in detail below in relation to various embodiments.

According to an embodiment, the image decoding device 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding device 100 may determine two coding units 420a and 420b, or 470a and 470b included in the current coding unit 400 or 450, by splitting the current coding unit 400 or 450 based on the split shape mode information.

According to an embodiment, when the image decoding device 100 splits the non-square current coding unit 400 or 450 based on the split shape mode information, the image decoding device 100 may consider the location of a long side of the non-square current coding unit 400 or 450 to split a current coding unit. For example, the image decoding device 100 may determine a plurality of coding units by splitting a long side of the current coding unit 400 or 450, in consideration of the shape of the current coding unit 400 or 450.

According to an embodiment, when the split shape mode information indicates to split (ternary-split) a coding unit into an odd number of blocks, the image decoding device 100 may determine an odd number of coding units included in the current coding unit 400 or 450. For example, when the split shape mode information indicates to split the current coding unit 400 or 450 into three coding units, the image decoding device 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may be a horizontal direction because the length of the width is longer than the length of the height. When the ratio of the width and height is 1:4, the block shape information may be a vertical direction because the length of the width is shorter than the length of the height. The image decoding device 100 may determine to split a current coding unit into the odd number of blocks, based on the split shape mode information. Also, the image decoding device 100 may determine a split direction of the current coding unit 400 or 450, based on the block shape information of the current coding unit 400 or 450. For example, when the current coding unit 400 is in the vertical direction, the image decoding device 100 may determine the coding units 430a to 430c by splitting the current coding unit 400 in the horizontal direction. Also, when the current coding unit 450 is in the horizontal direction, the image decoding device 100 may determine the coding units 480a to 480c by splitting the current coding unit 450 in the vertical direction.

According to an embodiment, the image decoding device 100 may determine the odd number of coding units included in the current coding unit 400 or 450, and not all the determined coding units may have the same size. For example, a certain coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding device 100 may determine the odd number of coding units included in the current coding unit 400 or 450, and in addition, may put a certain restriction on at least one coding unit from among the odd number of coding units generated by splitting the current coding unit 400 or 450. Referring to FIG. 4, the image decoding device 100 may set a decoding process regarding the coding unit 430b or 480b located at the center among the three coding units 430a, 430b, and 430c or 480a, 480b, and 480c generated as the current coding unit 400 or 450 is split to be different from that of the other coding units 430a and 430c, or 480a or 480c. For example, the image decoding device 100 may restrict the coding unit 430b or 480b at the center location to be no longer split or to be split only a certain number of times, unlike the other coding units 430a and 430c, or 480a and 480c.

Figure 5:
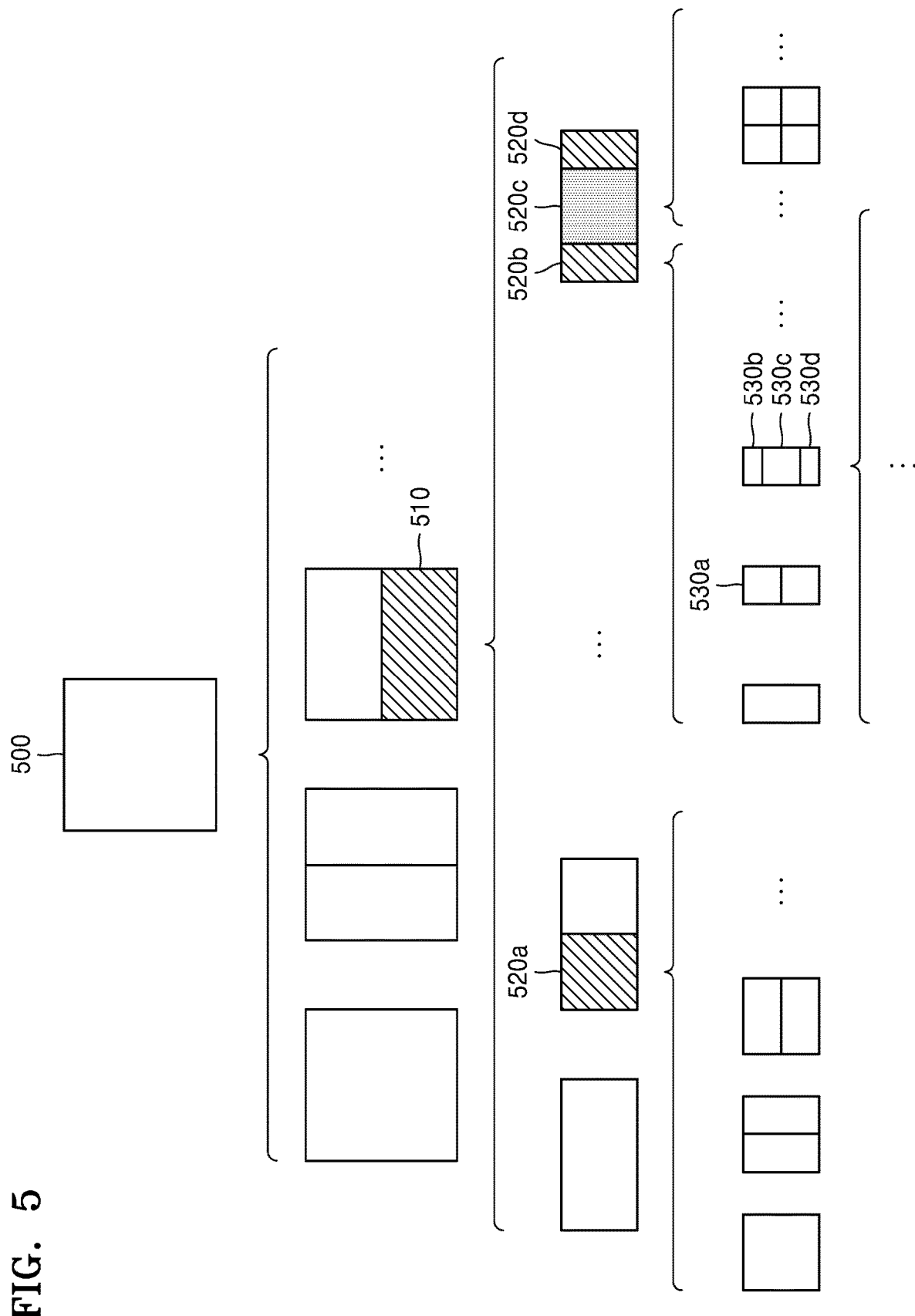
FIG. 5 illustrates a process, performed by an image decoding device, of splitting a coding unit based on at least one of block shape information and split shape mode information, according to an embodiment.

FIG. 5 illustrates a process, performed by an image decoding device, of splitting a coding unit based on at least one of block shape information and split shape mode information, according to an embodiment.

According to an embodiment, the image decoding device 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding device 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding device 100 may determine to split or not to split the determined second coding unit 510 into coding units, based on the split shape mode information. Referring to FIG. 5, the image decoding device 100 may or may not split the non-square second coding unit 510, which is determined by splitting the first coding unit 500, into one or more third coding units 520a, or 520b, 520c, and 520d based on the split shape mode information. The image decoding device 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520*a*, or 520*b*, 520*c*, and 520*d* based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a certain coding unit from among the odd number of third coding units 520*b*, 520*c*, and 520*d* determined by splitting the non-square second coding unit 510 (e.g., a coding unit at a center location or a square coding unit) may be recursively split. According to an embodiment, the square third coding unit 520*c* from among the odd number of third coding units 520*b*, 520*c*, and 520*d* may be split in a horizontal direction into a plurality of fourth coding units. A non-square fourth coding unit 530*b* or 530*d* from among a plurality of fourth coding units 530*a*, 530*b*, 530*c*, and 530*d* may be split into a plurality of coding units again. For example, the non-square fourth coding unit 530*b* or 530*d* may be split into the odd number of coding units again. A method that may be used to recursively split a coding unit will be described below in relation to various embodiments.

According to an embodiment, the image decoding device 100 may split each of the third coding units 520*a*, or 520*b*, 520*c*, and 520*d* into coding units, based on the split shape mode information. Also, the image decoding device 100 may determine not to split the second coding unit 510 based on the split shape mode information. According to an embodiment, the image decoding device 100 may split the non-square second coding unit 510 into the odd number of third coding units 520*b*, 520*c*, and 520*d*. The image decoding device 100 may put a certain restriction on a certain third coding unit from among the odd number of third coding units 520*b*, 520*c*, and 520*d*. For example, the image decoding device 100 may restrict the third coding unit 520*c* at a center location from among the odd number of third coding units 520*b*, 520*c*, and 520*d* to be no longer split or to be split a settable number of times.

Referring to FIG. 5, the image decoding device 100 may restrict the third coding unit 520*c*, which is at the center location from among the odd number of third coding units 520*b*, 520*c*, and 520*d* included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an embodiment, the image decoding device 100 may obtain the split shape mode information, which is used to split a current coding unit, from a certain location in the current coding unit.

Figure 6:
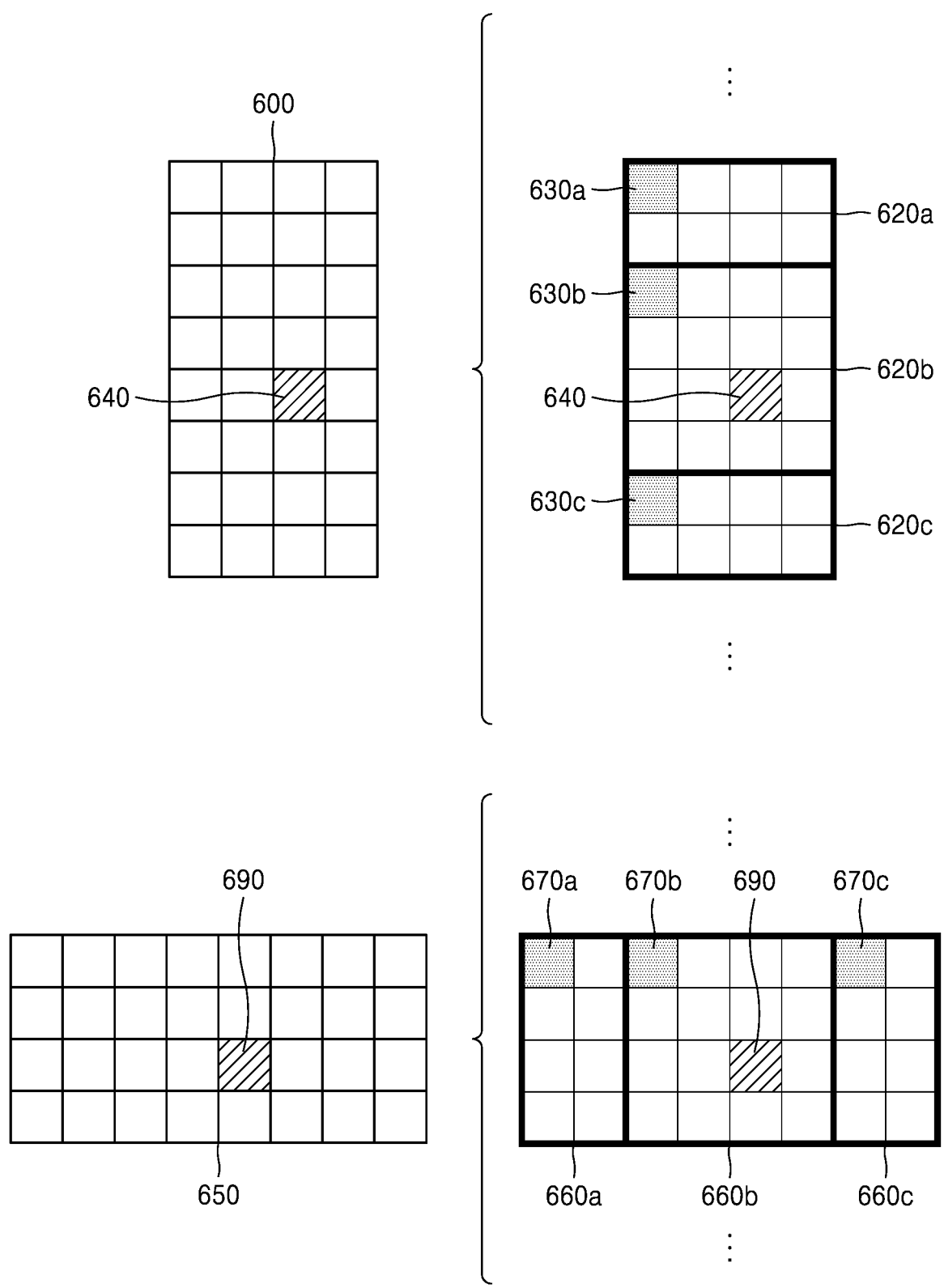
FIG. 6 illustrates a method, performed by an image decoding device, of determining a certain coding unit from among an odd number of coding units, according to an embodiment.

FIG. 6 illustrates a method, performed by an image decoding device, of determining a certain coding unit from among an odd number of coding units, according to an embodiment.

Referring to FIG. 6, split shape mode information of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, and lower right locations). The image decoding device 100 may obtain the split shape mode information from the certain location and may determine to split or not to split the current coding unit into various-shaped and various-sized coding units.

According to an embodiment, when the current coding unit is split into a certain number of coding units, the image decoding device 100 may select one of the coding units. Various methods may be used to select one of a plurality of coding units, as will be described below in relation to various embodiments.

According to an embodiment, the image decoding device 100 may split the current coding unit into a plurality of coding units, and may determine a coding unit at a certain location.

According to an embodiment, image decoding device 100 may use information indicating locations of the odd number of coding units, to determine a coding unit at a center location from among the odd number of coding units. Referring to FIG. 6, the image decoding device 100 may determine the odd number of coding units 620*a*, 620*b*, and 620*c* or the odd number of coding units 660*a*, 660*b*, and 660*c* by splitting the current coding unit 600 or the current coding unit 650. The image decoding device 100 may determine the middle coding unit 620*b* or the middle coding unit 660*b* by using information about the locations of the odd number of coding units 620*a*, 620*b*, and 620*c* or the odd number of coding units 660*a*, 660*b*, and 660*c*. For example, the image decoding device 100 may determine the coding unit 620*b* of the center location by determining the locations of the coding units 620*a*, 620*b*, and 620*c* based on information indicating locations of certain samples included in the coding units 620*a*, 620*b*, and 620*c*. In detail, the image decoding device 100 may determine the coding unit 620*b* at the center location by determining the locations of the coding units 620*a*, 620*b*, and 620*c* based on information indicating locations of upper left samples 630*a*, 630*b*, and 630*c* of the coding units 620*a*, 620*b*, and 620*c*.

According to an embodiment, the information indicating the locations of the upper left samples 630*a*, 630*b*, and 630*c*, which are included in the coding units 620*a*, 620*b*, and 620*c*, respectively, may include information about locations or coordinates of the coding units 620*a*, 620*b*, and 620*c* in a picture. According to an embodiment, the information indicating the locations of the upper left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the image decoding device 100 may determine the coding unit 620*b* at the center location by directly using the information about the locations or coordinates of the coding units 620*a*, 620*b*, and 620*c* in the picture, or by using the information about the widths or heights of the coding units, which correspond to the difference values between the coordinates.

According to an embodiment, information indicating the location of the upper left sample 630a of the upper coding unit 620a may include coordinates (xa, ya), information indicating the location of the upper left sample 630b of the middle coding unit 620b may include coordinates (xb, yb), and information indicating the location of the upper left sample 630c of the lower coding unit 620c may include coordinates (xc, yc). The image decoding device 100 may determine the middle coding unit 620b by using the coordinates of the upper left samples 630a, 630b, and 630c which are included in the coding units 620a, 620b, and 620c, respectively. For example, when the coordinates of the upper left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper left samples 630a, 630b, and 630c may include coordinates indicating absolute locations in the picture, or may use coordinates (dxb, dyb) indicating a relative location of the upper left sample 630b of the middle coding unit 620b and coordinates (dxc, dyc) indicating a relative location of the upper left sample 630c of the lower coding unit 620c with reference to the location of the upper left sample 630a of the upper coding unit 620a. A method of determining a coding unit at a certain location by using coordinates of a sample included in the coding unit, as information indicating a location of the sample, is not limited to the above-described method, and may include various arithmetic methods capable of using the coordinates of the sample.

According to an embodiment, the image decoding device 100 may split the current coding unit 600 into a plurality of coding units 620a, 620b, and 620c, and may select one of the coding units 620a, 620b, and 620c based on a certain criterion. For example, the image decoding device 100 may select the coding unit 620b, which has a size different from that of the others, from among the coding units 620a, 620b, and 620c.

According to an embodiment, the image decoding device 100 may determine the width or height of each of the coding units 620a, 620b, and 620c by using the coordinates (xa, ya) that is the information indicating the location of the upper left sample 630a of the upper coding unit 620a, the coordinates (xb, yb) that is the information indicating the location of the upper left sample 630b of the middle coding unit 620b, and the coordinates (xc, yc) that is the information indicating the location of the upper left sample 630c of the lower coding unit 620c. The image decoding device 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding device 100 may determine the width of the upper coding unit 620a to be the width of the current coding unit 600. The image decoding device 100 may determine the height of the upper coding unit 620a to be yb-ya. According to an embodiment, the image decoding device 100 may determine the width of the middle coding unit 620b to be the width of the current coding unit 600. The image decoding device 100 may determine the height of the middle coding unit 620b to be yc-yb. According to an embodiment, the image decoding device 100 may determine the width or height of the lower coding unit 620c by using the width or height of the current coding unit 600 or the widths or heights of the upper and middle coding units 620a and 620b. The image decoding device 100 may determine a coding unit, which has a size different from that of the others, based on the determined widths and heights of the coding units 620a to 620c. Referring to FIG. 6, the image decoding device 100 may determine the middle coding unit 620b, which has a size different from the size of the upper and lower coding units 620a and 620c, as the coding unit of the certain location. However, the above-described method, performed by the image decoding device 100, of determining a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

The image decoding device 100 may determine the width or height of each of the coding units 660a, 660b, and 660c by using the coordinates (xd, yd) that is information indicating the location of a upper left sample 670a of the left coding unit 660a, the coordinates (xe, ye) that is information indicating the location of a upper left sample 670b of the middle coding unit 660b, and the coordinates (xf, yf) that is information indicating a location of the upper left sample 670c of the right coding unit 660c. The image decoding device 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding device 100 may determine the width of the left coding unit 660a to be xe-xd. The image decoding device 100 may determine the height of the left coding unit 660a to be the height of the current coding unit 650. According to an embodiment, the image decoding device 100 may determine the width of the middle coding unit 660b to be xf-xe. The image decoding device 100 may determine the height of the middle coding unit 660b to be the height of the current coding unit 650. According to an embodiment, the image decoding device 100 may determine the width or height of the right coding unit 660c by using the width or height of the current coding unit 650 or the widths or heights of the left and middle coding units 660a and 660b. The image decoding device 100 may determine a coding unit, which has a size different from that of the others, based on the determined widths and heights of the coding units 660a to 660c. Referring to FIG. 6, the image decoding device 100 may determine the middle coding unit 660b, which has a size different from the sizes of the left and right coding units 660a and 660c, as the coding unit of the certain location. However, the above-described method, performed by the image decoding device 100, of determining a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

However, locations of samples considered to determine locations of coding units are not limited to the above-described upper left locations, and information about arbitrary locations of samples included in the coding units may be used.

According to an embodiment, the image decoding device 100 may select a coding unit at a certain location from among an odd number of coding units determined by splitting the current coding unit, considering the shape of the current coding unit. For example, when the current coding unit has a non-square shape, a width of which is longer than a height, the image decoding device 100 may determine the coding unit at the certain location in a horizontal direction. That is, the image decoding device 100 may determine one of coding units at different locations in a horizontal direction and put a restriction on the coding unit. When the current coding unit has a non-square shape, a height of which is longer than a width, the image decoding device 100 may determine the coding unit at the certain location in a vertical direction. That is, the image decoding device 100 may determine one of coding units at different locations in a vertical direction and may put a restriction on the coding unit.

According to an embodiment, the image decoding device 100 may use information indicating respective locations of an even number of coding units, to determine the coding unit at the certain location from among the even number of coding units. The image decoding device 100 may determine an even number of coding units by splitting (binary-splitting) the current coding unit, and may determine the coding unit at the certain location by using the information about the locations of the even number of coding units. An operation related thereto may correspond to the operation of determining a coding unit at a certain location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, certain information about a coding unit at a certain location may be used in a splitting operation to determine the coding unit at the certain location from among the plurality of coding units. For example, the image decoding device 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding device 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding device 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, certain information for identifying the coding unit at the certain location may be obtained from a certain sample included in a coding unit to be determined. Referring to FIG. 6, the image decoding device 100 may use the split shape mode information, which is obtained from a sample at a certain location in the current coding unit 600 (e.g., a sample at a center location of the current coding unit 600) to determine a coding unit at a certain location from among the plurality of the coding units 620a, 620b, and 620c determined by splitting the current coding unit 600 (e.g., a coding unit at a center location from among a plurality of split coding units). That is, the image decoding device 100 may determine the sample at the certain location by considering a block shape of the current coding unit 600, determine the coding unit 620b including a sample, from which certain information (e.g., the split shape mode information) may be obtained, from among the plurality of coding units 620a, 620b, and 620c determined by splitting the current coding unit 600, and may put a certain restriction on the coding unit 620b. Referring to FIG. 6, according to an embodiment, the image decoding device 100 may determine the sample 640 at the center location of the current coding unit 600 as the sample from which the certain information may be obtained, and may put a certain restriction on the coding unit 620b including the sample 640, in a decoding operation. However, the location of the sample from which the certain information may be obtained is not limited to the above-described location, and may include arbitrary locations of samples included in the coding unit 620b to be determined for a restriction.

According to an embodiment, the location of the sample from which the certain information may be obtained may be determined based on the shape of the current coding unit 600. According to an embodiment, the block shape information may indicate whether the current coding unit has a square or non-square shape, and the location of the sample from which the certain information may be obtained may be determined based on the shape. For example, the image decoding device 100 may determine a sample located on a boundary for splitting at least one of a width and height of the current coding unit in half, as the sample from which the certain information may be obtained, by using at least one of information about the width of the current coding unit and information about the height of the current coding unit. As another example, when the block shape information of the current coding unit indicates a non-square shape, the image decoding device 100 may determine one of samples adjacent to a boundary for splitting a long side of the current coding unit in half, as the sample from which the certain information may be obtained.

According to an embodiment, when the current coding unit is split into a plurality of coding units, the image decoding device 100 may use the split shape mode information to determine a coding unit at a certain location from among the plurality of coding units. According to an embodiment, the image decoding device 100 may obtain the split shape mode information from a sample at a certain location in a coding unit, and split the plurality of coding units, which are generated by splitting the current coding unit, by using the split shape mode information, which is obtained from the sample of the certain location in each of the plurality of coding units. That is, a coding unit may be recursively split based on the split shape mode information, which is obtained from the sample at the certain location in each coding unit. An operation of recursively splitting a coding unit has been described above in relation to FIG. 5, and thus detailed descriptions thereof will not be provided here.

According to an embodiment, the image decoding device 100 may determine one or more coding units by splitting the current coding unit, and may determine an order of decoding the one or more coding units, based on a certain block (e.g., the current coding unit).

Figure 7:
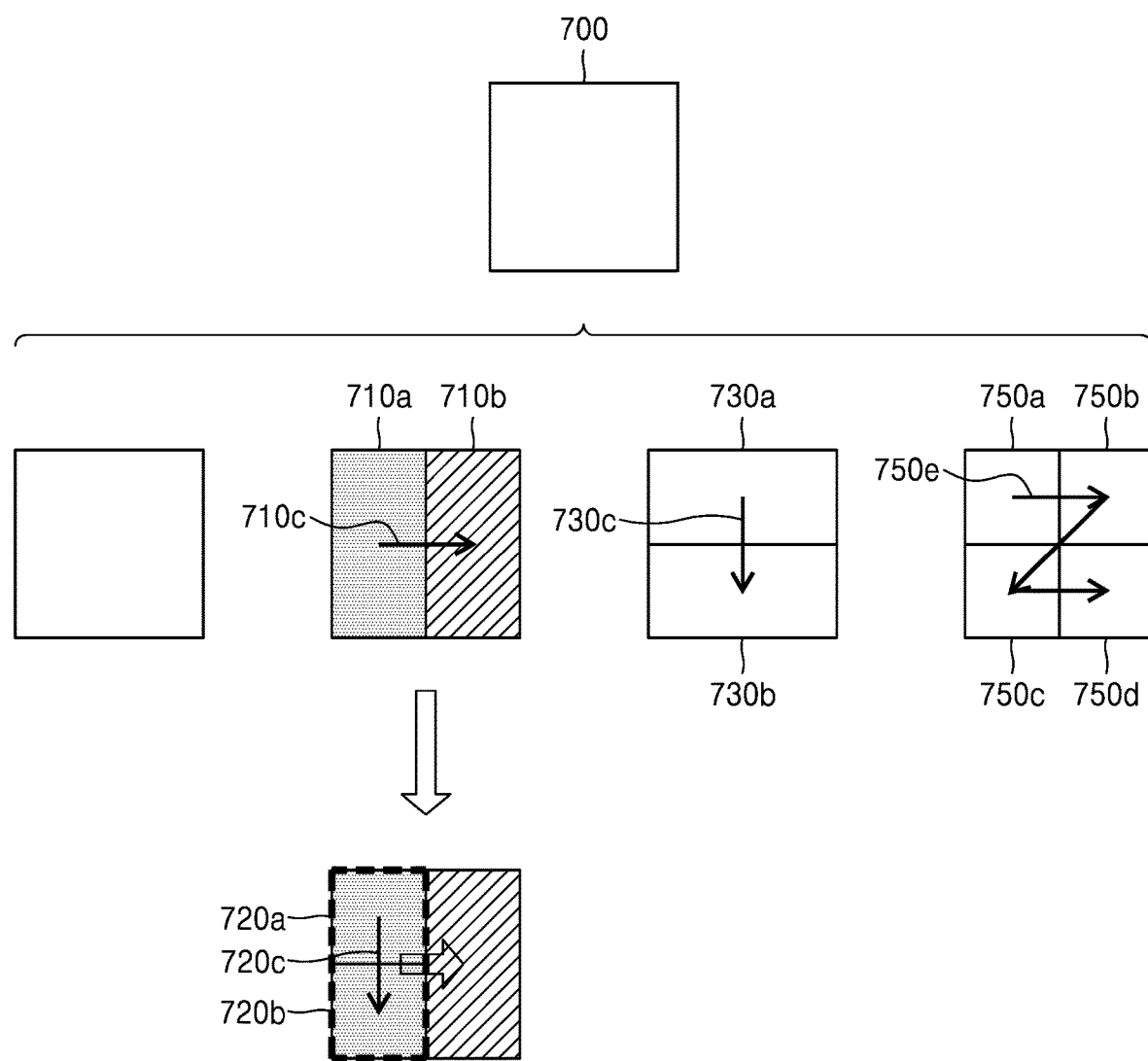
FIG. 7 illustrates an order of processing a plurality of coding units when an image decoding device determines the plurality of coding units by splitting a current coding unit, according to an embodiment.

FIG. 7 illustrates an order of processing a plurality of coding units when an image decoding device determines the plurality of coding units by splitting a current coding unit, according to an embodiment.

According to an embodiment, the image decoding device 100 may determine second coding units 710a and 710b by splitting a first coding unit 700 in a vertical direction, determine second coding units 730a and 730b by splitting the first coding unit 700 in a horizontal direction, or determine second coding units 750a to 750d by splitting the first coding unit 700 in vertical and horizontal directions, based on split shape mode information.

Referring to FIG. 7, the image decoding device 100 may determine to process the second coding units 710a and 710b, which are determined by splitting the first coding unit 700 in a vertical direction, in a horizontal direction order 710c. The image decoding device 100 may determine to process the second coding units 730a and 730b, which are determined by splitting the first coding unit 700 in a horizontal direction, in a vertical direction order 730c. The image decoding device 100 may determine to process the second coding units 750a to 750d, which are determined by splitting the first coding unit 700 in vertical and horizontal directions, in a certain order for processing coding units in a row and then processing coding units in a next row (e.g., in a raster scan order or Z-scan order 750e).

According to an embodiment, the image decoding device 100 may recursively split coding units. Referring to FIG. 7, the image decoding device 100 may determine the plurality of coding units 710a and 710b, 730a and 730b, or 750a to 750d by splitting the first coding unit 700, and recursively split each of the determined plurality of coding units 710b, 730a and 730b, or 750a to 750d. A splitting method of the plurality of coding units 710b, 730a and 730b, or 750a to 750d may correspond to a splitting method of the first coding unit 700. As such, each of the plurality of coding units 710b, 730a and 730b, or 750a to 750d may be independently split into a plurality of coding units. Referring to FIG. 7, the image decoding device 100 may determine the second coding units 710a and 710b by splitting the first coding unit 700 in a vertical direction, and may determine to independently split or not to split each of the second coding units 710a and 710b.

According to an embodiment, the image decoding device 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding device 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a certain order.

Figure 8:
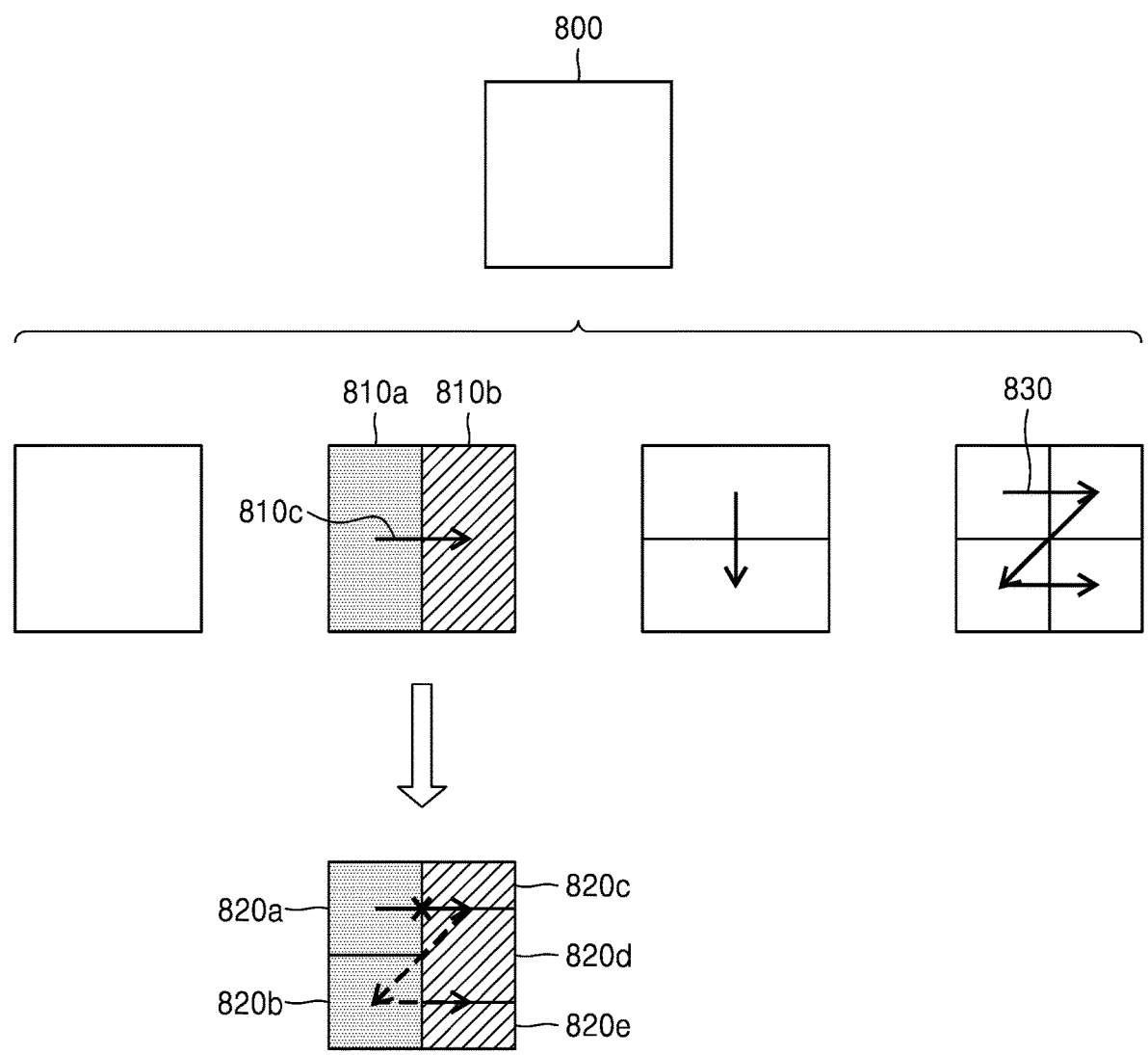
FIG. 8 illustrates a process, performed by an image decoding device, of determining that a current coding unit is to be split into an odd number of coding units, when the coding units are not processable in a certain order, according to an embodiment.

FIG. 8 illustrates a process, performed by an image decoding device, of determining that a current coding unit is to be split into an odd number of coding units, when the coding units are not processable in a certain order, according to an embodiment.

According to an embodiment, the image decoding device 100 may determine whether the current coding unit is split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c to 820e. According to an embodiment, the image decoding device 100 may determine the plurality of third coding units 820a and 820b by splitting the left second coding unit 810a in a horizontal direction, and may split the right second coding unit 810b into the odd number of third coding units 820c to 820e.

According to an embodiment, the image decoding device 100 may determine whether any coding unit is split into an odd number of coding units, by determining whether the third coding units 820a and 820b, and 820c to 820e are processable in a certain order. Referring to FIG. 8, the image decoding device 100 may determine the third coding units 820a and 820b, and 820c to 820e by recursively splitting the first coding unit 800. The image decoding device 100 may determine whether any of the first coding unit 800, the second coding units 810a and 810b, and the third coding units 820a and 820b, and 820c to 820e are split into an odd number of coding units, based on at least one of the block shape information and the split shape mode information. For example, the right second coding unit 810b among the second coding units 810a and 810b may be split into an odd number of third coding units 820c, 820d, and 820e. A processing order of a plurality of coding units included in the first coding unit 800 may be a certain order (e.g., a Z-scan order 830), and the image decoding device 100 may determine whether the third coding units 820c, 820d, and 820e, which are determined by splitting the right second coding unit 810b into an odd number of coding units, satisfy a condition for processing in the certain order.

According to an embodiment, the image decoding device 100 may determine whether the third coding units 820a and 820b, and 820c to 820e included in the first coding unit 800 satisfy the condition for processing in the certain order, and the condition relates to whether at least one of a width and height of the second coding units 810a and 810b is split in half along a boundary of the third coding units 820a and 820b, and 820c to 820e. For example, the third coding units 820a and 820b determined when the height of the left second coding unit 810a of the non-square shape is split in half may satisfy the condition. It may be determined that the third coding units 820c to 820e do not satisfy the condition because the boundaries of the third coding units 820c to 820e determined when the right second coding unit 810b is split into three coding units are unable to split the width or height of the right second coding unit 810b in half. When the condition is not satisfied as described above, the image decoding device 100 may determine disconnection of a scan order, and may determine that the right second coding unit 810*b* is split into an odd number of coding units, based on a result of the determination. According to an embodiment, when a coding unit is split into an odd number of coding units, the image decoding device 100 may put a certain restriction on a coding unit at a certain location from among the split coding units. The restriction or the certain location has been described above in relation to various embodiments, and thus detailed descriptions thereof will not be provided herein.

Figure 9:
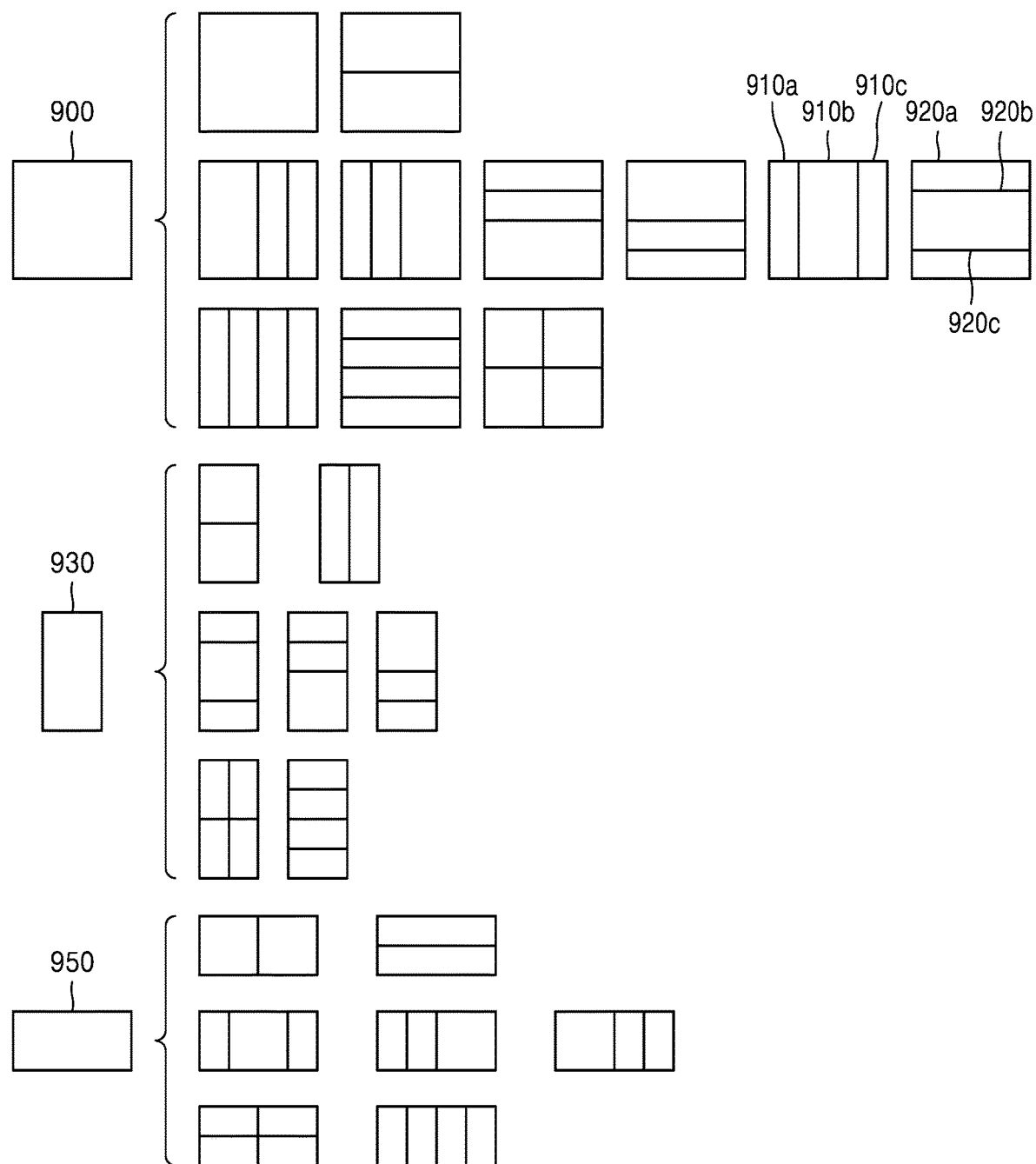
FIG. 9 illustrates a process, performed by an image decoding device, of determining at least one coding unit by splitting a first coding unit, according to an embodiment.

FIG. 9 illustrates a process, performed by an image decoding device, of determining at least one coding unit by splitting a first coding unit, according to an embodiment.

According to an embodiment, the image decoding device 100 may split the first coding unit 900, based on split shape mode information, which is obtained through the receiver 110. The square first coding unit 900 may be split into four square coding units, or may be split into a plurality of non-square coding units. For example, referring to FIG. 9, when the split shape mode information indicates to split the first coding unit 900 into non-square coding units, the image decoding device 100 may split the first coding unit 900 into a plurality of non-square coding units. In detail, when the split shape mode information indicates to determine an odd number of coding units by splitting the first coding unit 900 in a horizontal direction or a vertical direction, the image decoding device 100 may split the square first coding unit 900 into an odd number of coding units, e.g., second coding units 910*a*, 910*b*, and 910*c* determined by splitting the square first coding unit 900 in a vertical direction or second coding units 920*a*, 920*b*, and 920*c* determined by splitting the square first coding unit 900 in a horizontal direction.

According to an embodiment, the image decoding device 100 may determine whether the second coding units 910*a*, 910*b*, 910*c*, 920*a*, 920*b*, and 920*c* included in the first coding unit 900 satisfy a condition for processing in a certain order, and the condition relates to whether at least one of a width and height of the first coding unit 900 is split in half along a boundary of the second coding units 910*a*, 910*b*, 910*c*, 920*a*, 920*b*, and 920*c*. Referring to FIG. 9, because boundaries of the second coding units 910*a*, 910*b*, and 910*c* determined by splitting the square first coding unit 900 in a vertical direction do not split the width of the first coding unit 900 in half, it may be determined that the first coding unit 900 does not satisfy the condition for processing in the certain order. In addition, because boundaries of the second coding units 920*a*, 920*b*, and 920*c* determined by splitting the square first coding unit 900 in a horizontal direction do not split the height of the first coding unit 900 in half, it may be determined that the first coding unit 900 does not satisfy the condition for processing in the certain order. When the condition is not satisfied as described above, the image decoding device 100 may decide disconnection of a scan order, and may determine that the first coding unit 900 is split into an odd number of coding units, based on a result of the decision. According to an embodiment, when a coding unit is split into an odd number of coding units, the image decoding device 100 may put a certain restriction on a coding unit at a certain location from among the split coding units. The restriction or the certain location has been described above in relation to various embodiments, and thus detailed descriptions thereof will not be provided herein.

According to an embodiment, the image decoding device 100 may determine various-shaped coding units by splitting a first coding unit.

Referring to FIG. 9, the image decoding device 100 may split the square first coding unit 900 or a non-square first coding unit 930 or 950 into various-shaped coding units.

Figure 10:
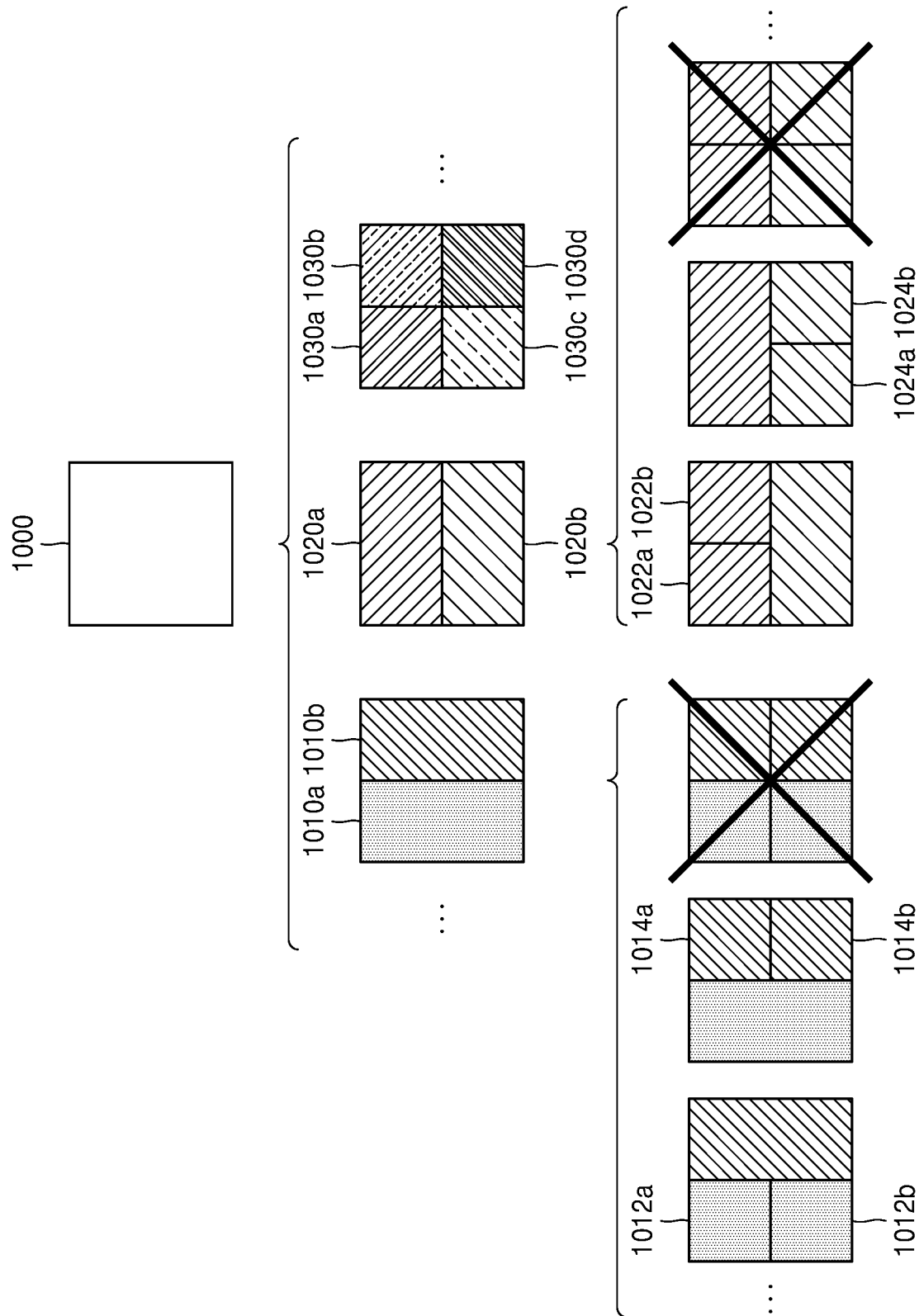
FIG. 10 illustrates that a shape into which a second coding unit is splittable is restricted when the second coding unit having a non-square shape, which is determined as an image decoding device splits a first coding unit, satisfies a certain condition, according to an embodiment.

FIG. 10 illustrates that a shape into which a second coding unit is splittable is restricted when the second coding unit having a non-square shape, which is determined as an image decoding device splits a first coding unit, satisfies a certain condition, according to an embodiment.

According to an embodiment, the image decoding device 100 may determine to split the square first coding unit 1000 into non-square second coding units 1010*a*, and 1010*b* or 1020*a* and 1020*b*, based on split shape mode information, which is obtained by the receiver 110. The second coding units 1010*a* and 1010*b* or 1020*a* and 1020*b* may be independently split. As such, the image decoding device 100 may determine to split or not to split each of the second coding units 1010*a* and 1010*b* or 1020*a* and 1020*b* into a plurality of coding units, based on the split shape mode information of each of the second coding units 1010*a* and 1010*b* or 1020*a* and 1020*b*. According to an embodiment, the image decoding device 100 may determine third coding units 1012*a* and 1012*b* by splitting the non-square left second coding unit 1010*a*, which is determined by splitting the first coding unit 1000 in a vertical direction, in a horizontal direction. However, when the left second coding unit 1010*a* is split in a horizontal direction, the image decoding device 100 may restrict the right second coding unit 1010*b* to not be split in a horizontal direction in which the left second coding unit 1010*a* is split. When third coding units 1014*a* and 1014*b* are determined by splitting the right second coding unit 1010*b* in a same direction, because the left and right second coding units 1010*a* and 1010*b* are independently split in a horizontal direction, the third coding units 1012*a* and 1012*b* or 1014*a* and 1014*b* may be determined. However, this case serves equally as a case in which the image decoding device 100 splits the first coding unit 1000 into four square second coding units 1030*a*, 1030*b*, 1030*c*, and 1030*d*, based on the split shape mode information, and may be inefficient in terms of image decoding.

According to an embodiment, the image decoding device 100 may determine third coding units 1022*a* and 1022*b* or 1024*a* and 1024*b* by splitting the non-square second coding unit 1020*a* or 1020*b*, which is determined by splitting the first coding unit 1000 in a horizontal direction, in a vertical direction. However, when a second coding unit (e.g., the upper second coding unit 1020*a*) is split in a vertical direction, for the above-described reason, the image decoding device 100 may restrict the other second coding unit (e.g., the lower second coding unit 1020*b*) to not be split in a vertical direction in which the upper second coding unit 1020*a* is split.

Figure 11:
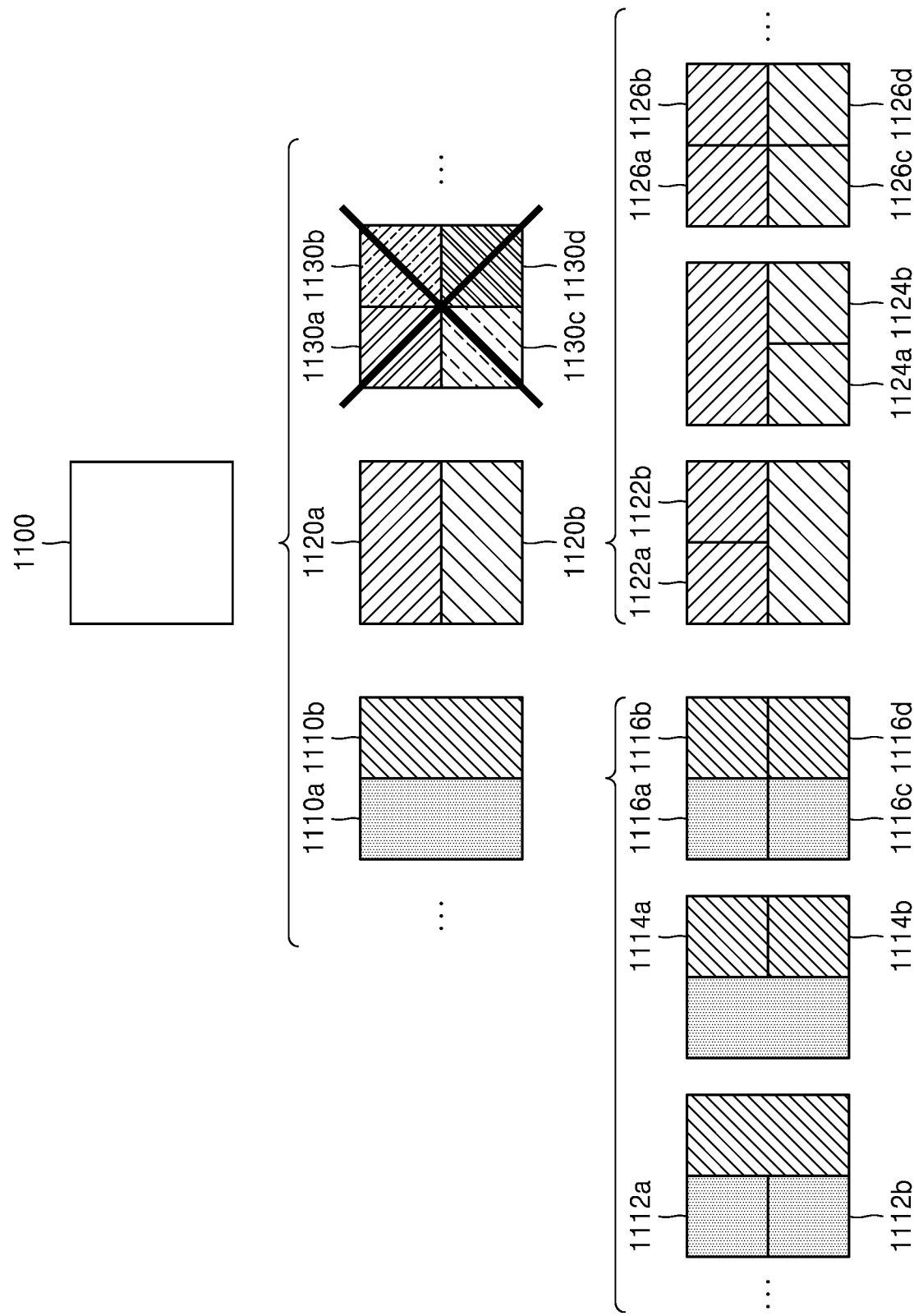
FIG. 11 illustrates a process, performed by an image decoding device, of splitting a square coding unit when split shape mode information is unable to indicate that the square coding unit is split into four square coding units, according to an embodiment.

FIG. 11 illustrates a process, performed by an image decoding device, of splitting a square coding unit when split shape mode information is unable to indicate that the square coding unit is split into four square coding units, according to an embodiment.

According to an embodiment, the image decoding device 100 may determine second coding units 1110*a* and 1110*b* or 1120*a* and 1120*b*, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding device 100 may not split the square first coding unit 1100 into four square second coding units 1130*a*, 1130*b*, 1130*c*, and 1130d. The image decoding device 100 may determine the non-square second coding units 1110a and 1110b or 1120a and 1120b, etc., based on the split shape mode information.

According to an embodiment, the image decoding device 100 may independently split the non-square second coding units 1110a and 1110b or 1120a and 1120b, etc. Each of the second coding units 1110a and 1110b or 1120a and 1120b, etc. may be recursively split in a certain order, and this splitting method may correspond to a method of splitting the first coding unit 1100, based on the split shape mode information.

For example, the image decoding device 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding device 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding device 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding device 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
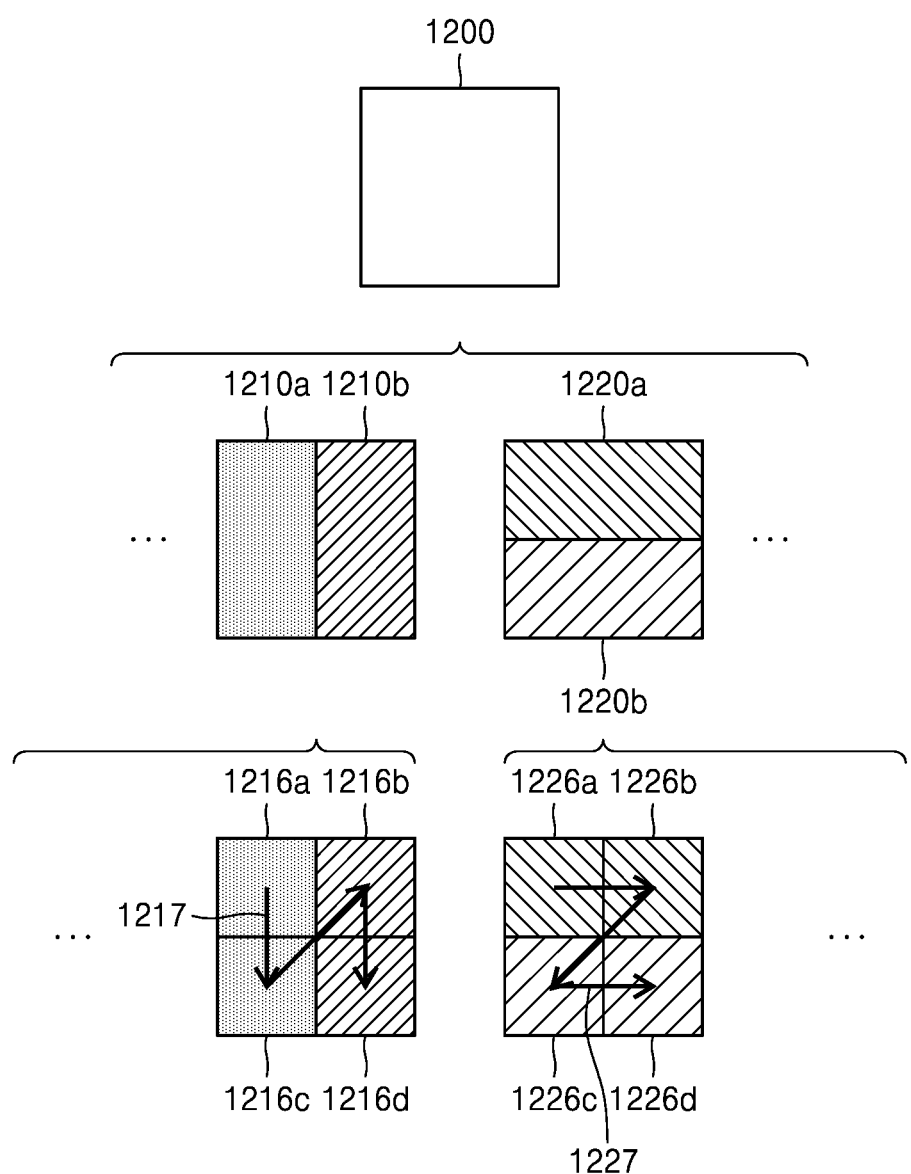
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding device 100 may split a first coding unit 1200, based on split shape mode information. When a block shape indicates a square shape and the split shape mode information indicates to split the first coding unit 1200 in at least one of horizontal and vertical directions, the image decoding device 100 may determine second coding units 1210a and 1210b or 1220a and 1220b, etc. by splitting the first coding unit 1200. Referring to FIG. 12, the non-square second coding units 1210a and 1210b or 1220a and 1220b determined by splitting the first coding unit 1200 in only a horizontal direction or vertical direction may be independently split based on the split shape mode information of each coding unit. For example, the image decoding device 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b or 1220a and 1220b has been described above in relation to FIG. 11, and thus detailed descriptions thereof will not be provided herein.

According to an embodiment, the image decoding device 100 may process coding units in a certain order. An operation of processing coding units in a certain order has been described above in relation to FIG. 7, and thus detailed descriptions thereof will not be provided herein. Referring to FIG. 12, the image decoding device 100 may determine four square third coding units 1216a, 1216b, 1216c, and 1216d, and 1226a, 1226b, 1226c, and 1226d by splitting the square first coding unit 1200. According to an embodiment, the image decoding device 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding device 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding device 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding device 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding device 100 may determine the depth of the coding unit, based on a certain criterion. For example, the certain criterion may be the length of a long side of the coding unit. When the length of a long side of a coding unit before being split is 2n times (n>0) the length of a long side of a split current coding unit, the image decoding device 100 may determine that a depth of the current coding unit is increased from a depth of the coding unit before being split, by n. In the following description, a coding unit having an increased depth is expressed as a coding unit of a deeper depth.

Referring to FIG. 13, according to an embodiment, the image decoding device 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding device 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding device 100 may determine a second coding unit 1302, 1312, or 1322 by splitting at least one of a width and height of the first coding unit 1310 having a size of N×2N. That is, the image decoding device 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding device 100 may determine the second coding unit 1302, 1312, or 1322 by splitting at least one of a width and height of the first coding unit 1320 having a size of 2N×N. That is, the image decoding device 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding device 100 may determine a third coding unit 1304, 1314, or 1324 by splitting at least one of a width and height of the second coding unit 1302 having a size of N×N. That is, the image decoding device 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding device 100 may determine the third coding unit 1304, 1314, or 1324 by splitting at least one of a width and height of the second coding unit 1312 having a size of N/2×N. That is, the image decoding device 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding device 100 may determine the third coding unit 1304, 1314, or 1324 by splitting at least one of a width and height of the second coding unit 1322 having a size of N×N/2. That is, the image decoding device 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding device 100 may split the square coding unit 1300, 1302, or 1304 in a horizontal or vertical direction. For example, the image decoding device 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
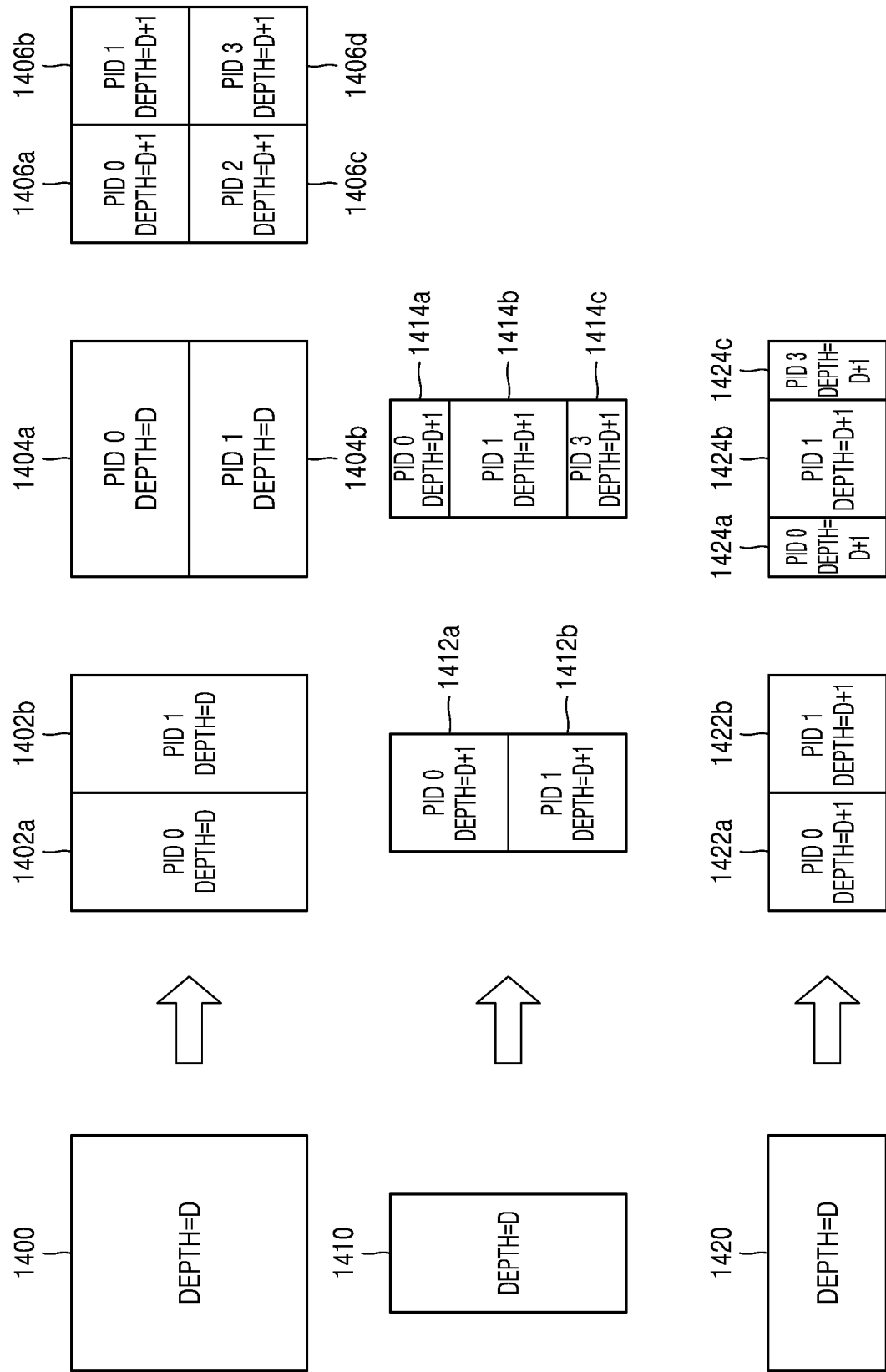
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding device 100 may determine various-shape second coding units by splitting a square first coding unit 1400. Referring to FIG. 14, the image decoding device 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding device 100 may determine the second coding units 1402a and 1402b, 1404a and 1404b, and 1406a, 1406b, 1406c, and 1406d, based on the split shape mode information of the first coding unit 1400.

According to an embodiment, a depth of the second coding units 1402a and 1402b, 1404a and 1404b, and 1406a, 1406b, 1406c, and 1406d, which are determined based on the split shape mode information of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 2100 and the non-square second coding units 1402*a* and 1402*b*, and 1404*a* and 1404*b* may have the same depth, e.g., D. However, when the image decoding device 100 splits the first coding unit 1400 into the four square second coding units 1406*a*, 1406*b*, 1406*c*, and 1406*d* based on the split shape mode information, because the length of a side of the square second coding units 1406*a*, 1406*b*, 1406*c*, and 1406*d* is ½ times the length of a side of the first coding unit 1400, a depth of the second coding units 1406*a*, 1406*b*, 1406*c*, and 1406*d* may be D+1 which is deeper than the depth D of the first coding unit 1400 by 1.

According to an embodiment, the image decoding device 100 may determine a plurality of second coding units 1412*a* and 1412*b*, and 1414*a*, 1414*b*, and 1414*c* by splitting a first coding unit 1410, a height of which is longer than a width, in a horizontal direction based on the split shape mode information. According to an embodiment, the image decoding device 100 may determine a plurality of second coding units 1422*a* and 1422*b*, and 1424*a*, 1424*b*, and 1424*c* by splitting a first coding unit 1420, a width of which is longer than a height, in a vertical direction based on the split shape mode information.

According to an embodiment, depths of the second coding units 1412*a* and 1412*b*, and 1414*a*, 1414*b*, and 1414*c*, or 1422*a* and 1422*b*, and 1424*a*, 1424*b*, and 1424*c* that are determined based on the split shape mode information of the non-square first coding unit 1410 or 1420 may be determined based on the length of a long side thereof. For example, because the length of a side of the square second coding units 1412*a* and 1412*b* is ½ times the length of a long side of the first coding unit 1410 having a non-square shape, a height of which is longer than a width, a depth of the square second coding units 1412*a* and 1412*b* is D+1 which is deeper than the depth D of the non-square first coding unit 1410 by 1.

Furthermore, the image decoding device 100 may split the non-square first coding unit 1410 into an odd number of second coding units 1414*a*, 1414*b*, and 1414*c* based on the split shape mode information. The odd number of second coding units 1414*a*, 1414*b*, and 1414*c* may include the non-square second coding units 1414*a* and 1414*c* and the square second coding unit 1414*b*. In this case, because the length of a long side of the non-square second coding units 1414*a* and 1414*c* and the length of a side of the square second coding unit 1414*b* are ½ times the length of a long side of the first coding unit 1410, a depth of the second coding units 1414*a*, 1414*b*, and 1414*c* may be D+1 which is deeper than the depth D of the non-square first coding unit 1410 by 1. The image decoding device 100 may determine depths of coding units split from the first coding unit 1420 having a non-square shape, a width of which is longer than a height, by using the above-described method of determining depths of coding units split from the first coding unit 1410.

According to an embodiment, the image decoding device 100 may determine PIDs for identifying split coding units, based on a size ratio between the coding units when an odd number of split coding units do not have equal sizes. Referring to FIG. 14, a coding unit 1414*b* of a center location among an odd number of split coding units 1414*a*, 1414*b*, and 1414*c* may have a width equal to that of the other coding units 1414*a* and 1414*c* and a height which is two times that of the other coding units 1414*a* and 1414*c*. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding device 100 may determine whether an odd number of split coding units do not have equal sizes, based on whether discontinuity is present in PIDs for identifying the split coding units.

According to an embodiment, the image decoding device 100 may determine whether to use a specific splitting method, based on PID values for identifying a plurality of coding units determined by splitting a current coding unit. Referring to FIG. 14, the image decoding device 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding device 100 may use PIDs indicating respective coding units so as to identify the respective coding units. According to an embodiment, the PID may be obtained from a sample of a certain location of each coding unit (e.g., an upper left sample).

According to an embodiment, the image decoding device 100 may determine a coding unit at a certain location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding device 100 may split the first coding unit 1410 into three coding units 1414*a*, 1414*b*, and 1414*c*. The image decoding device 100 may assign a PID to each of the three coding units 1414*a*, 1414*b*, and 1414*c*. The image decoding device 100 may compare PIDs of an odd number of split coding units to determine a coding unit at a center location from among the coding units. The image decoding device 100 may determine the coding unit 1414*b* having a PID corresponding to a middle value among the PIDs of the coding units, as the coding unit at the center location from among the coding units determined by splitting the first coding unit 1410. According to an embodiment, the image decoding device 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding device 100 may determine that a coding unit is split into a plurality of coding units including a coding unit having a size different from that of the other coding units. According to an embodiment, when the split shape mode information indicates to split a coding unit into an odd number of coding units, the image decoding device 100 may split a current coding unit in such a manner that a coding unit of a certain location among an odd number of coding units (e.g., a coding unit of a centre location) has a size different from that of the other coding units. In this case, the image decoding device 100 may determine the coding unit of the centre location, which has a different size, by using PIDs of the coding units. However, the PIDs and the size or location of the coding unit of the certain location are not limited to the above-described examples, and various PIDs and various locations and sizes of coding units may be used.

According to an embodiment, the image decoding device 100 may use a certain data unit where a coding unit starts to be recursively split.

Figure 15:
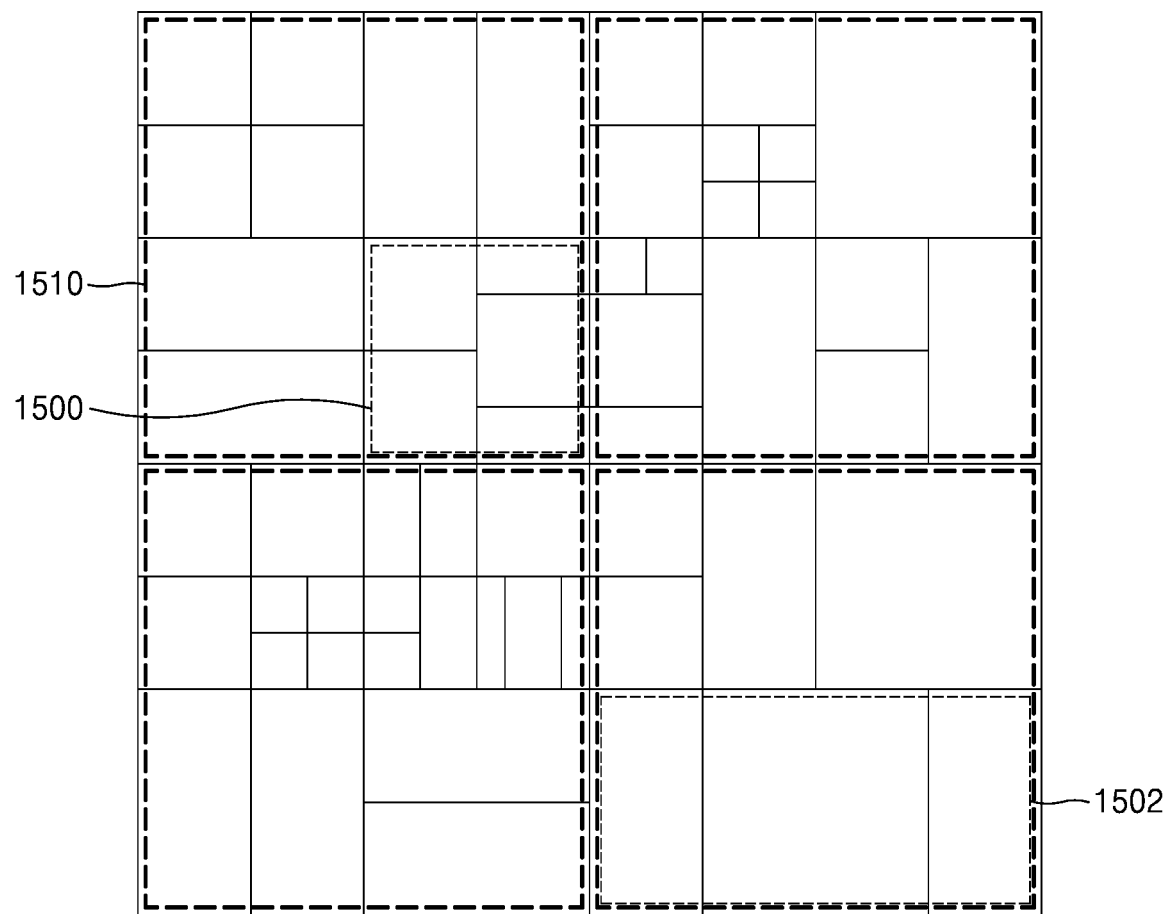
FIG. 15 illustrates that a plurality of coding units are determined based on a plurality of certain data units included in a picture, according to an embodiment.

FIG. 15 illustrates that a plurality of coding units are determined based on a plurality of certain data units included in a picture, according to an embodiment.

According to an embodiment, a certain data unit may be defined as a data unit where a coding unit starts to be recursively split by using split shape mode information. That is, the certain data unit may correspond to a coding unit of an uppermost depth, which is used to determine a plurality of coding units split from a current picture. In the following descriptions, for convenience of explanation, the certain data unit is referred to as a reference data unit.

According to an embodiment, the reference data unit may have a certain size and a certain size shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding device 100 may split the current picture into a plurality of reference data units. According to an embodiment, the image decoding device 100 may split the plurality of reference data units, which are split from the current picture, by using the split shape mode information of each reference data unit. The operation of splitting the reference data unit may correspond to a splitting operation using a quadtree structure.

According to an embodiment, the image decoding device 100 may previously determine the minimum size allowed for the reference data units included in the current picture. Accordingly, the image decoding device 100 may determine various reference data units having sizes equal to or greater than the minimum size, and may determine one or more coding units by using the split shape mode information with reference to the determined reference data unit.

Referring to FIG. 15, the image decoding device 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding device 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding device 100 may use a PID for identifying the size and shape of reference coding units, to determine the size and shape of reference coding units according to some data units previously determined based on a certain condition. That is, the receiver 110 may obtain, from the bitstream, only the PID for identifying the size and shape of reference coding units with respect to each slice, slice segment, tile, tile group, or largest coding unit which is a data unit satisfying a certain condition (e.g., a data unit having a size equal to or smaller than a slice) among the various data units (e.g., sequences, pictures, slices, slice segments, tiles, tile groups, largest coding units, or the like). The image decoding device 100 may determine the size and shape of reference data units with respect to each data unit, which satisfies the certain condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding device 100 may determine at least one of the size and shape of reference coding units included in a data unit serving as a unit for obtaining the PID, by selecting the previously determined at least one of the size and shape of reference coding units based on the PID.

According to an embodiment, the image decoding device 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding device 100 may determine the reference coding units by splitting the largest coding unit n times based on a quadtree structure, and may split the reference coding unit based on at least one of the block shape information and the split shape mode information according to various embodiments.

Figure 16:
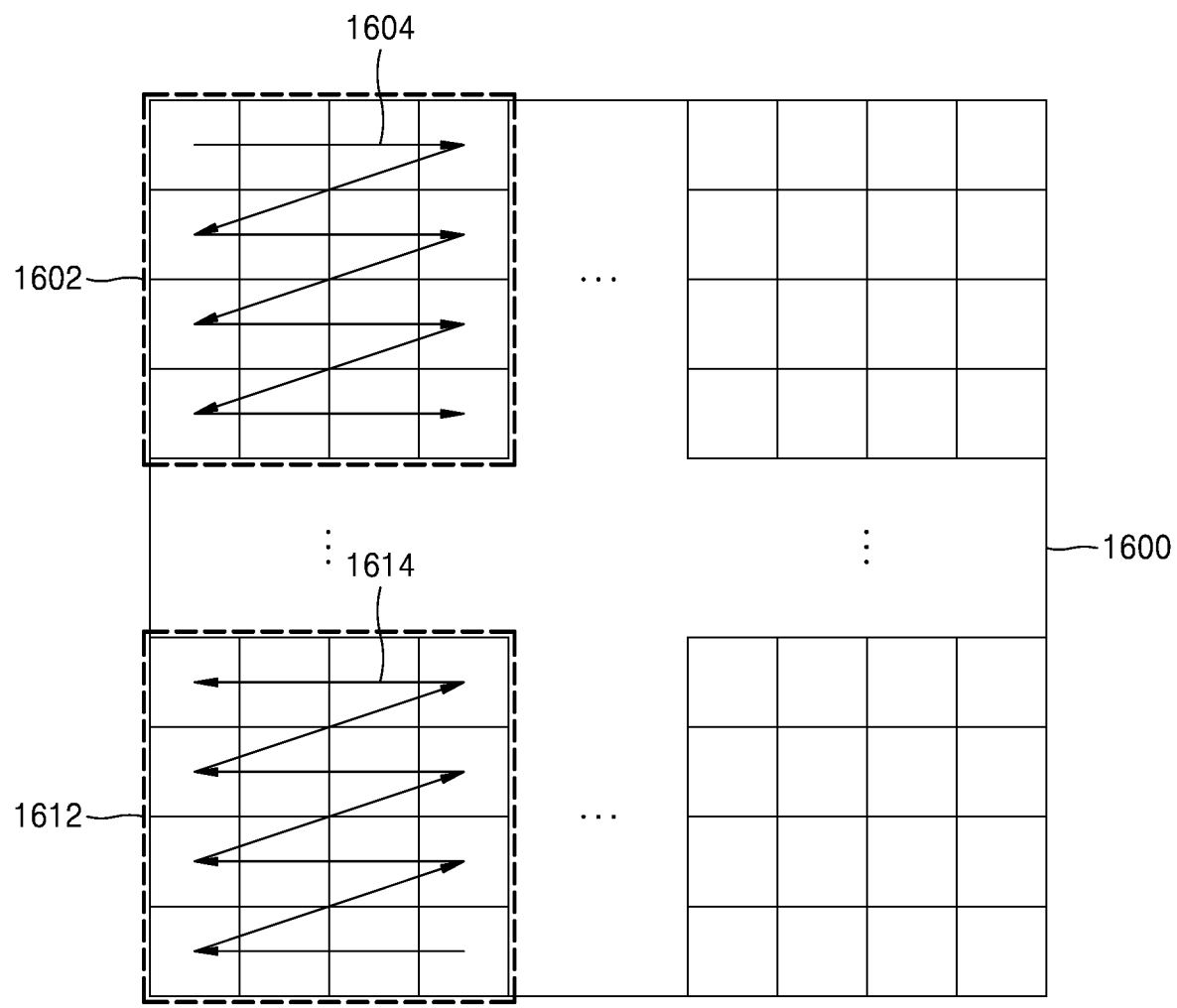
FIG. 16 illustrates a processing block serving as a criterion for determining a determination order of reference coding units included in a picture, according to an embodiment.

FIG. 16 illustrates a processing block serving as a criterion for determining a determination order of reference coding units included in a picture, according to an embodiment.

According to an embodiment, the image decoding device 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding device 100 may obtain processing block size information and may determine the size of one or more processing blocks included in the picture. The image decoding device 100 may obtain the processing block size information from a bitstream and may determine the size of one or more processing blocks included in the picture. The size of processing blocks may be a certain size of data units, which is indicated by the processing block size information.

According to an embodiment, the receiver 110 of the image decoding device 100 may obtain the processing block size information from the bitstream according to each specific data unit. For example, the processing block size information may be obtained from the bitstream in a data unit such as an image, sequence, picture, slice, slice segment, tile, or tile group. That is, the receiver 110 may obtain the processing block size information from the bitstream according to each of the various data units, and the image decoding device 100 may determine the size of one or more processing blocks, which are split from the picture, by using the obtained processing block size information. The size of the processing blocks may be integer times that of the reference coding units.

According to an embodiment, the image decoding device 100 may determine the size of processing blocks 1602 and 1612 included in the picture 1600. For example, the image decoding device 100 may determine the size of processing blocks based on the processing block size information obtained from the bitstream. Referring to FIG. 16, according to an embodiment, the image decoding device 100 may determine a width of the processing blocks 1602 and 1612 to be four times the width of the reference coding units, and may determine a height of the processing blocks 1602 and 1612 to be four times the height of the reference coding units. The image decoding device 100 may determine a determination order of one or more reference coding units in one or more processing blocks.

According to an embodiment, the image decoding device 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding device 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding device 100 may obtain, from the bitstream, the determination order information of reference coding units according to each specific data unit. For example, the receiver 110 may obtain the determination order information of reference coding units from the bitstream according to each data unit such as an image, sequence, picture, slice, slice segment, tile, tile group, or processing block. Because the determination order information of reference coding units indicates an order for determining reference coding units in a processing block, the determination order information may be obtained with respect to each specific data unit including an integer number of processing blocks.

According to an embodiment, the image decoding device 100 may determine one or more reference coding units based on the determined determination order.

According to an embodiment, the receiver 110 may obtain the determination order information of reference coding units from the bitstream as information related to the processing blocks 1602 and 1612, and the image decoding device 100 may determine a determination order of one or more reference coding units included in the processing blocks 1602 and 1612 and determine one or more reference coding units, which are included in the picture 1600, based on the determination order. Referring to FIG. 16, the image decoding device 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding device 100 may decode the determined one or more reference coding units. The image decoding device 100 may decode an image, based on the reference coding units determined as described above. A method of decoding the reference coding units may include various image decoding methods.

According to an embodiment, the image decoding device 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding device 100 may use the split shape mode information included in a sequence parameter set, a picture parameter set, a video parameter set, a slice header, a slice segment header, a tile header, or a tile group header. Furthermore, the image decoding device 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The image decoding device 100 may determine a split rule of an image. The split rule may be pre-determined between the image decoding device 100 and the image encoding device 1700. The image decoding device 100 may determine the split rule of the image, based on information obtained from a bitstream. The image decoding device 100 may determine the split rule based on the information obtained from at least one of a sequence parameter set, a picture parameter set, a video parameter set, a slice header, a slice segment header, a tile header, and a tile group header. The image decoding device 100 may determine the split rule differently according to frames, slices, tiles, temporal layers, largest coding units, or coding units.

The image decoding device 100 may determine the split rule based on a block shape of a coding unit. The block shape may include a size, shape, a ratio of width and height, and a direction of the coding unit. The image encoding device 1700 and the image decoding device 100 may pre-determine to determine the split rule based on the block shape of the coding unit. However, an embodiment is not limited thereto. The image decoding device 100 may determine the split rule based on the information obtained from the bitstream received from the image encoding device 1700.

The shape of the coding unit may include a square and a non-square. When the lengths of the width and height of the coding unit are the same, the image decoding device 100 may determine the shape of the coding unit to be a square. Also, when the lengths of the width and height of the coding unit are not the same, the image decoding device 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding device 100 may apply the same split rule to coding units classified as the same group. For example, the image decoding device 100 may classify coding units having the same lengths of the long sides as having the same size. Also, the image decoding device 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding device 100 may adaptively determine the split rule based on the size of the coding unit. The image decoding device 100 may differently determine an allowable split shape mode based on the size of the coding unit. For example, the image decoding device 100 may determine whether splitting is allowed based on the size of the coding unit. The image decoding device 100 may determine a split direction according to the size of the coding unit. The image decoding device 100 may determine an allowable split type according to the size of the coding unit.

The split rule determined based on the size of the coding unit may be a split rule pre-determined between the image encoding device 1700 and the image decoding device 100. Also, the image decoding device 100 may determine the split rule based on the information obtained from the bitstream.

The image decoding device 100 may adaptively determine the split rule based on a location of the coding unit. The image decoding device 100 may adaptively determine the split rule based on the location of the coding unit in the image.

Also, the image decoding device 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders have been described above with reference to FIG. 12, details thereof are not provided again.

A video encoding or decoding method and device for determining an intra prediction mode of a current block by using MPMs of the current block determined based on a prediction mode of a left neighboring block adjacent to a left side of the current block, a prediction mode of an upper neighboring block adjacent to an upper side of the current block, and a prediction mode of a right neighboring block adjacent to a right side of the current block, and an extended intra mode set configured based on the MPMs, according to an embodiment, will be described with reference to FIGS. 17 to 20.

Figure 17:
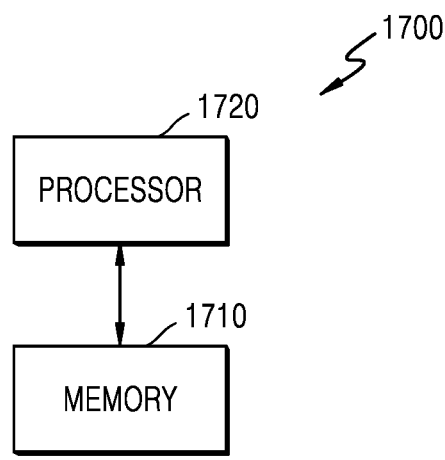
FIG. 17 is a block diagram of a video encoding device according to an embodiment.

FIG. 17 is a block diagram of a video encoding device according to an embodiment.

Intra prediction is a prediction method using only spatial reference and refers to a method of predicting a current block by referring to samples around a block to be encoded. The neighboring reference sample used for the intra prediction refers to a brightness value reconstructed through prediction and reconstruction. The intra prediction is particularly effective for flat regions with continuity and regions with constant directionality.

A video encoding device 1700 according to an embodiment may include a memory 1710 and at least one processor 1720 connected to the memory 1710. The operations of the video encoding device 1700 according to the embodiment may be performed as individual processors or may be performed under the control of a central processor. Also, the memory 1710 of the video encoding device 1700 may store external data, data generated by the processor, for example, MPM information and extended intra mode set information (or probable intra mode set (PIMS) information), and the like.

The processor 1720 of the video encoding device 1700 may perform intra prediction on a current block to generate MPM information indicating whether to use MPMs of the current block determined based on at least two of a prediction mode of a left neighboring block adjacent to a left side of the current block, a prediction mode of an upper neighboring block adjacent to an upper side of the current block, and a prediction mode of a right neighboring block adjacent to a right side of the current block, generate extended intra mode set information indicating whether to use an extended intra mode set configured based on the MPMs, and encode the MPM information and the extended intra mode set information.

Hereinafter, a detailed operation of a video encoding method, performed by the video encoding device 1700 according to an embodiment, of MPM information indicating whether to use MPMs of a current block determined based on a prediction mode of a left neighboring block adjacent to a left side of the current block, a prediction mode of an upper neighboring block adjacent to an upper side of the current block, and a prediction mode of a right neighboring block adjacent to a right side of the current block, and extended intra mode set information indicating whether to use an extended intra mode set configured based on the MPMs will be described with reference to FIG. 18.

Figure 18:
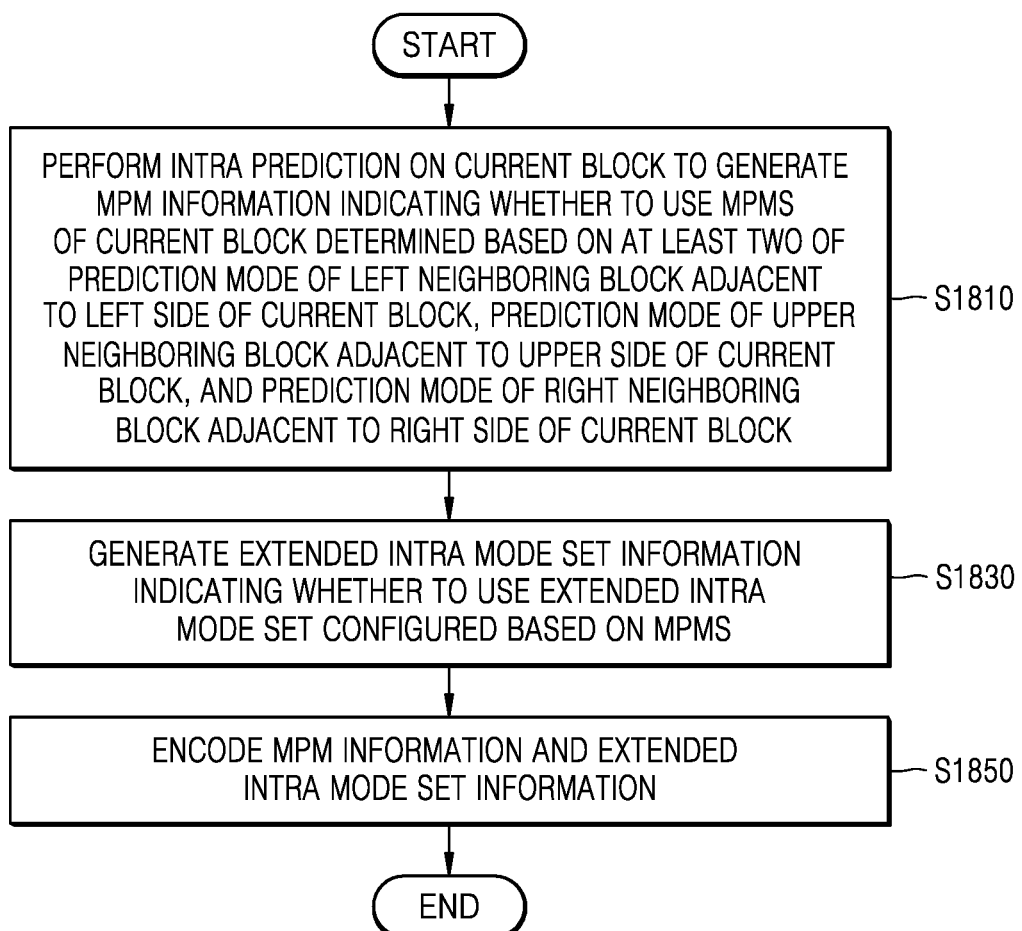
FIG. 18 is a flowchart of a video encoding method according to an embodiment.

FIG. 18 is a flowchart of a video encoding method according to an embodiment.

Referring to FIG. 18, in operation S1810, the video encoding device 1700 may perform intra prediction on a current block to generate MPM information indicating whether to use MPMs of the current block determined based on at least two of a prediction mode of a left neighboring block adjacent to a left side of the current block, a prediction mode of an upper neighboring block adjacent to an upper side of the current block, and a prediction mode of a right neighboring block adjacent to a right side of the current block.

According to an embodiment, when the right neighboring block adjacent to the right side of the current block is previously encoded and thus available, the MPM may be determined by using the right neighboring block and the upper neighboring block of the current block instead of the left neighboring block and the upper neighboring block of the current block.

Also, when the left neighboring block, the upper neighboring block, and the right neighboring block of the current block are all available and the number of MPMs is fixed to 2, only the intra prediction modes of two blocks among three blocks may be used, or the intra prediction modes of two blocks among three blocks may be selectively used. Specifically, when the intra prediction mode of the right neighboring block is available, the intra prediction mode of the left or upper neighboring block is unavailable, or the intra prediction modes of the left and upper neighboring blocks are identical to each other, the intra prediction mode of the right neighboring block may be used as the MPM.

According to an embodiment, when the intra prediction modes of the left, upper, and right neighboring blocks are all different from each other, the intra prediction mode statistically more frequently selected in the neighboring blocks may be selected as the MPM. Alternatively, two intra prediction modes more similar among the intra prediction modes of three neighboring blocks may be selected as the MPM without signaling, or two intra prediction modes with smaller residual values may be selected as the MPM through sum of transform difference (SATD) or rate distortion optimization (RDO) calculation.

When the intra prediction modes of the left, upper, and right neighboring blocks are available through availability check of a reference sample described below with reference to FIG. 22A, the number of MPMs may be changed to three and the three MPMs may be used.

In operation S1830, the video encoding device 1700 may generate extended intra mode set information indicating whether to use the extended intra mode set configured based on the MPMs.

A method of increasing the number of MPMs as the number of intra prediction modes increases has a limitation in improving performance. Therefore, in order to increase the efficiency of mode signaling, a PIMS that is likely to be selected as the intra prediction mode of the current block among the intra prediction modes not selected as the MPM may be separately configured. A detailed method of configuring a PIMS will be described below with reference to FIGS. 31A to 31C.

In the specification, the term "extended intra mode set" or "PIMS" has the same meaning and may be used interchangeably.

In operation S1850, the MPM information and the extended intra mode set information may be encoded.

According to an embodiment, the determining of the MPM and the configuring of the PIMS may be determined through SATD or RDO calculation.

According to an embodiment, the MPM information indicating whether the MPM is used and the PIMS information indicating whether the PIMS is used may be determined through SATD or RDO calculation.

According to an embodiment, after checking the MPM information indicating whether the MPM is used, the PIMS information indicating whether the PIMS is used is checked. When a PIMS flag indicating the PIMS information is 1, encoding is performed by allocating $\log_2(N)$ bits to the PIMS (N represents the number of candidates of the PIMS).

According to an embodiment, the PIMS may use unary or truncated unary coding according to the number and probability of the PIMS, such that a bit amount is reduced.

According to an embodiment, the same bits are allocated to the PIMS and encoding may be efficiently performed by using context modeling for each bit.

According to an embodiment, when the intra prediction mode other than the MPM or the PIMS is selected, encoding may be efficiently performed by allocating bits only to the remaining modes except for the MPM and the PIMS.

According to an embodiment, a block unit flag may be used like the MPM, or whether only the MPM is used or whether both the MPM and the PIMS are used may be determined according to an image or a total number of modes used.

According to an embodiment, a flag indicating whether the PIMS is used may be transmitted in frame units.

According to an embodiment, whether the PIMS is used and the number of PIMSs may be applied differently according to the size of the block.

According to an embodiment, whether the PIMS is used and the number of PIMSs may be applied differently according to an availability check result described below with reference to FIG. 22A.

Figure 19:
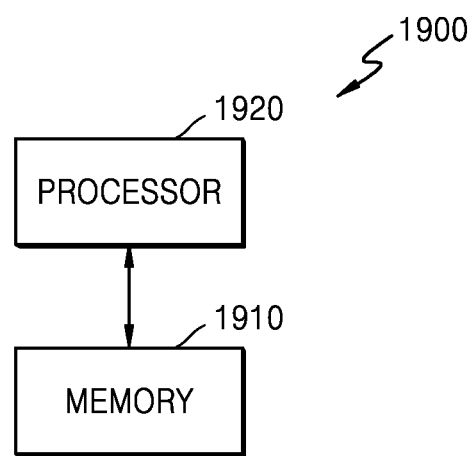
FIG. 19 is a block diagram of a video decoding device according to an embodiment.
Figure 20:
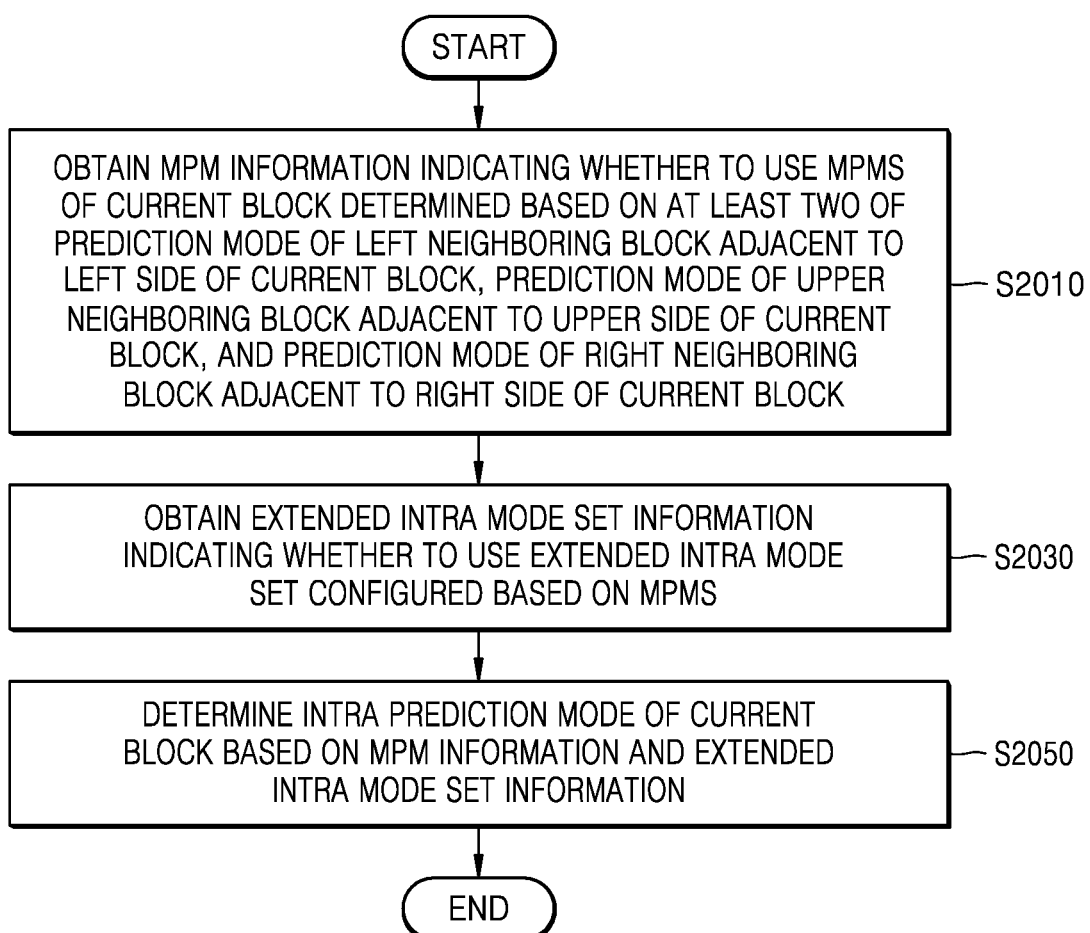
FIG. 20 is a flowchart of a video decoding method according to an embodiment.

FIGS. 19 and 20 are a block diagram of a video decoding device according to an embodiment and a flowchart of a video decoding method according to an embodiment, which correspond to the video encoding device and the video encoding method described above, respectively.

FIG. 19 is a block diagram of a video decoding device according to an embodiment.

A video decoding device 1900 according to an embodiment may include a memory 1910 and at least one processor 1920 connected to the memory 1910. The operations of the video decoding device 1900 according to the embodiment may be performed as individual processors or may be performed under the control of a central processor. Also, the memory 1910 of the video decoding device 1900 may store external data, data generated by the processor, for example, MPM information and extended intra mode set information (or PIMS information), and the like.

The processor 1920 of the video decoding device 1900 may obtain MPM information indicating whether to use MPMs of a current block determined based on at least two of a prediction mode of a left neighboring block adjacent to a left side of the current block, a prediction mode of an upper neighboring block adjacent to an upper side of the current block, and a prediction mode of a right neighboring block adjacent to a right side of the current block, obtain extended intra mode set information indicating whether to use an extended intra mode set configured based on the MPMs, and determine an intra prediction mode of the current block based on the MPM information and the extended intra mode set information.

Hereinafter, when the video decoding device 1900 determines the intra prediction mode, detailed operations of a video decoding method using the MPM information indicating whether to use the MPMs based on the neighboring blocks adjacent to the left, upper, and right sides of the current block and the extended intra mode set information indicating whether to use the extended intra mode set configured based on the MPMs will be described in detail with reference to FIG. 20.

FIG. 20 is a flowchart of a video decoding method according to an embodiment.

Referring to FIG. 20, in operation S2010, the video decoding device 1900 may obtain MPM information indicating whether to use MPMs of a current block determined based on at least two of a prediction mode of a left neighboring block adjacent to a left side of the current block, a prediction mode of an upper neighboring block adjacent to an upper side of the current block, and a prediction mode of a right neighboring block adjacent to a right side of the current block.

According to an embodiment, when the left neighboring block and the upper neighboring block are available, the MPMs of the current block may be determined as the intra prediction modes of the left neighboring block and the upper neighboring block.

According to an embodiment, when the right neighboring block and the upper neighboring block are available, the MPMs of the current block may be determined as the intra prediction modes of the right neighboring block and the upper neighboring block.

According to an embodiment, when the left, upper, and right neighboring blocks are all available and the intra prediction modes of the three neighboring blocks are different from each other, the MPMs of the current block may be determined as the intra prediction modes of the three neighboring blocks.

According to an embodiment, when the left, upper, and right neighboring blocks are all available and neighboring blocks having the same intra prediction mode are present, the MPMs of the current block may be determined as the intra prediction modes of the neighboring blocks having the same intra prediction mode and the intra prediction mode of the other neighboring block. For example, when the intra prediction modes of the left and upper neighboring blocks are identical to each other, the MPMs of the current block may be determined as the intra prediction mode of the left neighboring block and the intra prediction mode of the right neighboring block.

According to an embodiment, when the preset number of MPMs of the current block is two and the left, upper, and right neighboring blocks are all available, the MPMs of the current block may be determined by using the intra prediction modes of two blocks selected from among the left, upper, and right neighboring blocks. The intra prediction modes of the selected two blocks may be an intra prediction mode that is statistically more frequently selected from among the neighboring blocks.

According to an embodiment, when the preset number of MPMs of the current block is two, the right neighboring block is available, and only one of the left and upper neighboring blocks is available, the MPMs of the current block may be determined by using the intra prediction mode of the right neighboring block and the intra prediction mode of one block available from among the upper neighboring block and the right neighboring block.

In operation S2030, extended intra mode set information indicating whether to use the extended intra mode set configured based on the MPMs may be obtained.

According to an embodiment, when the MPMs of the current block include the intra prediction modes of the left neighboring block, the upper neighboring block, and the right neighboring block, the extended intra mode set may be configured by using the MPMs of the current block. Specifically, the extended intra mode set may include intra prediction modes having indexes close to the index of the MPM.

According to an embodiment, when the MPMs of the current block include the intra prediction modes of the left neighboring block and the upper neighboring block, the extended intra mode set may be configured by using the MPMs of the current block and the prediction mode of the right neighboring block. For example, although the MPM is determined as the intra prediction modes of the left neighboring block and the upper neighboring block, the right neighboring block having high association with the mode of the current block is available. Therefore, the extended intra mode set may be configured by using the intra prediction mode of the right neighboring block.

According to an embodiment, the extended intra mode set may be configured according to the types of the MPMs of the current block. Specifically, the number of modes constituting the extended intra mode set may be differently determined according to a case in which all the MPMs are non-directional modes, a case in which all the MPMs are directional modes, and a case where both the non-directional mode and the directional mode are present. When all the MPMs are non-directional modes, the extended intra mode set may include fewer modes and may include a non-directional mode, a diagonal mode, a horizontal mode, or a vertical mode, which is not included in the MPM.

According to an embodiment, when the left neighboring block, the upper neighboring block, and the right neighboring block are all available and the prediction modes of the left neighboring block, the upper neighboring block, and the right neighboring block are different directional modes, the extended intra mode set may include an intra prediction mode of an index increased by N from an index of the intra prediction mode of the left neighboring block, an intra prediction mode of an index decreased by N from the index of the intra prediction mode of the left neighboring block, an intra prediction mode of an index increased by M from an index of the intra prediction mode of the upper neighboring block, an intra prediction mode of an index decreased by M from the index of the intra prediction mode of the upper neighboring block, an intra prediction mode of an index increased by L from an index of the intra prediction mode of the right neighboring block, and an intra prediction mode of an index decreased by L from the index of the intra prediction mode of the right neighboring block, wherein N, M, and L may be integers other than zero.

According to an embodiment, when the preset number of MPMs of the block is two and the MPMs are a DC mode and a bilinear mode, the extended intra mode set may include a plane mode, a horizontal mode, a vertical mode, and a diagonal mode. The bilinear mode will be described below with reference to FIGS. 24A to 24C.

According to an embodiment, when the preset number of MPMs of the current block is two and the MPMs are a DC mode and a directional mode, the extended intra mode set may include a bilinear mode, a plane mode, an intra prediction mode of an index increased by 1 from an index of the directional mode, an intra prediction mode of an index increased by 2 from the index of the directional mode, an intra prediction mode of an index decreased by 1 from the index of the directional mode, an intra prediction mode of an index decreased by 2 from the index of the directional mode, a first default mode, and a second default mode, and the first default mode and the second default mode may be preset intra prediction modes. The "default mode" may be determined from a list in which intra prediction modes having a statistically high probability of being selected are sequentially listed. For example, when the MPM is a DC mode and an intra prediction mode having an index of 57, the extended intra mode set may include a bilinear mode, a plane mode, modes having indexes of 55, 56, 58, and 59, respectively, a default mode [0], and a default mode [1].

According to an embodiment, when the preset number of MPMs of the current block is two and the MPMs are a first directional mode and a second directional mode, the extended intra mode set may include an intra prediction mode of an index increased by 1 from an index of the first directional mode, an intra prediction mode of an index decreased by 1 from the index of the first directional mode, an intra prediction mode of an index increased by 1 from an index of the second directional mode, an intra prediction mode of an index decreased by 1 from the index of the second directional mode, a horizontal mode, a vertical mode, a DC mode, and a bilinear mode. For example, when the MPMs are intra prediction modes having indexes of 30 and 40, the extended intra mode set may include modes having indexes of 29, 31, 39, and 41, a vertical mode, a horizontal mode, a DC mode, and a bilinear mode.

According to an embodiment, when the MPM is a DC mode and a first directional mode, which are the intra prediction modes of the left and upper neighboring blocks, and the prediction mode of the right neighboring block not determined as the MPM is a second directional mode, the extended intra mode set may include a bilinear mode, a plane mode, the second directional mode, an intra prediction mode of an index increased by 1 from an index of the first directional mode, an intra prediction mode of an index decreased by 1 from the index of the first directional mode, an intra prediction mode of an index increased by 1 from an index of the second directional mode, an intra prediction mode of an index decreased by 1 from the index of the second directional mode, and a default mode. The default mode may be a preset intra prediction mode. For example, when the MPM is a DC mode and a mode having an index of 57 and the intra prediction mode of the right neighboring block is 40, the extended intra mode set may include a bilinear mode, a plane mode, modes having indexes of 40, 56, 58, 39, and 41, and a default mode [0].

According to an embodiment, when the MPM is a first directional mode and a second directional mode, which are intra prediction modes of the left and upper neighboring blocks, and the prediction mode of the right neighboring block not used as the MPM is a third directional mode, the extended intra mode set may include the third directional mode, an intra prediction mode of an index increased by 1 from an index of the first directional mode, an intra prediction mode of an index decreased by 1 from the index of the first directional mode, an intra prediction mode of an index increased by 1 from an index of the second directional mode, an intra neighboring mode of an index decreased by 1 from the index of the second directional mode, an intra prediction mode of an index increased by 1 from an index of the third directional mode, and an intra prediction mode of an index decreased by 1 from index of third directional mode. For example, when the indexes of the MPMs are 40 and 57 and the index of the intra prediction mode of the right neighboring block is 55, the extended intra mode set may include intra prediction modes having indexes of 55, 39, 41, 53, 54, 56, 58, and 59.

In operation S2050, the intra prediction mode of the current block may be determined based on the MPM information and the extended intra mode set information.

Specifically, when the MPM information about whether to use the MPM indicates that the MPMs are used, one of the intra prediction modes of the MPMs may be determined as the intra prediction mode of the current block. When the MPM information indicates that the MPMs are not used and the extended intra mode set information indicates that the extended intra mode set is used, one of the intra prediction modes included in the extended intra mode set may be determined as the intra prediction mode of the current block. When the extended intra mode set information indicates that the extended intra mode set is not used, one of the remaining intra prediction modes other than the MPM and the modes included in the extended intra mode set may be determined as the intra prediction mode of the current block. A syntax for operation S2050 will be described below with reference to FIG. 32A.

In addition to the MPM, the extended intra mode set is additionally configured. Thus, in the intra prediction, a case in which an MPM other than an accurate mode is selected by mode encoding efficiency may be supplemented such that prediction accuracy is improved. Because the information of the right neighboring block is additionally added, candidates may be presented by allocating a small number of bits to various intra prediction modes. Thus, mode encoding efficiency may be improved.

A method of determining whether the left, upper, and right neighboring blocks are available will be described below with reference to FIGS. 21 and 22A.

Figure 21:
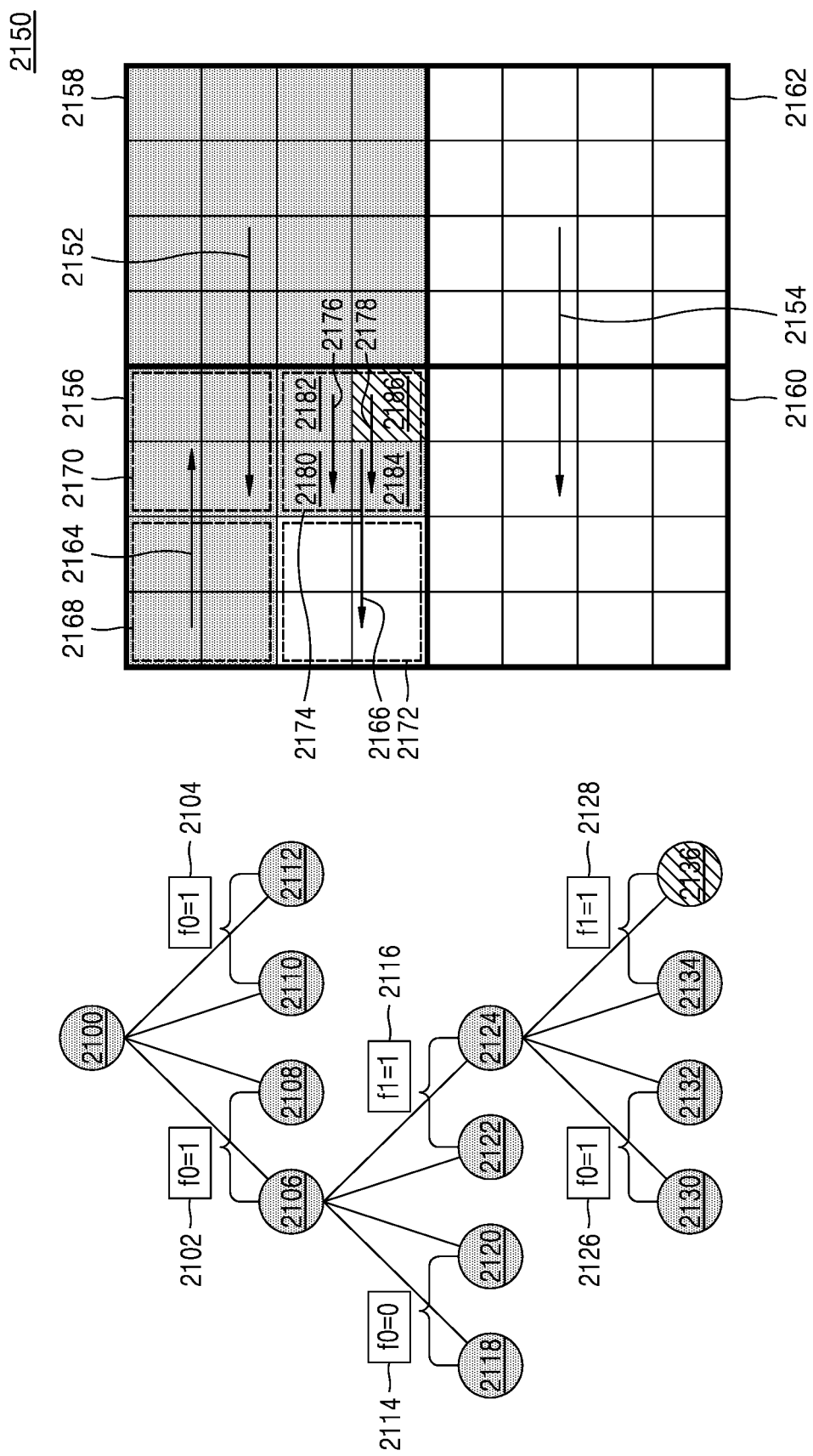
FIG. 21 is a diagram for describing a coding order of a largest coding unit and coding units included in the largest coding unit.

FIG. 21 is a diagram for describing a coding order of a largest coding unit and coding units included in the largest coding unit.

A largest coding unit 2150 is split into a plurality of coding units 2156, 2158, 2160, 2162, 2168, 2170, 2172, 2174, 2180, 2182, 2184, and 2186. The largest coding unit 2150 corresponds to a highest node 2100 of a tree structure. The coding units 2156, 2158, 2160, 2162, 2168, 2170, 2172, 2174, 2180, 2182, 2184, and 2186 correspond to a plurality of nodes 2106, 2108, 2110, 2112, 2118, 2121, 2122, 2124, 2130, 2132, 2134, and 2136, respectively. Upper coding order flags 2102, 2114, and 2126 indicating the coding order in the tree structure correspond to arrows 2152, 2164, and 2176, respectively, and upper coding order flags 2104, 2116, and 2128 correspond to arrows 2154, 2166, and 2178, respectively.

The upper coding order flag indicates a coding order of two coding units located at an upper end among four coding units split from one coding unit. When the upper coding order flag is 0, encoding is performed in a forward direction. In contrast, when the upper coding order flag is 1, encoding is performed in a reverse direction.

Similarly, a lower coding order flag indicates a coding order of two coding units located at a lower end among four coding units split from one coding unit. When the lower coding order flag is 0, encoding is performed in a forward direction. In contrast, when the lower coding order flag is 1, encoding is performed in a reverse direction.

For example, because the upper coding order flag 2114 is 0, the coding order of the coding units 2168 and 2170 is determined in a direction from left to right, that is, a forward direction. Because the lower coding order flag 2116 is 1, the coding order of the coding units 2172 and 2174 is determined in a direction from right to left, that is, a reverse direction.

According to an embodiment, the upper coding order flag and the lower coding order flag may be set to have the same value. For example, when the upper coding order flag 2102 is determined to be 1, the lower coding order flag 2104 corresponding to the upper coding order flag 2102 may also be determined to be 1. Because the values of the upper coding order flag and the lower coding order flag are determined to be 1 bit, the information amount of coding order information decreases.

According to an embodiment, the upper coding order flag and the lower coding order flag of the current coding unit may be determined by referring to at least one of an upper coding order flag and a lower coding order flag that are applied to a coding unit larger than the current coding unit. For example, the upper coding order flag 2126 and the lower coding order flag 2128 that re applied to the coding units 2180, 2182, 2184, and 2186 may be determined based on the lower coding order flag 2116 applied to the coding units 2172 and 2174. Therefore, the upper coding order flag 2126 and the lower coding order flag 2128 may be determined to be the same values as the coding order flag 2116. Because the values of the upper coding order flag and the lower coding order flag are determined from the higher coding unit of the current coding unit, coding order information is not obtained from a bitstream. Therefore, the information amount of the coding order information decreases.

According to an embodiment, whether a coding order flag for a block is obtained may be determined according to a size or a depth of the block. For example, a coding order flag may be obtained only for a block of a preset size, and a coding order flag may not be obtained for blocks of other sizes. When the current block is larger than the block of the preset size, the coding order may be determined in the forward direction without obtaining a coding order flag. When the current block is smaller than the block of the preset size, the coding order may be determined according to the higher block of the current block without obtaining a coding order flag. The size of the block in which the coding order flag is obtained may be arbitrarily determined. For example, the size of the block in which the coding order flag is obtained may be determined as 16×16 and 32×32.

Figure 22A:
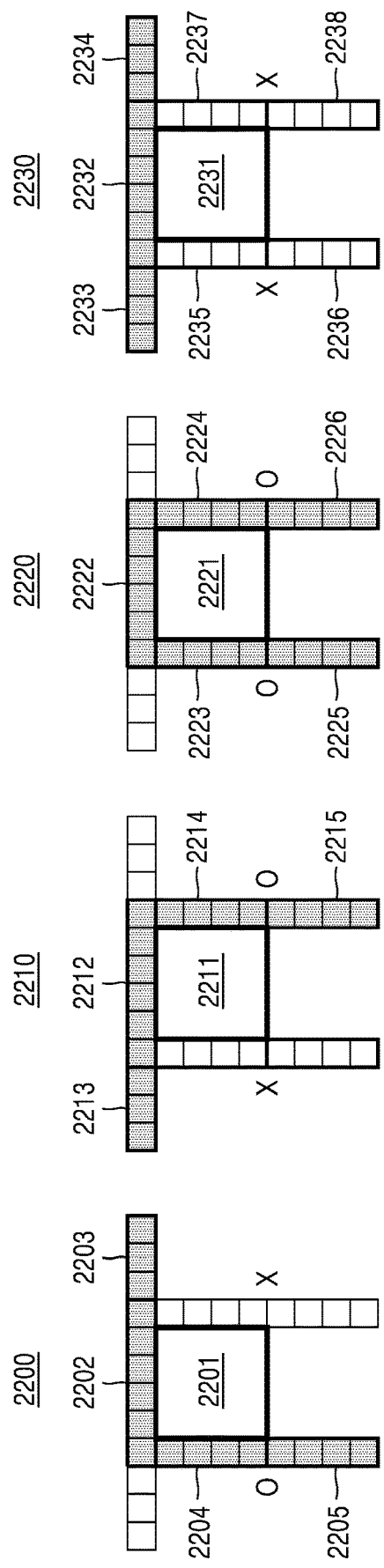
FIG. 22A illustrates an intra prediction method according to whether a neighboring block is reconstructed.

FIG. 22A illustrates an intra prediction method according to whether a neighboring block is reconstructed.

A location of a reference block that is available in a current block may be changed according to the coding order described above with reference to FIG. 21. The locations of the currently available reference block may be classified through an availability check. Specifically, the locations of the currently available reference block may be classified into LR_10 2200, LR_01 2210, LR_11 2220, and LR_00 2230, wherein L indicates left, R indicates right, and 0 or 1 indicates whether reference is possible.

The case of LR_01 2210 and LR_11 2220 is an embodiment that is not used in the related art. In particular, the case of LR_11 2220 may use more information than before. Therefore, it is necessary to modify an algorithm for a case in which left, upper, and right sides are all available. The modified algorithm will be described below with reference to FIG. 22B.

A first embodiment 2200 is an intra prediction method when an upper block and a left block are reconstructed earlier than a current block 2201 according to a decoding order. In the first embodiment 2200, upper reference samples 2202, upper-right reference samples 2203, left reference samples 2204, and lower-left reference samples 2205 may be used for intra prediction. The first embodiment 2200 occurs in a conventional video decoding method in which a decoding order is not switched, and the current block 2201 is predicted according to a conventional intra prediction method.

A second embodiment 2210 is an intra prediction method when an upper block and a right block are reconstructed earlier than a current block 2201 according to a decoding order. In the second embodiment 2210, upper reference samples 2212, upper-left reference samples 2213, right reference samples 2214, and lower-right reference samples 2215 may be used for intra prediction. Because the second embodiment 2210 is bilaterally symmetrical to the first embodiment 2200, the intra prediction method according to the second embodiment 2210 is bilaterally symmetrical to the intra prediction method according to the first embodiment 2200. For example, when a horizontal mode is applied to the current block, the left reference samples 2204 are referred to in the first embodiment 2200, whereas the right reference samples 2214 are referred to in the second embodiment 2210. Similarly, the intra prediction method according to other directional intra modes and a planner mode of the second embodiment 2210 may also be bilaterally symmetrical to the intra prediction method according to other directional intra modes and a planner mode of the first embodiment 2200.

A third embodiment 2220 is an intra prediction method when an upper block, a left block, and a right block are reconstructed earlier than a current block according to a decoding order. In the third embodiment 2220, upper reference samples 2222, left reference samples 2223, right reference samples 2224, lower-left reference samples 2225, and lower-right reference samples 2226 may be used for intra prediction. In the third embodiment 2220, left reference samples 2222 and right reference samples 2224 may be used for the prediction of the current block 2221. For example, when a horizontal mode is applied to the current block 2221, the video decoding device 1900 may predict the current block 2221 by using an average or a weighted average of a first reference value obtained from the left reference samples 2223 and a second reference value obtained from the right reference samples 2224.

According to another embodiment, the video decoding device 1900 may predict the current block 2221 of the third embodiment 2220 by using an average value of a first intermediate prediction value according to the intra prediction method of the first embodiment 2200 and a second intermediate prediction value according to the intra prediction method of the second embodiment 2210. For example, when a horizontal mode is applied to the current block 2221, the video decoding device 1900 may obtain a final prediction value of the current block 2221 according to the third embodiment 2220 based on a first intermediate prediction value obtained from the left reference samples 2204 according to the intra prediction method of the first embodiment 2200 and a second intermediate prediction value obtained from the right reference samples 2214 according to the intra prediction method of the second embodiment 2210.

According to another embodiment, the video decoding device 1900 may predict the current block 2221 of the third embodiment 2220 by using one of a first prediction value according to the intra prediction method of the first embodiment 2200 and a second prediction value according to the intra prediction method of the second embodiment 2210. For example, when a horizontal mode is applied to the current block 2221, the video decoding device 1900 may obtain a final prediction value of the current block 2221 according to the third embodiment 2220 by using one selected from among a first prediction value obtained from the left reference samples 2204 according to the intra prediction method of the first embodiment 2200 and a second prediction value obtained from the right reference samples 2214 according to the intra prediction method of the second embodiment 2210.

A fourth embodiment 2230 is an intra prediction method when only an upper block, an upper-left block, and an upper-right block are reconstructed earlier than a current block 2231. In the fourth embodiment 2230, upper reference samples 2232, upper-left reference samples 2233, and upper-right reference samples 2234 may be used for intra prediction. Therefore, an intra prediction method in which left reference samples 2235, lower-left reference samples 2236, right reference samples 2237, and lower-right reference samples 2238 are essentially used may not be used in the fourth embodiment 2230. For example, because the horizontal mode uses left reference samples or right reference samples, the horizontal mode may not be used in the fourth embodiment 2230.

In the fourth embodiment 2230, the reference samples adjacent to the current block 2231 are only the upper reference samples 2232 according to the decoding order. Also, because the upper-left reference samples 2233 and the upper-right reference samples 2234 are spatially separated from the current block, the prediction accuracy may be low compared to the other embodiments 2200, 2210, and 2220. Therefore, the intra prediction method used in the fourth embodiment 2230 is preferably a vertical mode using the reference sample 2232 of the upper block adjacent to the current block 2231 or a directional prediction mode in a direction adjacent to the vertical mode.

However, when the left reference samples 2235, the lower-left reference samples 2236, the right reference samples, and the lower-right reference samples 2238 are padded based on the upper reference samples 2232, the upper-left reference samples 2233, and the upper-right reference samples 2234, the video decoding device 1900 may predict the current block 2231 of the fourth embodiment 2230 according to the intra prediction method of the third embodiment 2220.

FIG. 22B illustrates a modified algorithm for a case in which a right neighboring block adjacent to a right side of a current block is available.

Referring to FIG. 22B, when LR_11 indicating that the left, upper, and right sides are all available is obtained through availability check, an extended algorithm using all the left, upper, and right reference blocks is applied. When LR_01 indicating that the upper and right sides are available is obtained, an extended algorithm using the upper and right reference blocks is applied. In the other cases (LR_00 and LR_10), an existing algorithm using the upper reference block or the upper and left reference blocks is applied.

Unlike the existing algorithm, because not the left reference block but the right reference block is available, an extended algorithm obtained by extending the existing algorithm in a bilateral symmetrical manner may be used. For example, a table obtained by flipping a filter or weight coefficient table left and right may be used.

According to an embodiment, in the case of LR_11, the left and right reference blocks are all available. Therefore, the left and right reference blocks may be used for more accurate prediction. Specifically, the left and right reference blocks may be used for prediction at the same ratio, or the weights may be calculated according to the distance (distance difference) to perform linear combination or non-linear combination and may be used for prediction.

The availability of the reference block may be checked through the availability check of the reference block, and the reference block may be selectively used among the available reference blocks according to the intra mode of the current block. When the reference block is selectively used, the reference block to be used without signaling may be selected by using neighboring information. Alternatively, the reference block to be used may be determined by extending the intra mode and performing RDO.

According to FIG. 22B, because the prediction method is determined according to the availability check result of the reference block, an existing algorithm may be replaced with an extended algorithm without separate signaling in LR_01 and LR_11 using the right reference block.

Referring to FIGS. 21 to 22B, the prediction accuracy may be improved by variously using neighboring information including right reference samples, and encoding efficiency may be increased because information to be used may be determined through the availability check and signaling is not required.

Figure 23:
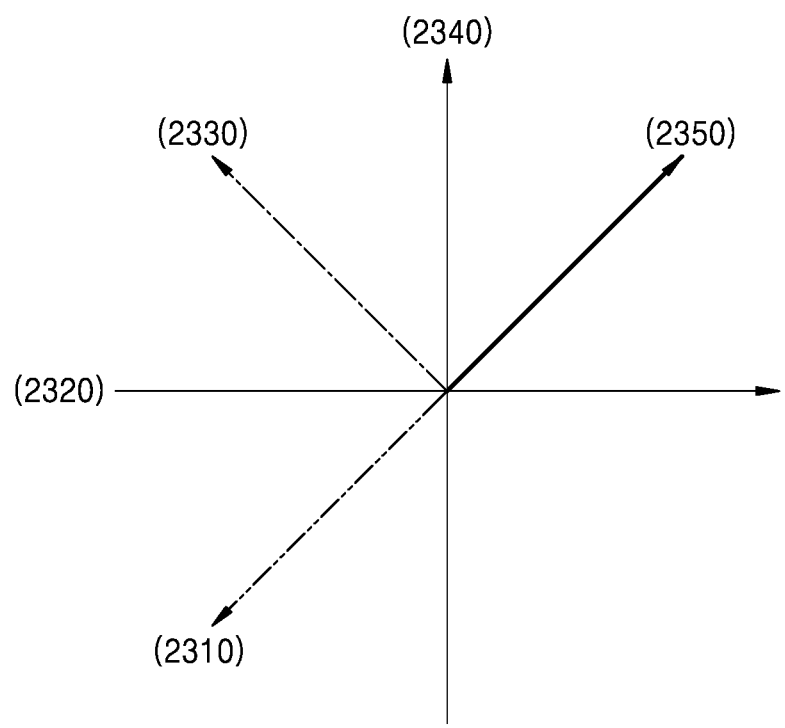
FIG. 23 illustrates an embodiment of an intra prediction mode direction.

FIG. 23 illustrates an embodiment of an intra prediction mode direction.

Specifically, a vertical direction 2340 that is a positive direction of y-axis and a horizontal direction 2320 that is a negative direction of x-axis among the intra prediction directions of the intra prediction mode of FIG. 23 illustrates a vertical mode and a horizontal mode of the intra prediction mode, respectively. Also, FIG. 23 illustrates a diagonal directional mode 2350 on a first quadrant, which is a last direction among the intra prediction direction, a diagonal directional mode 2310 on a third quadrant, which is a start direction of a directional mode, and a diagonal mode 2330 perpendicular to a direction of a 45-degree directional mode 2350. The direction of the directional mode 2350 among the intra prediction modes of FIG. 23 may be an angular direction other than the 45-degree direction.

According to an embodiment, 67 intra prediction modes may be provided. Specifically, the intra prediction modes may include a DC mode, a planar mode, and 65 directional modes. The intra prediction modes may be classified by indicating the indexes of the intra prediction modes as 0 to 66 (0 is the planar mode, 1 is the DC mode, and 2 to 66 are the directional modes).

Referring to FIG. 23, a mode in which the index of the intra prediction mode is 2 may be the directional mode 2310 of a direction opposite to the 45-degree directional mode 2350. A mode in which the index of the intra prediction mode is 34 may be the diagonal mode 2330 perpendicular to the 45-degree directional mode 2350. A mode in which the index of the intra prediction mode is 66 may be the intra prediction mode of the 45-degree direction 2350. The index of the horizontal mode 2320 that is the negative direction of x-axis may be 18. The index of the vertical mode 2340 that is the positive direction of y-axis may be 50.

Figure 24A:
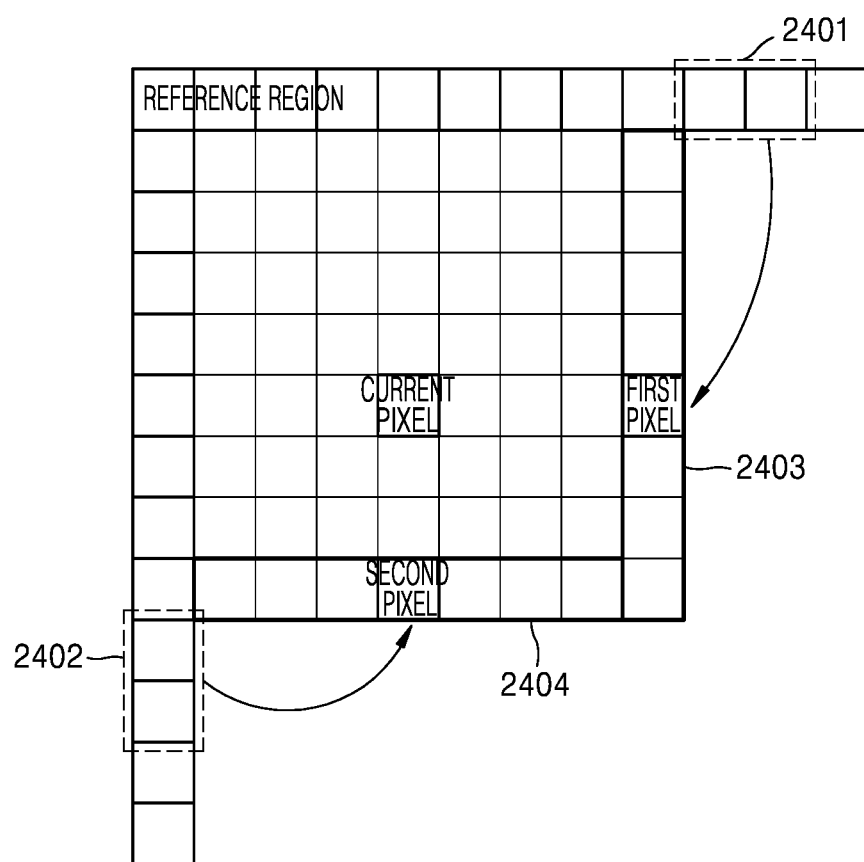
FIG. 24A illustrates a bilinear prediction mode using left and upper neighboring blocks.
Figure 24B:
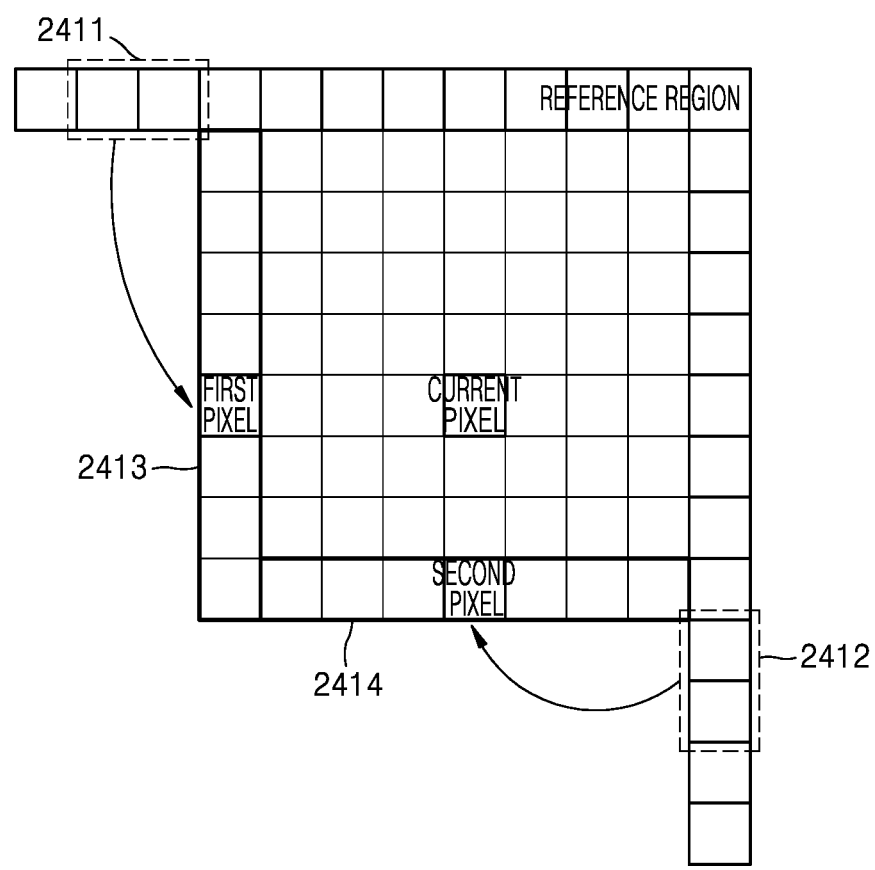
FIG. 24B illustrates a bilinear prediction mode using upper and right neighboring blocks.
Figure 24C:
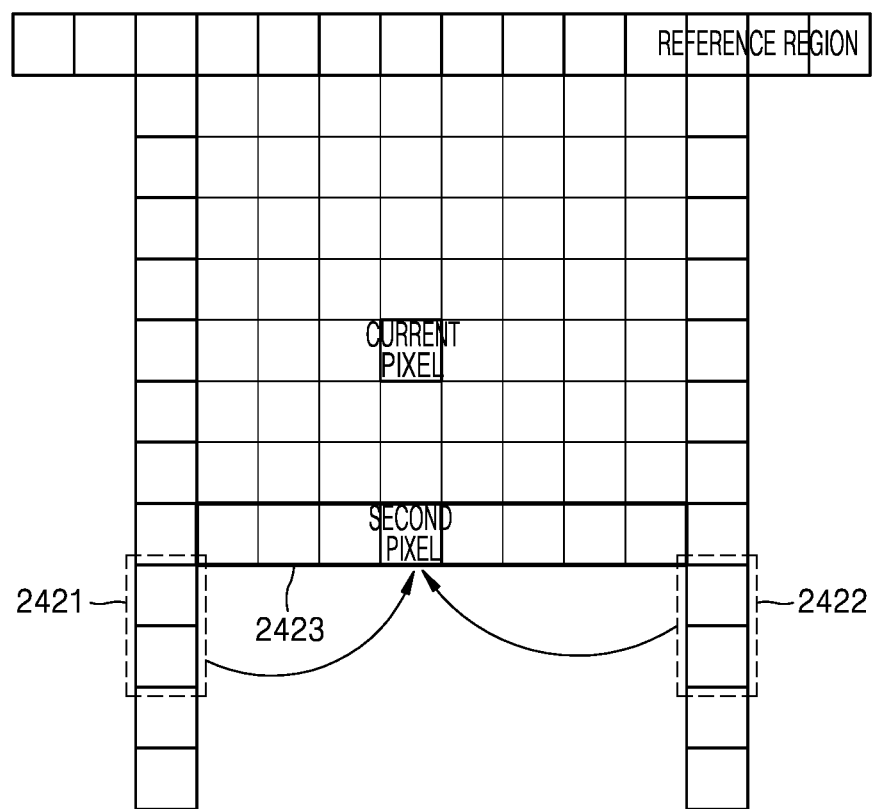
FIG. 24C illustrates a bilinear prediction mode using left and right neighboring blocks.

FIG. 24A illustrates a bilinear prediction mode using left and upper neighboring blocks, FIG. 24B illustrates a bilinear prediction mode using upper and right neighboring blocks, and FIG. 24C illustrates a bilinear prediction mode using left and right neighboring blocks.

The "bilinear prediction mode" is an intra prediction mode that generates boundary values of a current block from a reference block and obtains a prediction value of a current pixel of the current block through linear combination of the boundary values, and is a mode that is often selected along with a DC mode in the intra prediction.

Referring to FIG. 24A, when a reference sample adjacent to a left side of a current block and a reference sample adjacent to an upper side of the current block are available, a virtual first pixel is generated by using a reference sample 2401 located at an upper-right side of the current block, and a virtual second pixel is generated by using a reference sample 2402 located at a lower-left side of the current block. Therefore, pixels of a right border of the current block (pixels 2403 of a vertical line including a first pixel) have a value of the first pixel, and pixels of a lower boundary of the current block (pixels 2404 of a horizontal line including a second pixel) have a value of the second pixel. After that, a prediction value of a current pixel is generated by using linear interpolation in horizontal and vertical directions.

Referring to FIG. 24B, when a reference sample adjacent to a right side of a current block and a reference sample adjacent to an upper side of the current block are available, a virtual first pixel is generated by using a reference sample 2411 located at an upper-left side of the current block, and a virtual second pixel is generated by using a reference sample 2412 located at a lower-right side of the current block, symmetrically with FIG. 24A. Therefore, pixels of a left border of the current block (pixels 2413 of a vertical line including a first pixel) have a value of the first pixel, and pixels of a lower boundary of the current block (pixels 2414 of a horizontal line including a second pixel) have a value of the second pixel. After that, a prediction value of a current pixel is generated by using linear interpolation in horizontal and vertical directions.

Referring to FIG. 24C, when the reference sample adjacent to the left side of the current block and the reference sample adjacent to the right side of the current block are all available, available reference samples may be used without separately generating a left or right boundary value. Also, prediction values of pixels 2423 included in a lower horizontal line including the second pixel are generated by using reference pixels of a lower-left side 2421 and a lower-right side 2422.

Figure 25:
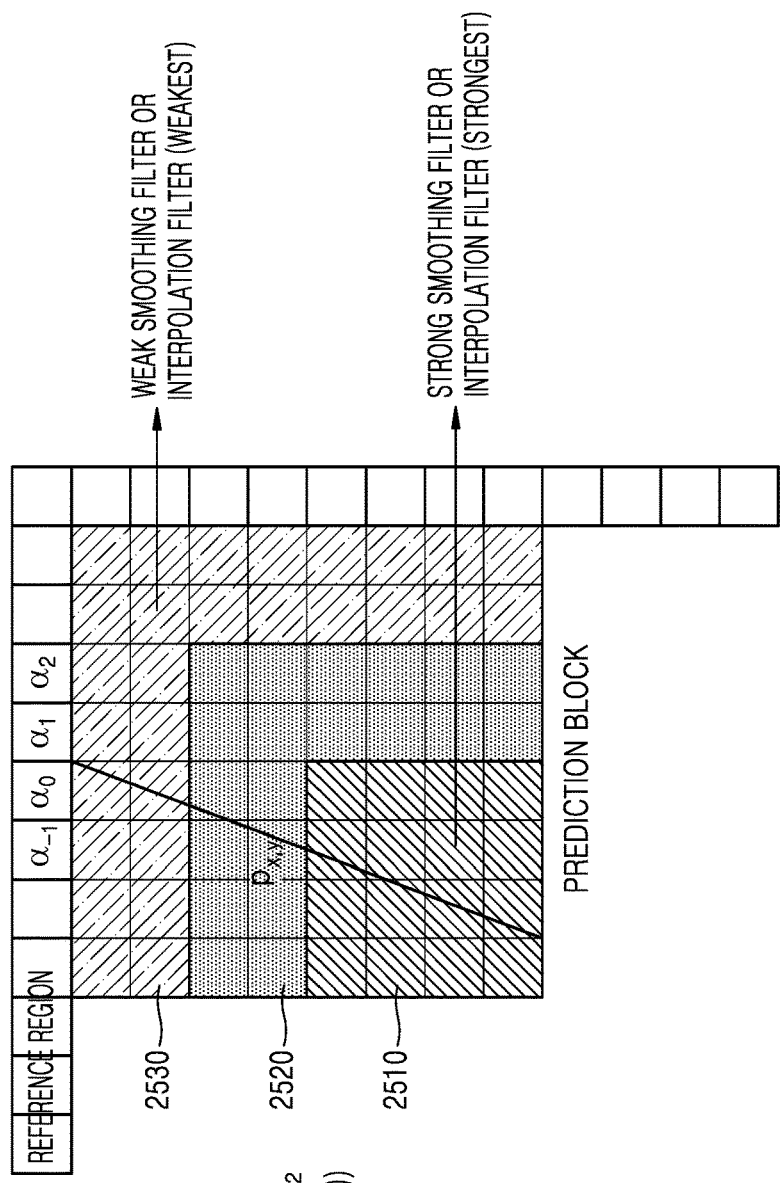
FIG. 25 illustrates an example of a multiple 4-tap filter used for intra prediction.

FIG. 25 illustrates an example of a multiple 4-tap filter used for intra prediction.

In the specification, the 4-tap filter is an example of an N-tap filter, and the N-tap filter is not limited to the 4-tap filter and includes various filters such as a 7-tap filter, an 8-tap filter, a 10-tap filter, and a 12-tap filter. Hereinafter, the 4-tap filter will be described as an example.

When intra prediction is performed, a 4-tap filter having different intensities according to a distance (location difference) is used instead of a 4-tap filter having one intensity. Therefore, it is possible to efficiently generate a prediction block and increase prediction accuracy without increasing complexity.

The distance that is a criterion at which a type of a filter is changed may be determined as a relative ratio proportional to a size of a block, or in the case of a specific filter, the type of the filter may be determined as an absolute distance. When the type of filter is determined by the absolute distance, the number of filters used for one block may be changed. A small number of filters may be used for a small block, and all the filters may be used for a large block.

Also, one filter may be differently applied according to the size of the block. For example, when the size of the block is small, a smoothing filter to be used may be selected according to the intra prediction mode of the block.

Upon determining the type of the filter, when the right reference sample is available, the filter may be applied by flipping the preset filter determination directions in a bilaterally symmetrical manner. When the right reference sample is available, efficient prediction may be performed by differently applying the intensity of the filter according to the distance from the reference sample.

Referring to FIG. 25, a prediction sample $p_{x,y}$ of a current prediction block is predicted by using reference samples $a_{-1}$, $a_0$, $a_1$, and $a_2$ of an upper neighboring block according to an intra prediction direction of an intra prediction mode. In this case, a filter coefficient $f_{k,i}$ is differently determined according to a distance from the reference sample. A filter with strong intensity is applied to samples of a region 2510 farthest from a reference region in a prediction block, an interpolation filter with weak intensity or weakest intensity is applied to samples of a region 2530 close to the reference region in the prediction block, and a filter with medium intensity is applied to samples of a region 2520 located in the middle from the reference region in the prediction block.

A syntax to which filtering of different intensities is applied according to the distance from the reference sample may be implemented as in Equation 1:

$$\text{MULTI\_4}T\text{\_FILTER\_OFFSET} == (i<2 \| j<2) ? 0: \\ ((i<4 \| j<4) ? 1 : ((i<8 \| j<8) ? 2 : ((i<16 \| j<16) ? 3 : 4)));$$ [Equation 1]

wherein i and j represent distances from horizontal and vertical reference samples, respectively, and 0 to 4 represent a type of a 4-tap filter.

Figure 26:
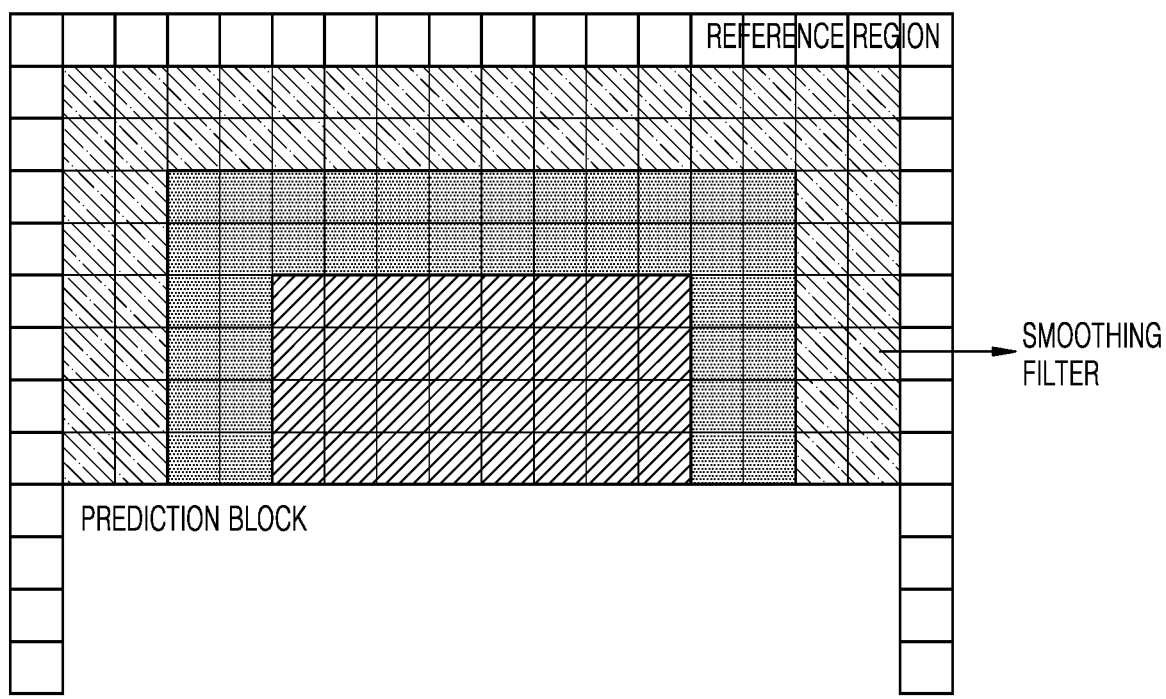
FIG. 26 illustrates another example of a multiple 4-tap filter used for intra prediction.

FIG. 26 illustrates another example of a multiple 4-tap filter used for intra prediction.

When the reference samples of the neighboring reference block adjacent to the current block are present in various directions, all reference samples may be used, or only reference samples of one or two directions may be selectively used.

FIG. 26 illustrates an example in which the example of FIG. 25 is flipped in a bilaterally symmetrical manner. When the left and right reference samples are all available, the reference sample may be selectively used according to the intra prediction mode of the current prediction block, and the intensity of the 4-tap filter may be changed according to the distance from the selected reference sample.

Referring to FIGS. 25 and 26, prediction accuracy may be improved in a region close to a reference sample by using a multiple N-tap filter, and a prediction block having a natural pattern may be generated in a region far from a reference sample.

Figure 27A:
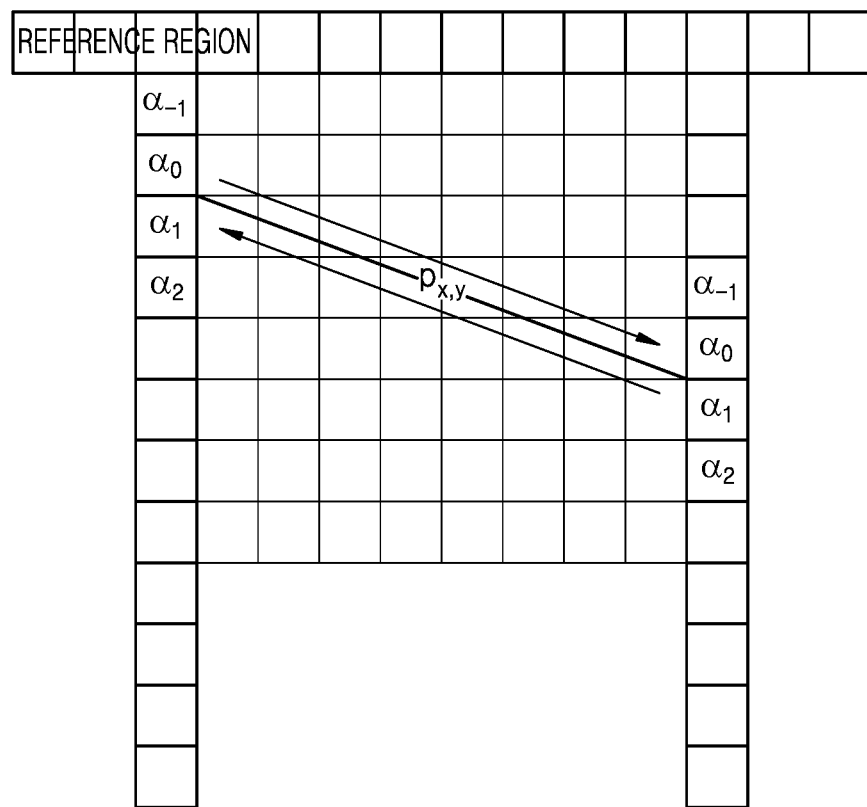
FIG. 27A illustrates an example of a 4-tap filter used for intra prediction.
Figure 27B:
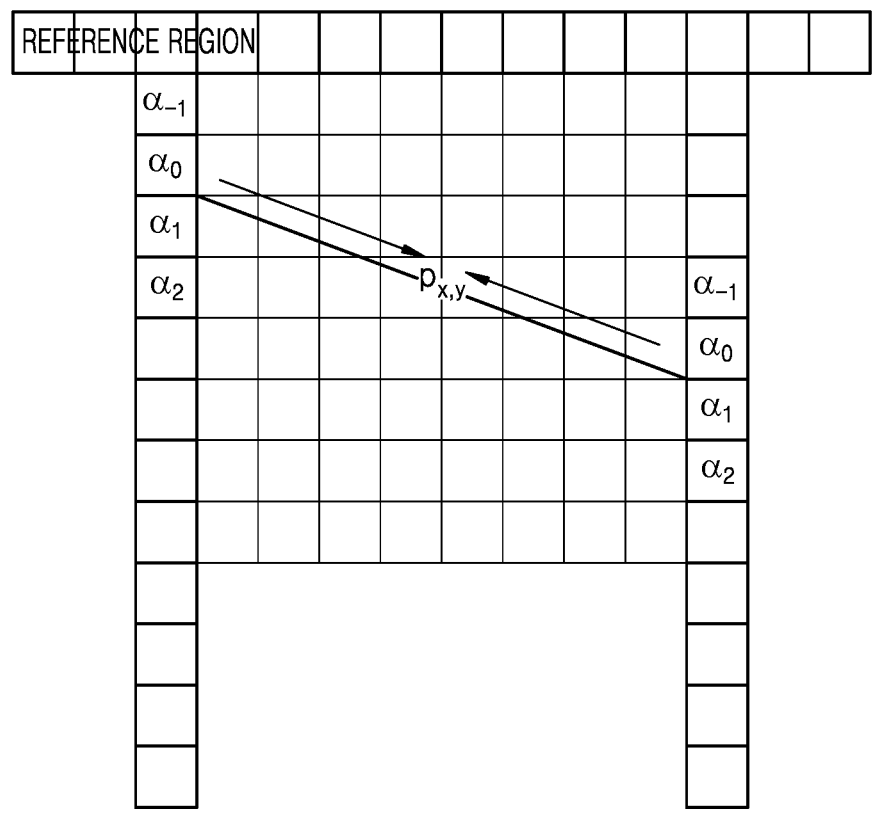
FIG. 27B illustrates another example of a 4-tap filter used for intra prediction.

FIG. 27A illustrates an example of a 4-tap filter used for intra prediction, and FIG. 27B illustrates another example of a 4-tap filter used for intra prediction.

Referring to FIG. 27A, when both the left and right reference samples are available and the intra prediction mode of the current block is a diagonal directional mode, one of the prediction block generated by using the left reference sample and the prediction block generated by using the right reference sample may be selected and used, or an average of the two prediction blocks may be used as the prediction block.

Referring to FIG. 27B, when both the left and right reference samples are available, the prediction block may be generated according to the intra prediction mode of the current block by using the two reference samples, as in the bilinear mode described above with reference to FIGS. 24A, 24B, and 24C.

Referring to FIGS. 27A and 27B, prediction accuracy may be improved by using reference samples of various directions for the current block.

Figure 28:
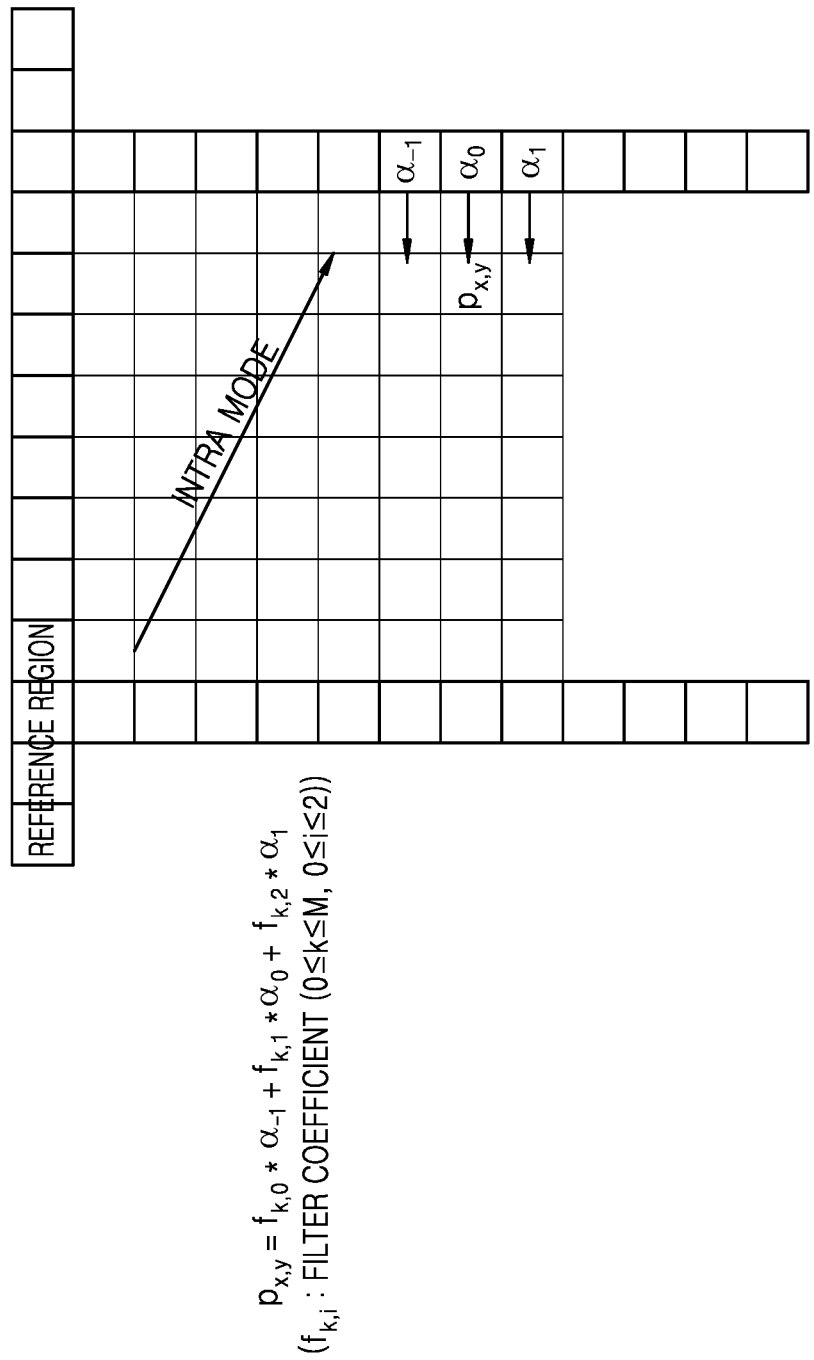
FIG. 28 illustrates an example of boundary filtering of a prediction block.

FIG. 28 illustrates an example of boundary filtering of a prediction block.

In a case in which the prediction block is generated according to the intra prediction, when the intra prediction mode is a directional mode, unused reference samples may be present according to the mode. In this case, discontinuity may occur between the generated prediction block and the reference sample. To solve this problem, the boundary of the prediction block may be filtered by using the reference sample.

Referring to FIG. 28, when the direction of the directional mode among the intra prediction modes is selected as a direction from an upper-left end to a lower-right end, discontinuity between the prediction block and the right reference sample may occur in a region adjacent to the right reference sample. In this case, a discontinuous pattern may be reduced by smoothing a line of pixels of the prediction block adjacent to the right reference sample. Specifically, when discontinuity occurs between the right reference samples and the prediction pixels located at the lower-right end of the prediction block while the prediction pixels of the prediction block is generated in a direction from the upper-left side to the lower-right side by using the left and upper reference samples, prediction pixels may be filtered by applying a filter with a filter coefficient $f_{k,i}$ by using the reference samples $a_{-1}$, $a_0$, and $a_1$ at the lower-right end. In contrast, when discontinuity occurs between the left reference samples and the prediction pixels located at the lower-left end of the prediction block while the prediction pixels of the prediction block is generated in a direction from the upper-right side to the lower-left side by using the right and upper reference samples, the discontinuity problem may be solved by applying filtering in a manner bilaterally symmetrical to FIG. 28.

The region to which filtering is applied may be determined as one or two lines of pixels of the prediction block adjacent to the reference sample and may be differently determined according to the size of the block and the intra mode. Because the intra prediction mode may be not a directional mode but a DC mode, discontinuity may occur. Therefore, boundary filtering may be applied.

Referring to FIG. 28, discontinuity with the neighboring block may be reduced by using more neighboring reference samples, and the occurrence of a sudden prediction deviation may be compensated by generating a predictive block of a natural pattern, such that efficiency of conversion is improved.

Figure 29B:
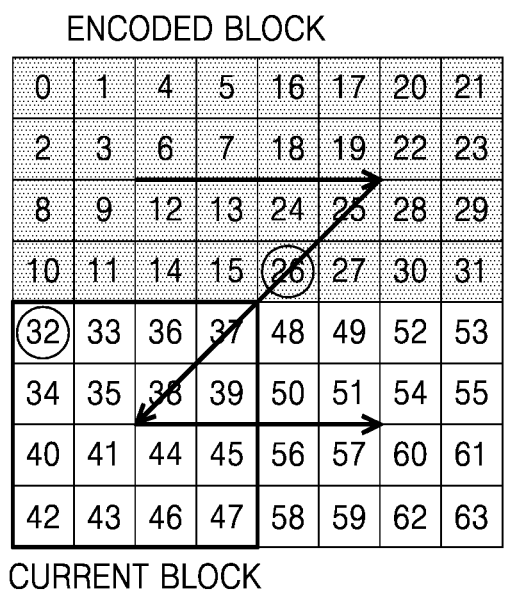
FIG. 29B illustrates an example of a scan order of coding units.
Figure 29C:
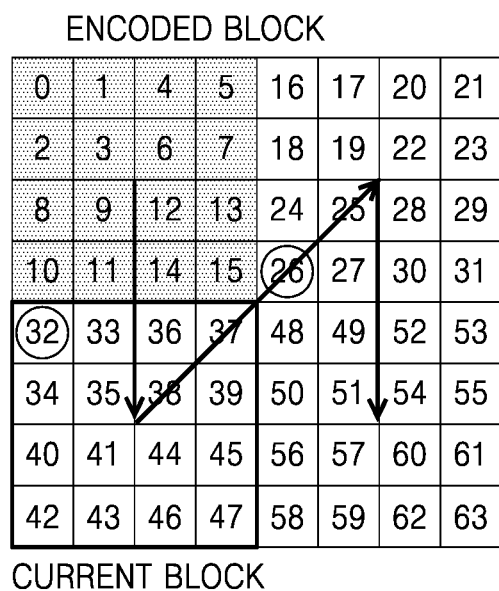
FIG. 29C illustrates another example of a scan order in a block map of a coding unit, and FIG.
Figure 29D:
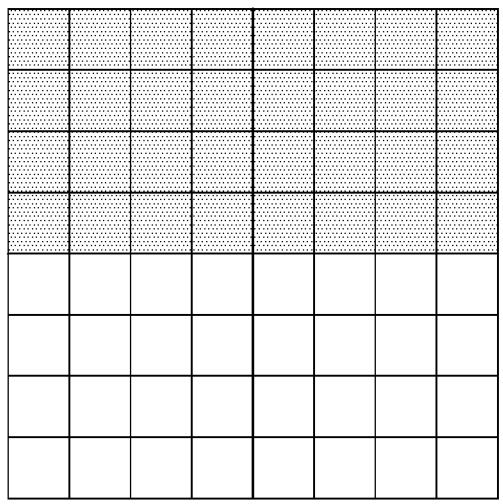
FIG. 29A illustrates block indexes included in a coding unit.

FIG. 29A illustrates block indexes included in a coding unit, FIG. 29B illustrates an example of a scan order of coding units, FIG. 29C illustrates another example of a scan order in a block map of a coding unit, and FIG. 29D illustrates a block map indicating encoded blocks of blocks included in a coding unit.

Referring to FIG. 29A, block indexes may be assigned to samples of a block included in a coding unit.

Referring to FIG. 29B, in a case in which scanning occurs in the order of arrows in FIG. 29B, when a block index of a reference block for a block index 32 of a current block is 26, an available pre-processed value is present, and thus, it may be used for prediction.

However, referring to FIG. 29C, when scanning occurs in the order of arrows in FIG. 29C, a block index 26 of a reference block for a block index 32 of a current block is not encoded or reconstructed, it may not be determined as an available region. Therefore, it is necessary to generate an encoded block map because it is impossible to determine all block indexes less than 32 as available regions.

Referring to FIG. 29D, encoded blocks in the current coding unit are indicated by a gray color. By generating the block map indicating the encoded block in the coding unit, it may be determined whether the region is available with respect to the block indexes less than 32 even in the case of FIG. 29C.

FIG. 30A illustrates a block to which a split unit coding order (SUCO) in which a coding order is changed from right to left is applied, FIG. 30B illustrates a scan order of coding units to which a SUCO is applied, FIG. 30C illustrates an example of an encoded block map, FIG. 30D illustrates an example of a coding unit including a current block, and FIG. 30E illustrates a block map of a coding unit including a current block to which a SUCO is applied.

Referring to FIGS. 30A and 30B, when the existing block map is used for the coding unit including the current block to which the SUCO of FIG. 30A is applied, only information about the left side is read. Therefore, although information about the right side is available, availability check may not be performed. However, as in the scan order of FIG. 30B, because the reconstructed value is available when the block index is read, prediction may be performed by using the block index 48 as the reference sample. Therefore, as illustrated in FIG. 30C, the encoded block map to which the SUCO is applied may be generated. Specifically, when the block map of the coding unit including the current block of FIG. 30D is displayed as illustrated in FIG. 30E, reconstructed sample values located on the right side may be used through availability check.

Referring to FIGS. 29A to 30E, because the block map may be generated and used to check the availability of the reference samples and various coding orders may be used by checking availability, the efficiency of prediction may be improved.

FIG. 31A illustrates a PIMS when left and upper neighboring blocks of a current block are available, FIG. 31B illustrates a PIMS when right and upper neighboring blocks of a current block are available, and FIG. 31C illustrates a PIMS when left, upper, and right neighboring blocks of a current block are all available.

Referring to FIG. 31A, when an intra prediction mode of an upper neighboring block 3120 adjacent to an upper side of a current block 3110 and an intra prediction mode of a left neighboring block 3130 adjacent to a left side of the current block 3110 are a vertical mode and a horizontal mode, respectively, MPMs of the current block may be determined as the vertical mode and the horizontal mode and a PIMS 3140 may include modes that have high association with the MPM among modes existing between the vertical mode and the horizontal mode and are close to the MPM. For example, the PIMS 3140 may include an intra prediction mode of an index increased by 1 from an intra prediction mode index of the vertical mode, an intra prediction mode of an index increased by 2 from an intra prediction mode index of the vertical mode, an intra prediction mode of an index decreased by 2 from an intra prediction mode index of the horizontal mode, an intra prediction mode of an index decreased by 1 from an intra prediction mode index of the horizontal mode, and an intra prediction mode of an index rounded up by averaging the intra prediction mode indexes of the vertical mode and the horizontal mode.

Referring to FIG. 31B, when an intra prediction mode of an upper neighboring block 3160 adjacent to an upper side of a current block 3150 and an intra prediction mode of a right neighboring block 3170 adjacent to a right side of the current block 3150 are a vertical mode and a horizontal mode, respectively, and a left neighboring block is unavailable, MPMs of the current block may be determined as the vertical mode and the horizontal mode by using the intra prediction mode of the right neighboring block instead of the left neighboring block and a PIMS 3140 may include modes that have high association with the MPM among modes existing between the vertical mode and the horizontal mode and are close to the MPM.

Referring to FIG. 31C, an intra prediction mode of a left neighboring block 3102 adjacent to a left side of a current block 3101, an intra prediction mode of an upper neighboring block 3103 adjacent to an upper side of the current block 3101, and an intra prediction mode of a right neighboring block 3104 adjacent to a right side of the current block 3101 are different from each other, all the intra prediction modes of the three neighboring blocks may be used to configure a PIMS 3105. For example, the PIMS 3105 may include an intra prediction mode of an index increased or decreased by N from an index of the intra prediction mode of the left neighboring block 3102, an intra prediction mode of an index increased or decreased by M from an index of the intra prediction mode of the upper neighboring block 3103, and an intra prediction mode of an index increased or decreased by L from an index of the intra prediction mode of the right neighboring block 3104. N, M, and L are integers other than zero.

As another example, when some intra prediction modes of three neighboring blocks are the same, the PIMS 3105 may be configured by using two different intra prediction modes. Also, the PIMS 3105 may be configured such that the intra prediction mode of a direction similar to the same intra prediction mode is further included in the PIMS 3105. Specifically, when the indexes of the intra prediction modes of the left and right neighboring blocks 3102 and 3103 are 37 and the index of the intra prediction mode of the upper neighboring block 3104 is 24, the PIMS 3105 may include intra prediction modes with indexes of 34, 35, 36, 38, 39, 40, 23, and 25 or modes with indexes of 35, 36, 38, 39, 23, and 25, a DC mode, or a bilinear mode.

FIG. 32A illustrates a syntax of a flag indicating whether to use a MPM and a PIMS, and FIG. 32B illustrates a syntax of a PIMS.

Referring to FIG. 32A, when an MPM flag is 1, intra prediction may be performed by using an MPM. When the MPM flag is 0, a PIMS flag may be checked. When the PIMS flag is 1, intra prediction may be performed by using N preset modes of the PIMS. When the PIMS flag is 0, intra prediction may be performed in one of the remaining intra prediction modes. When the number of modes in an additional mode set is N, the PIMS flag may be coded by allocating $\log_2(N)$ bits and then signaled.

FIG. 32B illustrates a syntax of PIMS coding in which a PIMS is configured by using an intra prediction mode of a right neighboring block (right block mode) when the right neighboring block is available. For example, the PIMS is configured considering the intra prediction mode of the right neighboring block (right block mode) in addition to intra prediction modes mpm[0] and mpm[1] of the left neighboring block and the upper neighboring block, which are the conventional MPMs.

FIG. 33 illustrates an example of multi-parameter intra prediction.

Referring to FIG. 33, the multi-parameter intra prediction is a prediction method of generating new prediction pixel values by using a reference pixel or prediction pixels located at the left and upper sides of a current pixel. By using such a method, the pattern of the prediction block is smoothed to improve the efficiency of prediction. Specifically, a new prediction pixel ($P_{MPI}[i, j]$) may be generated by applying a prediction pixel ($P_{HEVC}[i, j]$) predicted after performing intra prediction (arbitrary direction intra (ADI)) in an arbitrary direction, a reference pixel or prediction pixel ($P_{MPI}[i−1, j]$) located at a left side of the prediction pixel, and a reference pixel or prediction pixel ($P_{MPI}[i, j−1]$) located at an upper side of the prediction pixel to Equation 2 below (multi-parameter intra (MPI) (i and j represent locations of a pixel).

$$P_{MPI}[i,j]=(\alpha P_{HEVC}[i,j]+\beta P_{MPI}[i-1,j]+\gamma P_{MPI}[i,j-1]+4)>>3 \quad \text{[Equation 2]}$$

The multi-parameter intra prediction may be used symmetrically when the right reference sample is available.

Also, when both the left and right sides are available, a pixel close to the left side with respect to the center may use information about the left side, and a pixel close to the right side may use information about the right side. In this case, when the discontinuity appears, the discontinuity may be solved by filtering the middle region or by using the information about both sides.

As another example, prediction blocks may be generated by using left and right reference samples and averaged, or a prediction block having better performance may be selected and used.

FIG. 34A illustrates an example of a syntax of multi-parameter prediction used for intra prediction, and FIG. 34B illustrates an example of a syntax of multi-parameter prediction according to availability check.

Referring to FIG. 34A, after the intra prediction is applied by checking whether to use the MPM or the PIMS, multi-parameter prediction (mpi_index( )) may be applied when the multi-parameter prediction is required (when mpi_coded is 1).

Referring to FIG. 34B, as a result of the availability check, when the right reference sample is available (avail_lr==LR_01||avail_lr==LR_11), multi-parameter prediction may be symmetrically applied.

FIG. 35A illustrates an example of a filtered reference sample used for multi-combined intra prediction, and FIG. 35B illustrates an example to which multi-combined intra prediction is applied.

When the new prediction pixel is generated through the multi-parameter intra prediction for the current pixel, filtering may not be applied in parallel due to an infinite impulse response (IRR) method that recursively uses the new prediction pixel of the previous pixel generated through the multi-parameter intra prediction for the previous pixel. Thus, a lot of time is wasted. To solve this problem, multi-combined intra prediction in which the reference sample is first filtered may be used.

Referring to FIG. 35A, in the multi-combined intra prediction, a reference sample is filtered to obtain a filtered reference sample. When the direction of the filtering in the upper reference sample is from left to right, the filtered reference sample may be generated by combining the current reference sample and the left samples located at the left side of the current reference sample. Similarly, when the direction of the filtering in the left reference sample is from bottom to top, the filtered reference sample may be generated by combining the current reference sample and the lower samples located at the lower side of the current reference sample by using weighted average. Also, the direction of the filtering for generating the filtered reference sample may be determined in advance. Specifically, in the case of LR_00 or LR_10, the filtering may be performed from left to right and may be performed from top to bottom. In the case of LR_01, the filtering may be performed from right to left and may be performed from top to bottom. In the case of LR_11, the upper reference sample may be filtered by using both the left and right pixels, and the left and right reference samples may be filtered from top to bottom.

The filtering of the reference sample may be performed according to the filtering direction, as expressed in Equation 3 below:

$$\text{Reference Filtering} = \begin{cases} L \to R, U \to D: a'_j = \frac{1}{4}*(a_{j-1} + 3a_j) \\ R \to L, D \to U: a'_j = \frac{1}{4}*(3a_j + a_{j+1}) \end{cases} \quad \text{[Equation 3]}$$

wherein j in the horizontal direction represents a natural number in ascending order from left to right, and j in the vertical direction represents a natural number in ascending order from top to bottom.

When the filtering direction is from left to right, a reference sample may be filtered by applying a weight using a current reference sample $a_j$ and a sample $a_{j-1}$ located at the left side of the current reference sample. When the filtering direction is from top to bottom, a reference sample may be filtered by applying a weight using a current reference sample $a_j$ and a sample $a_{j-1}$ located at an upper side of the current reference sample.

In contrast, when the filtering direction is from right to left, a reference sample may be filtered by applying a weight using a current reference sample $a_j$ and a sample $a_{j+1}$ located at the right side of the current reference sample. When the filtering direction is from bottom to top, a reference sample may be filtered by applying a weight using a current reference sample $a_j$ and a sample $a_{j+1}$ located at a lower side of the current reference sample.

Referring to FIG. 35B, a prediction block may be generated by using an existing reference sample and a filtered reference sample together.

In the multi-combined intra prediction method, when the right reference sample is available, the methods of FIGS. 35A and 35B may be used by flipping bilaterally symmetrically. When both the left and right sides are available, only one of the two sides may be selected and used according to the location of the current pixel. When the location of the current pixel is close to the left side, the multi-combined intra prediction may be performed by using the left reference samples. When the location of the current pixel is close to the right side, the multi-combined intra prediction may be performed by using the right reference samples. The multi-combined intra prediction may be performed on the pixel located in the middle region by using both the left and right reference samples. When both the left and right reference samples are used regardless of the location of the current pixel, weights may be differently determined and the multi-combined intra prediction may be performed.

Also, whether to use both or either of the left and right reference samples may be determined according to the size of the block. When the size of the block is large, one of the left and right reference samples may be used, and when the size of the block is small, both the left and right reference samples may be used. This is because as the size of the block is smaller, the similarity with the left and right reference samples is higher. For example, when the size of the block is greater than 16, only the left side or right side information may be used, and when the size of the block is less than 16, both the left side information and the right side information may be used. For example, when the size of the block is greater than 16 in generating the upper-left pixel of the block, the weight may be expressed as [left up right]=(1/16) *[8 8 0], and when the block size is less than 16, the weight may be expressed as [left up right]=(1/16)*[6 8 2].

The multi-combined intra prediction (MIP) may be applied to the prediction pixel according to the filtering direction based on Equation 4 below.

Equation 4 is an equation for generating the prediction sample to which the MIP is applied by using the filtered reference sample obtained in Equation 3.

$$p'_{ij} = \frac{[C_a[i,j] \cdot a'_i + C_p[i,j] \cdot p_{ij} + C_a[j,i] \cdot a'_j]}{C_a[i,j] + C_p[i,j] + C_a[j,i]} \quad \text{[Equation 4]}$$

wherein $$C_a[i,j] = \begin{pmatrix} 1 & 2 & 1 \\ 5 & 1 & 1 \\ 5 & 3 & 1 \end{pmatrix}, C_p[i,j] = \begin{pmatrix} 2 & 9 & 10 \\ 9 & 6 & 12 \\ 10 & 12 & 14 \end{pmatrix},$$

and when i or j is greater than 3, i or j is determined as 3 and a coefficient is selected.

i and j represent a row number and a column number, respectively. ai' represents the left reference sample generated by filtering according to the filtering direction using Equation 3, and $a_j$' represents the upper reference sample generated by filtering according to the filtering direction using Equation 3. The left $C_a[i, j]$ indicates that a coefficient corresponding to an i-th row and a j-th column of a corresponding matrix is used when multi-combined intra prediction is applied to a pixel located at the i-th row and the j-th column. $C_p[i, j]$ indicates that a coefficient corresponding to an i-th row and a j-th column of a corresponding matrix is used when multi-combined intra prediction is applied to a pixel located at the i-th row and the j-column, and $C_p[j, i]$ indicates that a coefficient corresponding to a j-th row and an i-th column of a corresponding matrix is used when multi-combined intra prediction is applied to a pixel located at the i-th row and the j-th column. For example, when the above equations are applied to a pixel located at a second row and a third column, $C_a[i, j]$ is 1, $C_p[i, j]$ is 12, and $C_p[j, i]$ is 3.

The multi-combined intra prediction using Equation 4 generates a new prediction pixel by using the prediction pixel $p_{ij}$ of the current pixel and weights of the filtered left reference pixel $a_i$' and the filtered upper reference pixel $a_j$' generated by Equation 3.

When the filtering direction is from left to right and from top to bottom, this means that the new prediction pixel is generated by using weights for five points of the prediction pixel $p_{ij}$ of the current pixel, the left reference pixel as corresponding to the row of the current pixel, the reference pixel $a_{i-1}$ located at the upper side of the left reference pixel, the upper reference pixel $a_j$ corresponding to the column of the current pixel, the reference pixel $a_{j-1}$ located at the left side of the upper reference pixel.

Also, when the filtering direction is from right to left and from bottom to top, the multi-combined intra prediction generates the new prediction pixel is generated by using the prediction pixel $p_{ij}$ of the current pixel, the left reference pixel as corresponding to the row of the current pixel, the reference pixel $a_{i+1}$ located at the lower side of the left reference pixel, the upper reference pixel $a_j$ corresponding to the column of the current pixel, and the reference pixel $a_{j+1}$ located at the right side of the upper reference pixel.

FIG. 36A illustrates an example of a syntax of multi-combined intra prediction used for intra prediction, and FIG. 36B illustrates an example of a syntax of multi-combined intra prediction according to availability check.

Referring to FIG. 36A, after the intra prediction is applied by checking whether to use the MPM or the PIMS, multi-combined intra prediction (mip_index( )) may be applied when the multi-combined intra prediction is required (when mip_coded is 1).

Referring to FIG. 36B, as a result of the availability check, when the right reference sample is available (avail_lr=LR_01), the multi-combined intra prediction may be applied.

Various embodiments have been described above. It will be understood that various modifications and changes may be made without departing from the scope of the present disclosure by those of ordinary skill in the art to which the present disclosure pertains. Accordingly, the disclosed embodiments are to be considered as illustrative and not restrictive. The scope of the present disclosure should be interpreted by the appending claims, and all technical ideas within the scope of equivalents should be construed as falling within the scope of the present disclosure.

The above-described embodiments may be embodied as computer programs and may be implemented by general-purpose digital computers that execute the computer programs by using a computer-readable recording medium. The computer-readable recording medium includes a storage medium such as a magnetic storage medium (e.g., read-only memory (ROM), floppy disk, hard disk, etc.) and an optical reading medium (e.g., compact disc read-only memory (CD-ROM), digital versatile disc (DVD), etc.).

The invention claimed is:

1. A video decoding method comprising:
   obtaining most probable mode (MPM) flag indicating whether to use any one among a plurality of intra prediction modes included in MPMs of a current block, wherein the MPMs include an intra prediction mode of a left neighboring block of the current block and an intra prediction mode of an upper neighboring block of the current block;
   when the MPM flag indicates not to use any one among the plurality of intra prediction modes included in the MPMs of the current block, obtaining an extended intra mode flag indicating whether to use one among a plurality of intra prediction modes included in an extended intra mode list or one among a plurality of remaining intra prediction modes as an intra prediction mode of the current block;
   configuring the extended intra mode list using the plurality of intra prediction modes included in the MPMs of the current block;
   when the extended intra mode flag indicates to use one among the plurality of intra prediction modes included in the extended intra mode list as the intra prediction mode of the current block, determining an intra prediction mode among the plurality of intra prediction modes included in the extended intra mode list to be the intra prediction mode of the current block;
   when the extended intra mode flag indicates to use one among the plurality of remaining intra prediction modes as the intra prediction mode of the current block, determining an intra prediction mode among the plurality of remaining intra prediction modes to be the intra prediction mode of the current block; and
   performing intra prediction on the current block using the intra prediction mode of the current block,
   wherein when an intra prediction mode of a right neighboring block of the current block is a first directional mode, the extended intra mode list includes the first directional mode, an intra prediction mode of an index increased by 1 from an index of the first directional mode, and an intra prediction mode of an index decreased by 1 from the index of the first directional mode.

2. The video decoding method of claim 1, wherein the intra prediction mode of the left neighboring block is a DC mode and the intra prediction mode of the upper neighboring block is a second directional mode.

3. A video encoding method comprising:
   generating most probable mode (MPM) flag indicating whether to use any one among a plurality of intra prediction modes included in MPMs of a current block, wherein the MPMs include an intra prediction mode of a left neighboring block of the current block and an intra prediction mode of an upper neighboring block of the current block;
   when the MPM flag indicates not to use any one among the plurality of intra prediction modes included in the 1ViPMs of the current block, generating an extended intra mode flag indicating whether to use one among a plurality of intra prediction modes included in an extended intra mode list or one among a plurality of remaining intra prediction modes as an intra prediction mode of the current block;
   configuring the extended intra mode list using the plurality of intra prediction modes included in the MPMs of the current block;
   when the extended intra mode flag indicates to use one among the plurality of intra prediction modes included in the extended intra mode list as the intra prediction mode of the current block, determining an intra prediction mode among the plurality of intra prediction modes included in the extended intra mode list to be the intra prediction mode of the current block;
   when the extended intra mode flag indicates to use one among the plurality of remaining intra prediction modes as the intra prediction mode of the current block, determining an intra prediction mode among the plurality of remaining intra prediction modes to be the intra prediction mode of the current block; and
   performing intra prediction on the current block using the intra prediction mode of the current block,
   wherein when an intra prediction mode of a right neighboring block of the current block is a first directional mode, the extended intra mode list includes the first directional mode, an intra prediction mode of an index increased by 1 from an index of the first directional mode, and an intra prediction mode of an index decreased by 1 from the index of the first directional mode.

4. The video encoding method of claim 3, wherein the intra prediction mode of the left neighboring block is a DC mode and the intra prediction mode of the upper neighboring block is a second directional mode.

5. A non-transitory computer-readable medium for recording a bitstream, the bitstream comprising:
   most probable mode (MPM) flag indicating whether to use any one among a plurality of intra prediction modes included in MPMs of a current block, wherein the MPMs include an intra prediction mode of a left neighboring block of the current block and an intra prediction mode of an upper neighboring block of the current block; and
   an extended intra mode flag indicating whether to use one among a plurality of intra prediction modes included in an extended intra mode list or one among a plurality of remaining intra prediction modes as an intra prediction mode of the current block, wherein the MPM flag and the extended intra mode flag are obtained by:
  generating the MPM flag;
  when the MPM flag indicates not to use any one among the plurality of intra prediction modes included in the MPMs of the current block, generating the extended intra mode flag;
  configuring the extended intra mode list using the plurality of intra prediction modes included in the 1ViPMs of the current block;
  when the extended intra mode flag indicates to use one among the plurality of intra prediction modes included in the extended intra mode list as the intra prediction mode of the current block, determining an intra prediction mode among the plurality of intra prediction modes included in the extended intra mode list to be the intra prediction mode of the current block;
  when the extended intra mode flag indicates to use one among the plurality of remaining intra prediction modes as the intra prediction mode of the current block, determining an intra prediction mode among the plurality of remaining intra prediction modes to be the intra prediction mode of the current block; and
  performing intra prediction on the current block using the intra prediction mode of the current block, and
wherein when an intra prediction mode of a right neighboring block of the current block is a first directional mode, the extended intra mode list includes the first directional mode, an intra prediction mode of an index increased by 1 from an index of the first directional mode, and an intra prediction mode of an index decreased by 1 from the index of the first directional mode.

6. The non-transitory computer-readable medium of claim 5, wherein the intra prediction mode of the left neighboring block is a DC mode and the intra prediction mode of the upper neighboring block is a second directional mode.

* * * * *